US012579055B1

(12) United States Patent
Goyal et al.

(10) Patent No.: US 12,579,055 B1
(45) Date of Patent: Mar. 17, 2026

(54) COMPUTING TECHNOLOGIES FOR VERIFICATION OF STABILITY OF PRODUCTION ENVIRONMENTS

(71) Applicant: Northern Trust Corporation, Chicago, IL (US)

(72) Inventors: Shalla Goyal, Chicago, IL (US); Basivi Junna, Chicago, IL (US); Koutilya Gogineni, Chicago, IL (US)

(73) Assignee: Northern Trust Corporation, Chicago, IL (US)

( * ) Notice: Subject to any disclaimer, the term of this patent is extended or adjusted under 35 U.S.C. 154(b) by 0 days.

(21) Appl. No.: 19/329,027

(22) Filed: Sep. 15, 2025

Related U.S. Application Data

(63) Continuation of application No. 19/183,090, filed on Apr. 18, 2025, now Pat. No. 12,423,219.

(51) Int. Cl.
| | |
|---|---|
| *G06F 11/00* | (2006.01) |
| *G06F 11/22* | (2006.01) |
| *G06F 11/32* | (2006.01) |
| *G06F 11/3668* | (2025.01) |
| *G06F 16/28* | (2019.01) |

(52) U.S. Cl.
CPC ...... *G06F 11/3688* (2013.01); *G06F 11/2268* (2013.01); *G06F 11/321* (2013.01); *G06F 16/285* (2019.01)

(58) Field of Classification Search
CPC .............. G06F 11/2268; G06F 11/321; G06F 11/3688; G06F 16/285
See application file for complete search history.

(56) References Cited

U.S. PATENT DOCUMENTS

| | | | |
|---|---|---|---|
| 5,742,754 | A | 4/1998 | Tse |
| 8,732,837 | B1 | 5/2014 | Miller |
| 8,903,943 | B2 | 12/2014 | Glaser |
| 9,946,534 | B1 | 4/2018 | Thompson |
| 9,971,595 | B1 | 5/2018 | Thompson |
| 10,203,976 | B2 | 2/2019 | Mao |
| 10,572,374 | B2 | 2/2020 | Sharma |
| 11,010,279 | B2 | 5/2021 | Morris |
| 11,074,165 | B2 | 7/2021 | Khakare |
| 11,436,128 | B2 | 9/2022 | Elking |
| 11,461,119 | B2 | 10/2022 | Lewis |
| 2014/0222419 | A1* | 8/2014 | Romano ............... G06F 16/367 |
| | | | 704/10 |
| 2016/0028672 | A1 | 1/2016 | Kaul |

(Continued)

FOREIGN PATENT DOCUMENTS

| | | |
|---|---|---|
| CN | 108268348 | 7/2018 |
| CN | 111274147 | 6/2020 |

(Continued)

*Primary Examiner* — Joshua P Lottich
(74) *Attorney, Agent, or Firm* — Dentons US LLP

(57) ABSTRACT

This disclosure enables various hardware/software configurations that enable verification of stability of production environments. These configurations are technologically advantageous and improve functioning of computers, because these configurations minimize interference with or disruption of business operations in production environments, while allowing non-technical personnel to perform due diligence of various IT equipment in such environments and enabling iterative feedback to allow for identification of gaps in such diligence.

25 Claims, 33 Drawing Sheets

(56)         References Cited

U.S. PATENT DOCUMENTS

| | | | |
|---|---|---|---|
| 2017/0060971 A1* | 3/2017 | Dhayapule ............ | G06F 11/368 |
| 2017/0264575 A1 | 9/2017 | Willshire | |
| 2018/0253372 A1 | 9/2018 | Colaiacomo | |
| 2018/0336112 A1 | 11/2018 | Havinal | |
| 2018/0349989 A1 | 12/2018 | Gonzales | |
| 2024/0168901 A1 | 5/2024 | Bass | |
| 2025/0021471 A1 | 1/2025 | Shah | |

FOREIGN PATENT DOCUMENTS

| | | |
|---|---|---|
| CN | 111930421 | 11/2020 |
| CN | 112988600 | 6/2021 |
| CN | 113010435 | 6/2021 |
| CN | 113377412 | 9/2021 |
| CN | 114650213 | 6/2022 |
| CN | 114878186 | 8/2022 |
| CN | 115080422 | 9/2022 |
| CN | 115086287 | 9/2022 |
| CN | 115543781 | 12/2022 |
| CN | 115687156 | 2/2023 |
| CN | 115827051 | 3/2023 |
| CN | 115858004 | 3/2023 |
| CN | 116228116 | 6/2023 |
| CN | 117555560 | 2/2024 |
| CN | 117573235 | 2/2024 |
| CN | 117648259 | 3/2024 |
| CN | 117826630 | 4/2024 |
| CN | 118838597 | 10/2024 |
| CN | 119045864 | 11/2024 |
| CN | 119396666 | 2/2025 |
| CN | 119537235 | 2/2025 |
| CN | 119646238 | 3/2025 |
| EP | 3115902 | 1/2017 |

* cited by examiner

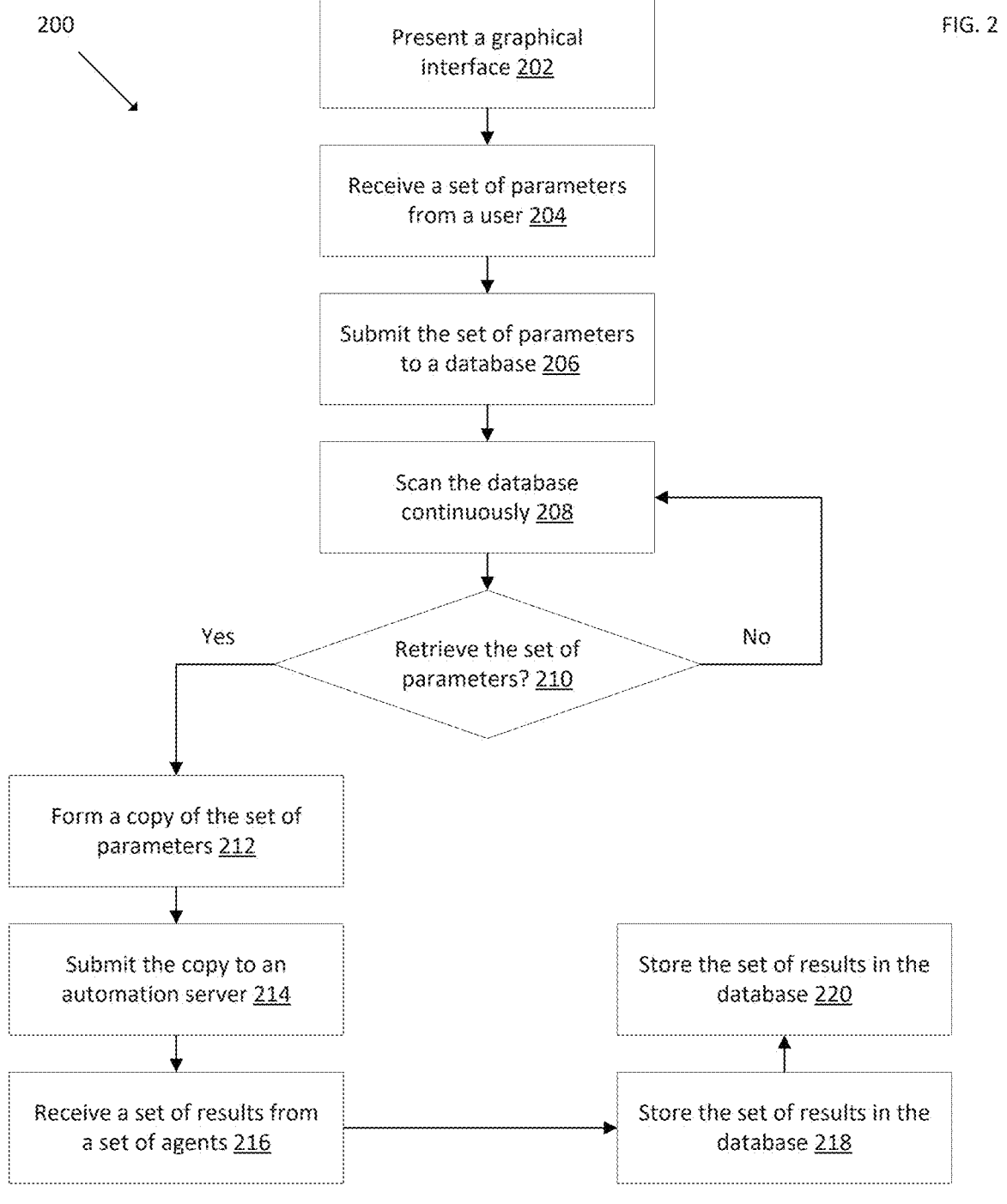

Present a graphical interface 202

Receive a set of parameters from a user 204

Submit the set of parameters to a database 206

Scan the database continuously 208

Retrieve the set of parameters? 210

Yes

No

Form a copy of the set of parameters 212

Submit the copy to an automation server 214

Receive a set of results from a set of agents 216

Store the set of results in the database 218

Store the set of results in the database 220

300A

300B

400

600

700

FIG. 10
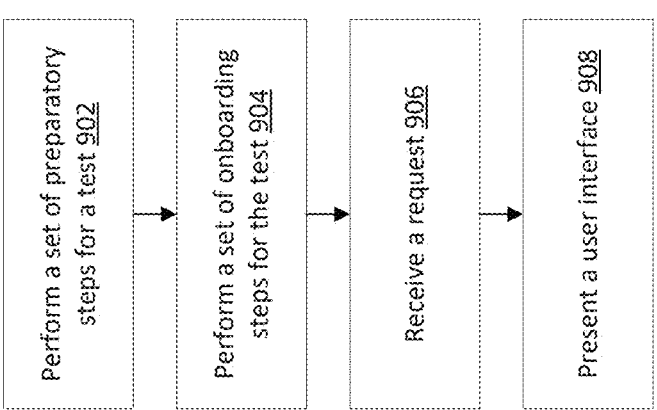
Perform a set of preparatory steps for a test 902
Perform a set of onboarding steps for the test 904
Receive a request 906
Present a user interface 908
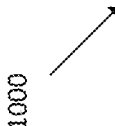
1000

1100

1200

FIG. 13
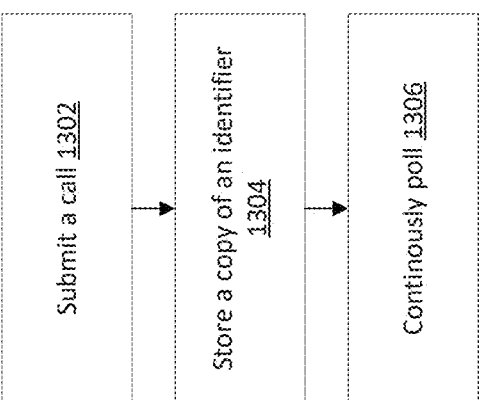
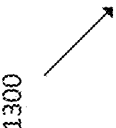
1300

FIG. 14
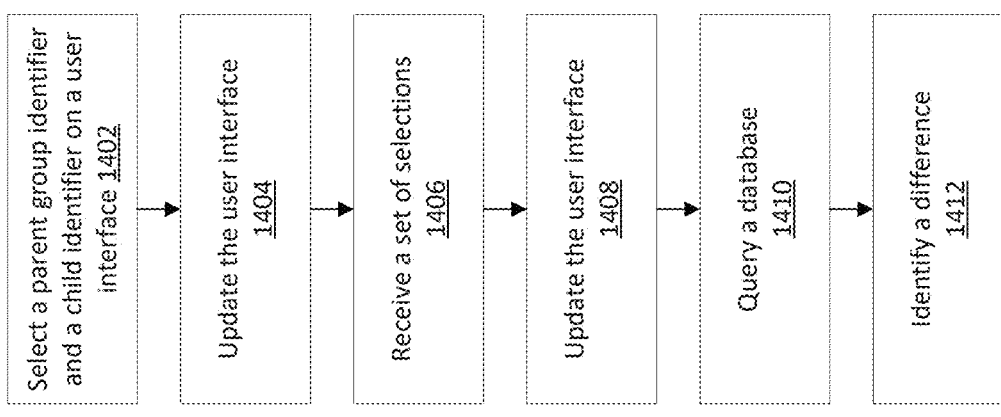
Select a parent group identifier and a child identifier on a user interface 1402
Update the user interface 1404
Receive a set of selections 1406
Update the user interface 1408
Query a database 1410
Identify a difference 1412
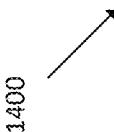
1400

Figure 25:
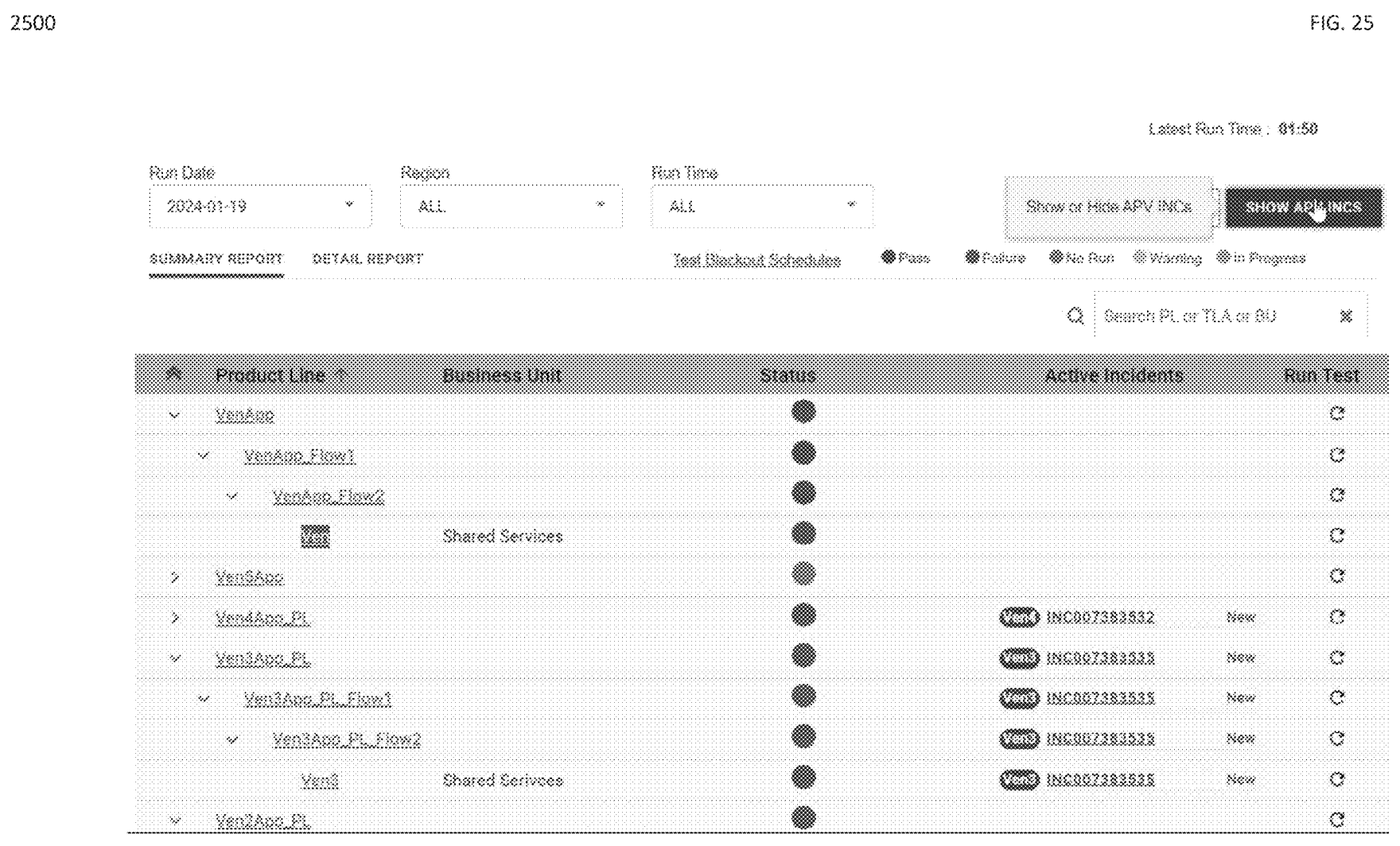

Run Date
2024-03-19

Region
ALL

Run Time
ALL

SUMMARY REPORT     DETAIL REPORT

Latest Run Time : 84:50

Show or Hide APV IMCs

Show all lines

Pass     Failure     No Run     Waiting     In Progress

Test Blackout Schedules

Q  Search PL or TLA or BU                                    ✕

| # | Product Line | Business Unit | Status | Active Incidents | Run Test |
|---|---|---|---|---|---|
| > | VenAno | | ⬤ | | ◯ |
| > | VenApp_Flow1 | | ⬤ | | ◯ |
| > | VenApp_Flow2 | | ⬤ | | ◯ |
| | VenBee | | ⬤ | | ◯ |
| ^ | Ven4App_PL | Shared Services | ⬤ | INC0073833332  New | ◯ |
| ^ | Ven3App_PL | | ⬤ | INC0073833333  New | ◯ |
| > | Ven3App_PL_Flow1 | | ⬤ | INC0073833333  New | ◯ |
| > | VenApp_PL_Flow2 | | ⬤ | INC0073833333  New | ◯ |
| | Ven5 | Shared Services | ⬤ | INC0073833333  New | ◯ |
| > | VenOApp_PL | | ⬤ | | ◯ |

2600

2700

2800

2900

3000

COMPUTING TECHNOLOGIES FOR VERIFICATION OF STABILITY OF PRODUCTION ENVIRONMENTS

CROSS-REFERENCE TO RELATED PATENT APPLICATION

This patent application is a Continuation of a U.S. Non-Provisional patent application Ser. No. 19/183,090 filed 18 Apr. 2025; which is incorporated by reference herein for all purposes.

TECHNICAL FIELD

Generally, this disclosure relates to production environments. More specifically, this disclosure relates to verification of stability of production environments

BACKGROUND

Conventionally, in a realm of enterprise computing, there may be situations that require due diligence of various Informational Technology (IT) equipment and its software to ensure stability and reliability of production environments. However, such diligence may interfere with or disrupt business operations, leading to significant downtimes that impact productivity and financial outcomes. Likewise, there may be situations when non-technical personnel may desire to perform such diligence. However, there is no currently known specialized technology that enables this functionality, leaving room for oversight and potential compromises in performing such diligence. Similarly, there may be situations when gaps in such due diligence are desired to be identified. However, there is no currently known specialized technology that enables such functionality.

SUMMARY

This disclosure solves various technical problems referenced above by disclosing various hardware/software configurations that enable verification of stability of production environments. These configurations are technologically advantageous and improve functioning of computers, because these configurations minimize interference with or disruption of business operations in production environments, while allowing non-technical personnel to perform due diligence of various IT equipment in such environments and enabling iterative feedback to allow for identification of gaps in such diligence.

DESCRIPTION OF DRAWINGS

FIG. 2 shows a flowchart of an embodiment of an algorithm for using an automation server in the network topology of FIGS. 1A-1D according to this disclosure.

FIG. 10 shows a flowchart of an embodiment of an algorithm for presenting a user interface based on a set of onboarding steps in the network topology of FIGS. 1A-1D according to this disclosure.

FIG. 13 shows a flowchart of an embodiment of an algorithm for updating an identifier for a test cycle in the network topology of FIGS. 1A-1D according to this disclosure.

FIG. 14 shows a flowchart of an embodiment of an algorithm for storing a difference between two lists of identifiers in the network topology of FIGS. 1A-1D according to this disclosure.

FIGS. 18-30 show a set of screenshots of an embodiment of a user interface for monitoring status of logical environments and their logical components in the network topology of FIGS. 1A-1D according to this disclosure.

DETAILED DESCRIPTION

Figure 1A:
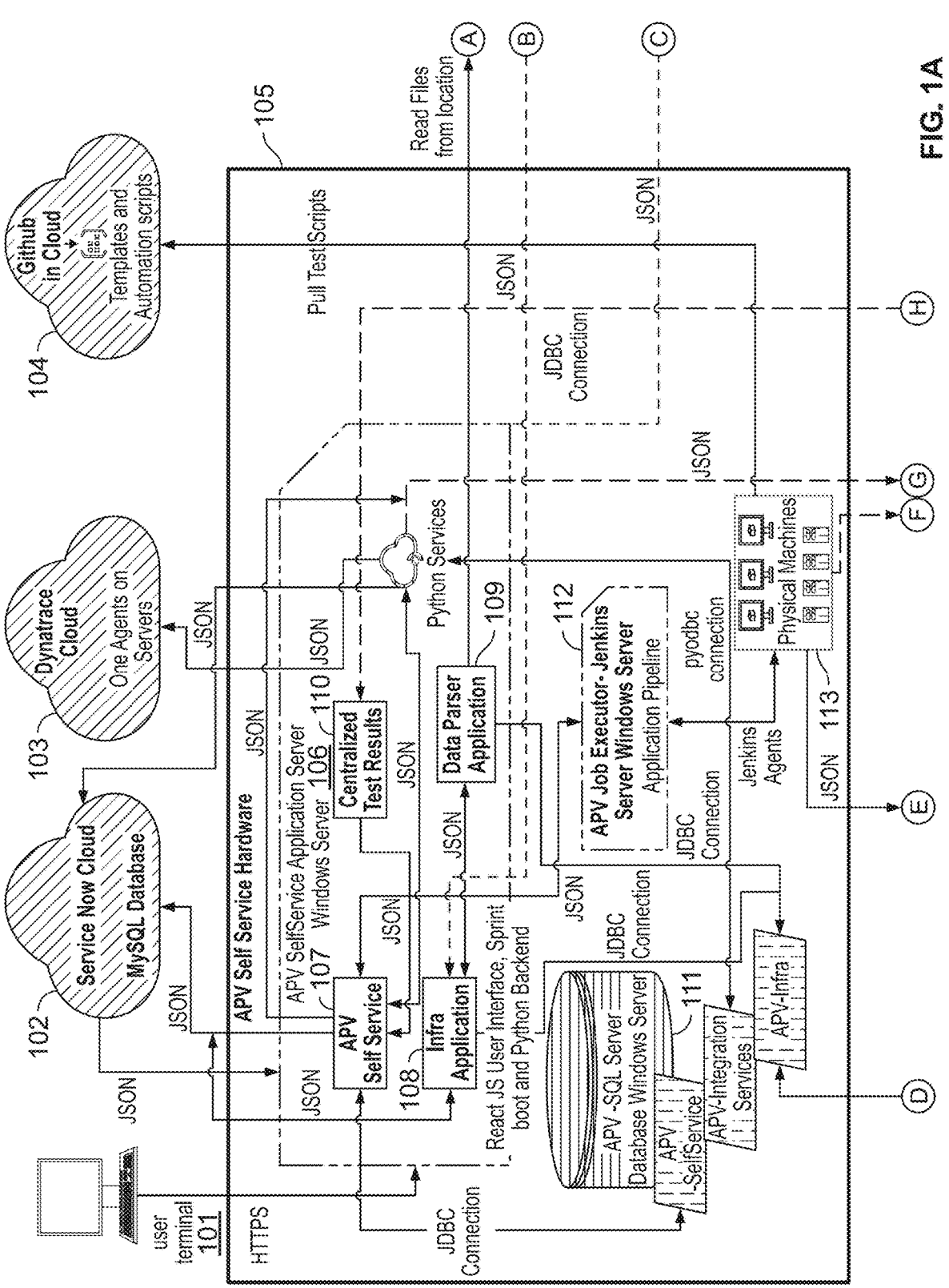
FIGS. 1A-1D show a schematic diagram of an embodiment of a network topology according to this disclosure.
Figure 1B:
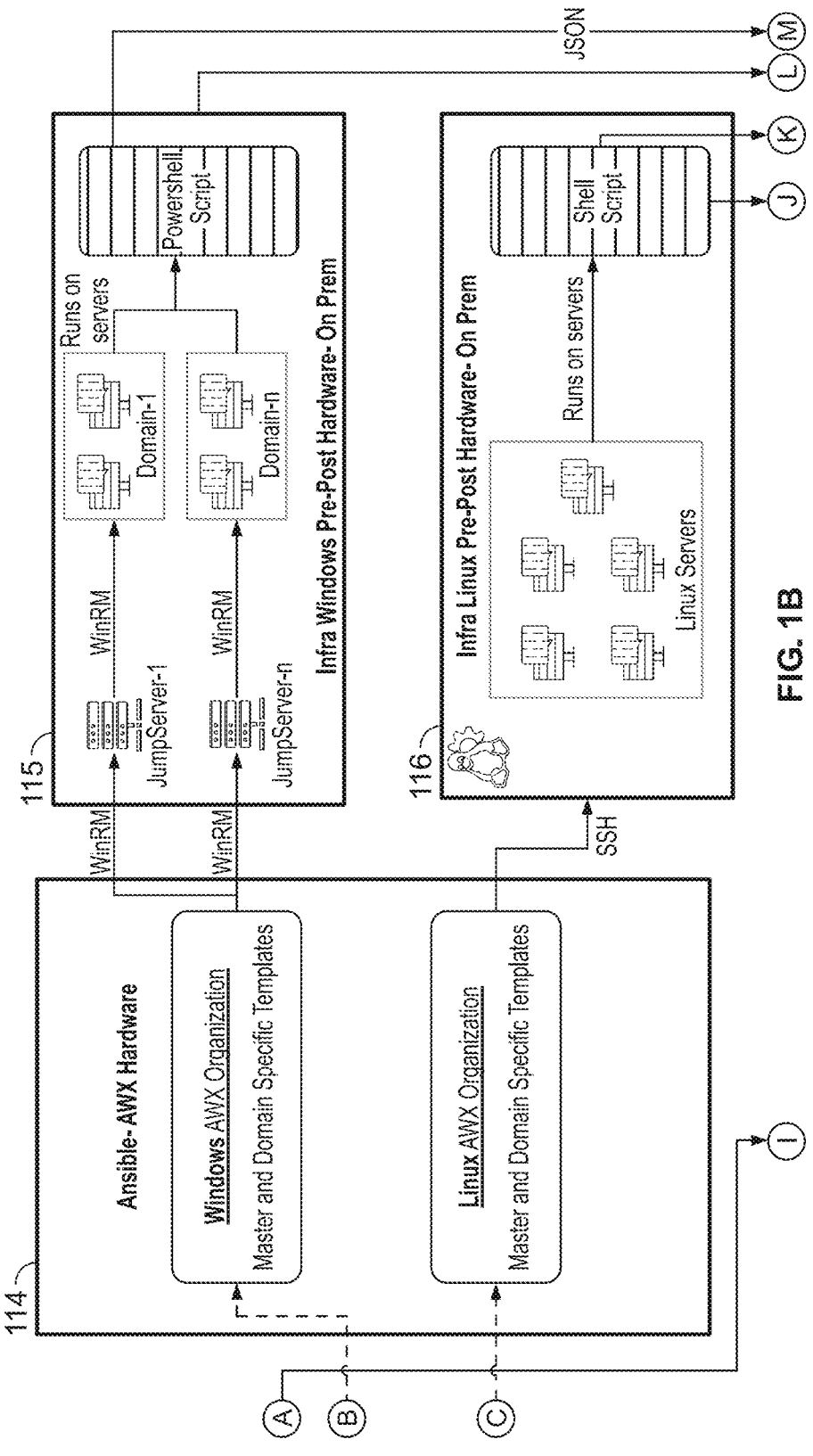
Figure 1C:
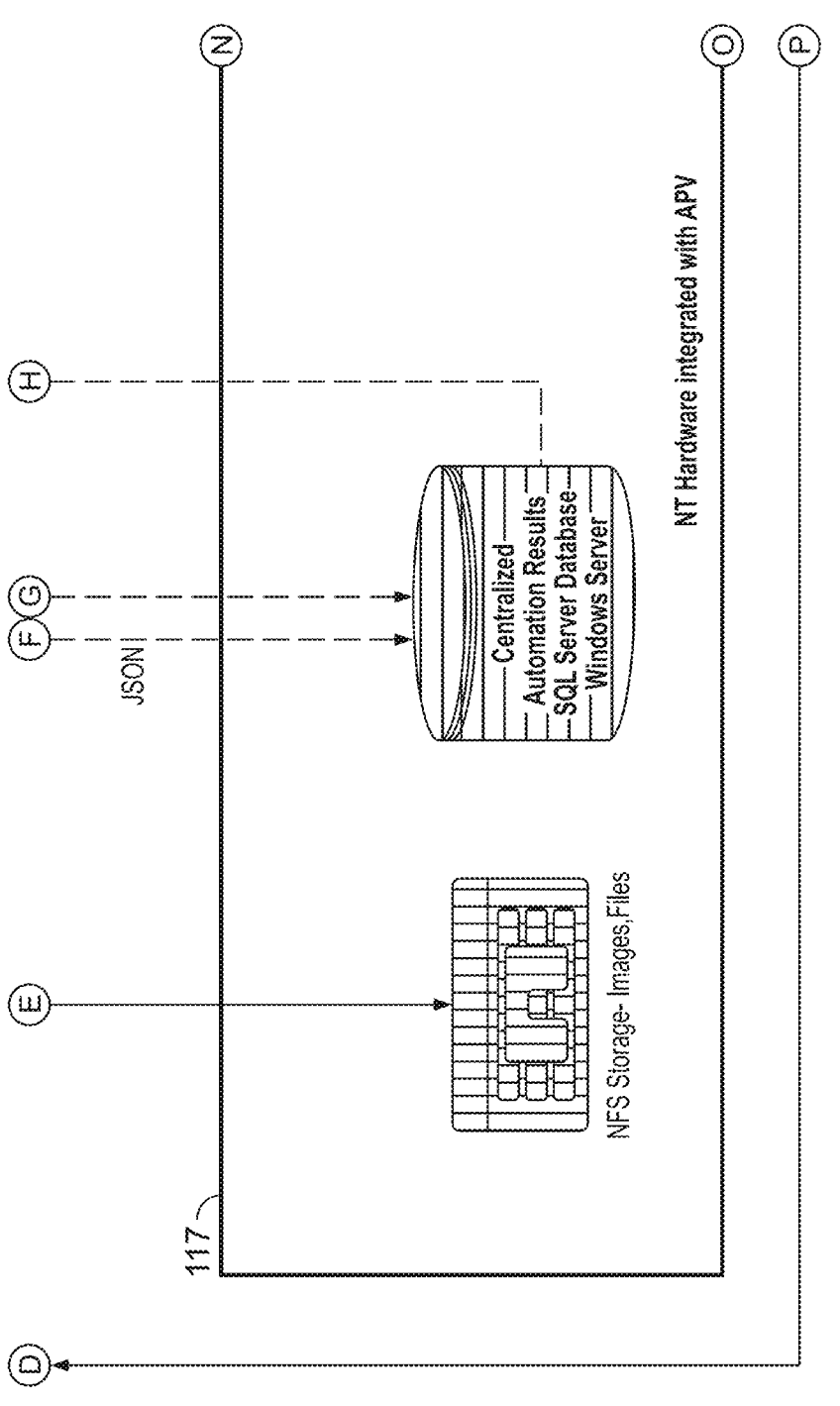
Figure 1D:
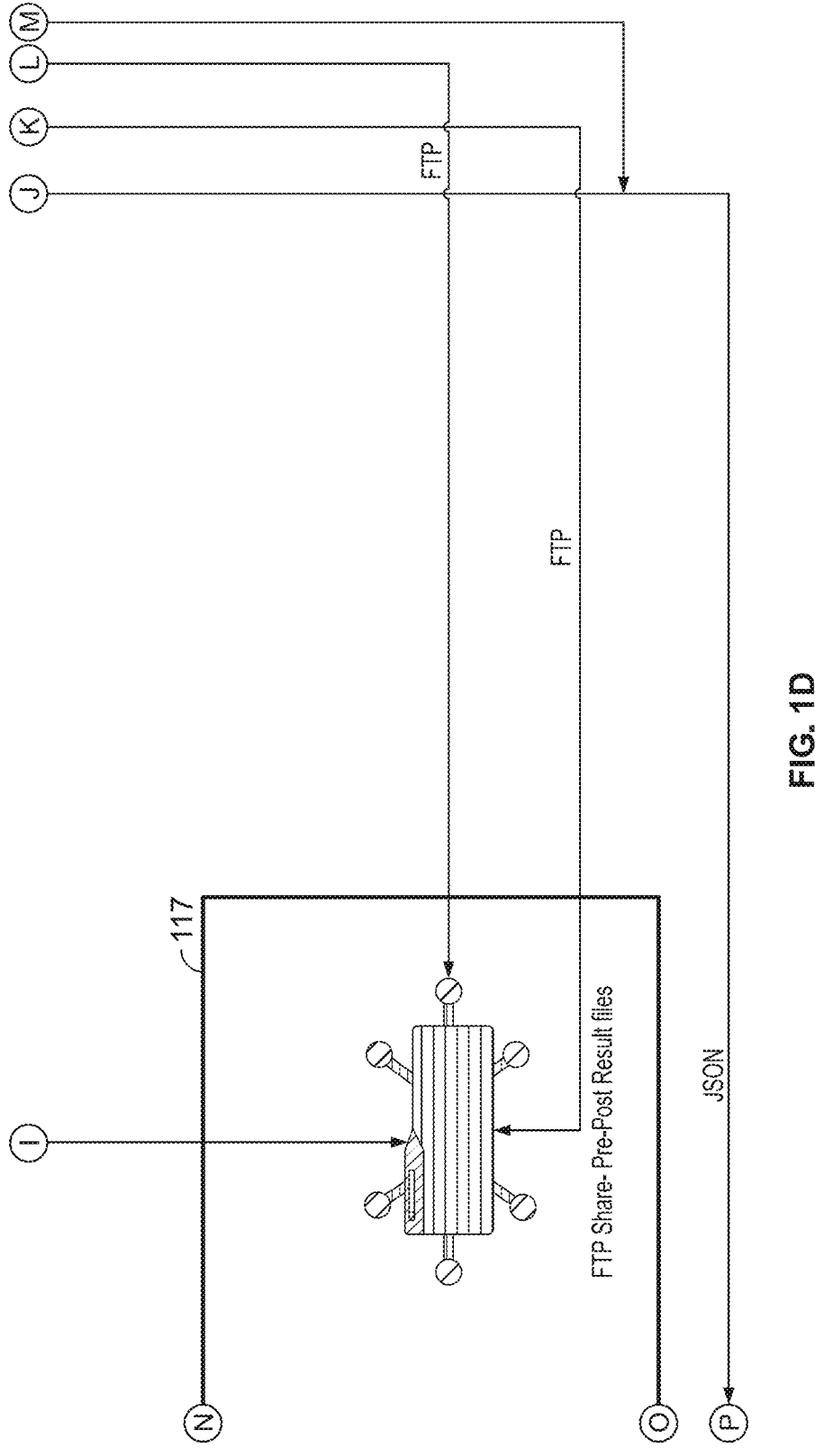

As explained above, this disclosure solves various technical problems referenced above by disclosing various hardware/software configurations that enable verification of stability of production environments. These configurations are technologically advantageous and improve functioning of computers, because these configurations minimize interference with or disruption of business operations in production environments, while allowing non-technical personnel to perform due diligence of various IT equipment in such environments and enabling iterative feedback to allow for identification of gaps in such diligence.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Features described with respect to certain embodiments may be combined in or with various other embodiments in any permutational or combinatory manner. Different aspects or elements of example embodiments, as disclosed herein, may be combined in a similar manner. The skilled artisan will understand that typically there is no limit on the number of items or terms in any combination, unless otherwise apparent from the context.

Hereby, all issued patents, published patent applications, and non-patent publications (including identified articles, web pages, websites, product references and manuals thereof) that are mentioned in this disclosure are herein incorporated by reference in their entirety for all purposes, to same extent as if each individual issued patent, published patent application, or non-patent publication were specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

FIGS. 1A-1D show a schematic diagram of an embodiment of a network topology according to this disclosure. In particular, there is a network topology 100 including a user terminal 102, a cloud 102, a cloud 103, a cloud 104, a logical grouping 105, a server 106, an application program 107, an application program 108, an application program 109, a data store 110, a server 111, a server 112, a set of physical machines 113, a logical grouping 114, a logical grouping 115, a logical grouping 116, and a logical grouping 117, which are enabled to suitably communicate with each other as shown in FIGS. 1A-1D through various types of protocols/connections (e.g., a Hypertext Transfer Protocol (HTTP), a HTTP-Secure (HTTPS) protocol, a Java Database Connectivity (JDBC) connection, a Windows Remote Management (WinRM) connection, a Secure Socket Shell (SSH) protocol, a File Transfer Protocol (FTP) protocol), files (e.g., a JavaScript Object Notation (JSON) file, an Extensible Markup Language (XML) file), and other techniques. At least two of these components of FIGS. 1A-1D, may be hosted in a single data center or distributed among a set of data centers.

Each of the user terminal 101, the cloud 102, the cloud 103, and the cloud 104 is external to the logical grouping 105, the logical grouping 114, the logical grouping 115, and the logical grouping 116. The logical grouping 105 logically contains the server 106, the application program 107, the application program 108, the application program 109, the data store 110, the server 111, the server 112, and the set of physical machines 113. The logical grouping 114 is logically interposed between the logical grouping 105 and each of the logical grouping 115 and 116.

The user terminal 101 is a computing terminal operated by a user through a user profile (e.g., an administrator user profile, a technician user profile, a business user profile). For example, the user terminal 101 may be a desktop computer, a laptop computer, a tablet computer, or another suitable computing form factor. The user terminal 101 hosts an operating system (OS) and an application program running on the OS. For example, the OS may include a Windows OS, a MacOS, an iOS, a Linux OS, or another suitable OS. Likewise, the application program may be a web browser or have a web browsing capability. For example, the web browser may be Microsoft Edge, Google Chrome, Mozilla Firefox, Amazon Silk, Apple Safari, or another suitable browsing form factor.

The cloud 102 is a cloud computing instance (e.g., hosted by a group of physical or virtual servers in a data center) operating as a platform-as-a-service (PAAS) hosted on a configuration management database (CMDB), which is exemplified as a Service Now Cloud service hosting a database (e.g., a relational database, a graph database, NoSQL database, a MySQL database), although other suitable variants are possible. For example, the CMDB may contain Configuration Items (CIs), which may be individual entities within an IT environment (e.g., a production environment), such as physical or virtual servers, applications, networking equipment, and more. Likewise, the CMDB may contain information (e.g., its usage history, location, owner, function, and relationships with other assets) on associations or relationships between different hardware and software components of a computing environment, version control for tracking changes over time, incident and problem management integration, asset discovery, and other suitable content, which may involve metadata defining attributes based on CI category. For each component shown in FIGS. 1A-1D, to enable various algorithms disclosed herein, the cloud 102 operates as a cloud-based workflow automation platform that unifies information (IT) needs into a single platform for improved service delivery, which may include provisioning of logical groupings, creating cloud resources in real-time, and offers governance rule to prevent uncontrolled cloud spending. For example, the cloud 102 may streamline certain operations by consolidating user profiles as teams, data, and processes on a single platform, automating manual tasks, and providing an intelligent platform for digital transformation, while also defining, managing, automate, or structuring IT services, allowing user profiles to raise and track tickets, process service requests, incidents, changes, problems, and more.

The cloud 103 is a cloud computing instance (e.g., hosted by a group of physical or virtual servers in a data center) operating as a PAAS hosted on a database (e.g., CMDB, relational, graph), which is exemplified as a Dynatrace Cloud, although other suitable variants are possible, enabling one agent program per server shown in FIGS. 1A-1D. For each component shown in FIGS. 1A-1D, to enable various algorithms disclosed herein, the cloud 103 operates as a platform for cloud monitoring and observability. For example, the cloud 103 enables monitoring enables observation, measurement, analysis, and management of an IT stack, as manifested by unified stack observability, automation (e.g., detect anomalies, perform root-cause analysis, predict and prevent security breaches, optimize performance), scalability (e.g., host management, analytics and automation for pre-production and production environments).

The cloud 104 is a cloud computing instance (e.g., hosted by a group of physical or virtual servers in a data center) operating as a PAAS hosted on a database (e.g., CMDB, relational, graph), which is exemplified as a GitHub in Cloud, although other suitable variants are possible, receiving, storing, sending, creating, editing, or deleting templates, automation scripts, or other forms of suitable executable software logic, as needed, for each component shown in FIGS. 1A-1D, to enable various algorithms disclosed herein. For example, the cloud 104 enables a web-based version control and collaboration platform for software developers, having a code management system, enabling developers to store code, track changes, and collaborate effectively.

The logical grouping 105 is an organization of computers (e.g., physical or virtual) and computer resources (e.g., physical, virtual, hardware, software, servers, databases, applications, networking equipment/software, securing equipment/software, routers, switches, modems) in a way that facilitates an efficient form of management of these resources and user access thereto, rather than their physical arrangement or independent from physical layout. For example, there may be a grouping of applications running on computers from one or more hosts to simplify management tasks and apply common policies, which may be helpful for backup plans, managing data capture, and performing operations on images of each application within each individual group. For example, the logical grouping 105 may be grouped by network/domain, function/department, access privilege, virtual machines/containers, OS/software, or other suitable logical groupings. For example, the logical grouping 105 can be located in a single data center or distributed among a set of data centers. Note that the logical grouping 105 may or may not be identical to a physical grouping of computers and computer resources. For example, the logical grouping 105 provides a logical structure that may be more easily modified or adapted as business requirements change, without necessarily impacting whatever underlying physical storage involved, which can be optimized for security (e.g., segmentation or isolation of zones), incident response, access control, performance, usability, compliance management, and maintainability, without being constrained by physical storage limitations. For example, various techniques (e.g., normalization, denormalization) can be applied to data at logical level to improve data integrity and query performance, while improving reusability and portability. The logical grouping 105 logically contains the server 106, the application program 107, the application program 108, the application program 109, the data store 110, the server 111, the server 112, and the set of physical machines 113. The logical grouping 105 may be hosted in a single data center or distributed among a set of data centers.

The server 106 is a physical or virtual server hosting an OS and an application program running thereon, which is enabled to perform various algorithms disclosed herein using various components shown in FIGS. 1A-1D. For example, the server may an application server enabling server-side application code and facilitating interaction between end-user clients and server-side application logic, which may enable dynamic content generation and supporting business logic to provide specialized functionality offered by a business or service, as disclosed herein. The server may handle tasks like clustering, fail-over, load balancing, and feature various communication protocols beyond HTTP to interact with clients and other software components, as disclosed herein. For example, the OS may include a Windows OS, a MacOS, an iOS, a Linux OS, or another suitable OS. Likewise, the application program may be a Java Enterprise Edition (Java EE) application, a .NET application, a PHP application, a Node.Js application, a Python application, or another suitable application. As shown in FIGS. 1A-1D, the application program is the application program 107, the application program 108, and the application program 109, which communicate as shown in FIGS. 1A-1D. The application 108 feeds data to the application 109, which parses such data and then feed such data as parsed to the logical grouping 117 (e.g., for FTP sharing) or various services associated with the application 107 or the application 108. The data store 110 is a storage of data, which may be a data file (e.g., a spreadsheet file, a flat file) or a database (e.g., CMDB, relational, graph) storing data sent from the logical grouping 117 (e.g., a database application hosted on a server). As shown in FIGS. 1A-1D, the server 106 hosts the application 107, the application 108, the application 109, and the data store 110.

The server 111 is a physical or virtual server hosting an OS, an application program running on the OS, and a database stored on the OS, which are enabled to perform various algorithms disclosed herein using various components shown in FIGS. 1A-1D. The application program may be a database management system (DBMS) managing the database. For example, the DBMS may include Microsoft SQL Server (relational), Oracle DBMS (multi model), or other suitable DBMS. The database (e.g., CMDB, relational, graph) is storing a set of records (e.g., each may have a set of fields) and feeds the application 107, the application 108, or the application 109, as managed via the DBMS, as shown in FIGS. 1A-1D, where each of such applications 107-109 is enabled via the DBMS to create, read, write, modify, delete, update, sort, or perform other operations with the set of records, as shown in FIGS. 1A-1D. The server 111 may be a database server and the database may be hosted on the database server, which is dedicated to providing database services, as disclosed herein pursuant to FIGS. 1A-1D. For example, the database may be a back-end database application operated via the DBMS, each hosted by the database server, which receives requests from various components shown in FIGS. 1A-1D, searches for requested data, and passing results back to various components requesting such data, as disclosed herein pursuant to FIGS. 1A-1D.

The server 112 is a physical or virtual server hosting an OS and an application program running thereon, which is enabled to perform various algorithms disclosed herein using various components shown in FIGS. 1A-1D. For example, the server may an application server enabling server-side application code and facilitating interaction between end-user clients and server-side application logic, which may enable dynamic content generation and supporting business logic to provide specialized functionality offered by a business or service, as disclosed herein. The server may handle tasks like clustering, fail-over, load balancing, and feature various communication protocols beyond HTTP to interact with clients and other software components, as disclosed herein. For example, the OS may include a Windows OS, a MacOS, an iOS, a Linux OS, or another suitable OS. Likewise, the application program may be an automation server program used for building, testing, and deploying software. The automation server program can function as a simple Continuous Integration (CI) server or be expanded into a continuous delivery hub for projects, with a web interface for easy setup and configuration. The automation server program is programmed to run scripts for various purposes, such as automation, job configuration, and build and deployment automation. For example, if the automation server program is a Jenkins server program, as shown in FIGS. 1A-1D, then Groovy scripts can be used to define and execute custom scripts using Groovy programming language. These scripts can configure jobs programmatically, automate build and deployment processes, and extend functionality by interacting with plugins. For example, if the automation server program is a Jenkins server program, as shown in FIGS. 1A-1D, then Groovy scripts offer flexibility, control, and the ability to streamline CI workflows by tailoring Jenkins server program to specific needs, such as for pipeline automation, defining complex workflows, setting build parameters, and integrating with external tools or programming interfaces. Note that the automation server is not limited to the Jenkins server program or Groovy scripts and can be another suitable automation server or other language scripts (e.g., Perl, Python, JavaScript). For example, the automation server may include, enable or be embodied as a continuous integration and deployment server program (e.g., GitHub Actions). For example, the automation server may include one or more automated task execution systems in distributed version control environments to provide a computing framework for defining, sharing, and executing reusable code units that perform specific operations within a larger workflow. These systems integrate directly with the version control platform, allowing for seamless automation of software development processes. The core components include executable code units, workflow definitions, and execution environments. Executable code units are self-contained, modular pieces of code designed to perform discrete tasks. Workflow definitions are configuration files that specify a series of jobs and steps to be executed upon certain triggering events. The execution environment serves as a runtime context in which the code units are executed, which can be either a virtual machine or a containerized environment. These systems are characterized by language independence, supporting multiple programming languages and enabling developers to write executable code units in their preferred language. These systems employ an event-driven architecture, where workflows are triggered by specific events in the version control system, such as code commits, pull requests, or issue creation. These systems also feature parameterization, allowing executable code units to accept input parameters for dynamic configuration at runtime. State management capabilities maintain state between different steps in a workflow, enabling data to be passed between executable code units. Additionally, these systems handle artifacts, providing capabilities for generating, storing, and sharing build outputs and test results between jobs and workflows. Executable code units can be implemented using two primary methods: script-based and container-based. Script-based implementations involve writing code units as scripts in languages such as JavaScript, Python, or Shell. Container-based implementations package more complex executable code units as container images, providing isolated and reproducible execution environments. A typical workflow in these systems may include trigger definitions, job definitions, and step definitions. Trigger definitions specify the events that initiate the workflow, job definitions group steps that execute on the same runner, and step definitions outline individual tasks within a job, which can be shell commands or references to executable code units. These automated task execution systems offer extensive integration capabilities, including API interaction for communicating with the version control system's API and external third-party services. They also provide secure storage and retrieval of sensitive information for use in workflows and support matrix builds for running jobs across multiple operating systems or language versions simultaneously. The systems are highly extensible, allowing developers to create and share their own specialized code units and often featuring marketplace integration for discovering and distributing pre-built executable code units. By providing a flexible, scalable, and integrated approach to continuous integration, continuous delivery, and other custom automation tasks within the version control ecosystem, these systems significantly enhance software development workflows.

The automation server program may have a controller program operating as a main node, to administer various agent programs, schedules jobs on agent programs, and monitors their work. Further, the automation server program may communicate with node programs running on physical machines or virtual machines, where build agent programs run. The node programs may be monitored by the automation server program for various parameters like disk space, response time, or other suitable parameters. The node programs may be built-in nodes within the controller program or agent programs connected to the controller program. Also, there may be agent programs that manage task execution on behalf of the controller program using executor programs. The agent programs may be client processes (e.g., Java) that connect to the controller program and can run on different OSs. The agent programs can be launched in physical machines, virtual machines, Kubernetes clusters, or with Docker images. The executor programs may be slots for task execution within a respective agent program. The number of executor programs determines how many concurrent tasks can run, affecting the number of concurrent pipeline stages that can execute simultaneously. As such, the automation server program may orchestrate tasks, node programs may be where agent programs run, agent programs may execute tasks on behalf of the controller using executor programs, and executor programs determine the concurrency of task execution on a respective node. As shown in FIGS. 1A-1D, the set of physical machines 113 is a set of physical servers operated by the user through the user profile (e.g., an administrator user profile, a technician user profile, a business user profile). Each physical server of the set of physical servers may host an OS and an application program running on the OS. For example, the OS may include a Windows OS, a MacOS, an iOS, a Linux OS, or another suitable OS. Likewise, the application program may be a node program in which an agent program is running to perform a task based on an executor program.

The logical grouping 114 is an organization of computers (e.g., physical or virtual) and computer resources (e.g., physical, virtual, hardware, software, servers, databases, applications, networking equipment/software, securing equipment/software, routers, switches, modems) in a way that facilitates an efficient form of management of these resources and user access thereto. For example, there may be grouping applications from one or more hosts to simplify management tasks and apply common policies, which may be helpful for backup plans, managing data capture, and performing operations on images of each application within each individual group. The logical grouping 114 may be hosted in a single data center or distributed among a set of data centers. The logical grouping 114 logically contains automation tools used for managing IT infrastructure for two different OS (e.g., Windows and Linux), exemplified as Ansible and AWX. These tools may be operated via a command-line tool (e.g., Ansible) a graphical user interface (GUI) for easier infrastructure management (e.g., AWX).

The logical grouping 115 is an organization of computers (e.g., physical or virtual) and computer resources (e.g., physical, virtual, hardware, software, servers, databases, applications, networking equipment/software, securing equipment/software, routers, switches, modems) in a way that facilitates an efficient form of management of these resources and user access thereto. For example, there may be grouping applications from one or more hosts to simplify management tasks and apply common policies, which may be helpful for backup plans, managing data capture, and performing operations on images of each application within each individual group. The logical grouping 115 may be hosted in a single data center or distributed among a set of data centers. As shown in FIGS. 1A-1D, the logical grouping 114 communicated with the logical grouping 115, where the logical grouping 115 logically contains a set of jump servers, also known as a jump box or jump host, each of which is an intermediary device that facilitates secure access between different security zones on a network or among logical groupings shown in FIGS. 1A-1D, acting as a controlled gateway, allowing users to connect from one network and then "jump" to another network, providing an additional layer of security by serving as a centralized point for authentication and access control. Such usage is helpful for security management, administrative access, and creating audit trails of user activities, which may involve hardening and monitored devices that separate internal workstations from private servers, enhancing security by reducing at least one attack point. Each jump server in the set of jump servers may communicate via a Windows Remote Management (WinRM) protocol, which may be built into a Windows OS installation (e.g., called via a command-line prompt and having an scripting API for managing servers and client machines remotely), or a suitable alternative, to facilitating various exchanges (e.g., via HTTP or HTTPS) of management information across IT infrastructures, through a SOAP-based, firewall-friendly protocol, enabling tasks like executing commands, running scripts, and accessing management data for local or remote machines, and helpful in automating server management tasks and seeking data for management applications, as disclosed herein. As such, the automation tools of the logical grouping 114 corresponding to one OS of the logical grouping 114 communication with the set of jump servers of the logical grouping 114 via WinRM or another suitable protocol, to assist in various algorithms disclosed herein.

The logical grouping 116 is an organization of computers (e.g., physical or virtual) and computer resources (e.g., physical, virtual, hardware, software, servers, databases, applications, networking equipment/software, securing equipment/software, routers, switches, modems) in a way that facilitates an efficient form of management of these resources and user access thereto. For example, there may be grouping applications from one or more hosts to simplify management tasks and apply common policies, which may be helpful for backup plans, managing data capture, and performing operations on images of each application within each individual group. The logical grouping 116 may be hosted in a single data center or distributed among a set of data centers. The logical grouping 116 contains a set of servers mirroring all functionality of the logical grouping 115 but corresponding to the other OS of the logical grouping 114.

The logical grouping 117 is an organization of computers (e.g., physical or virtual) and computer resources (e.g., physical, virtual, hardware, software, servers, databases, applications, networking equipment/software, securing equipment/software, routers, switches, modems) in a way that facilitates an efficient form of management of these resources and user access thereto. For example, there may be grouping applications from one or more hosts to simplify management tasks and apply common policies, which may be helpful for backup plans, managing data capture, and performing operations on images of each application within each individual group. The logical grouping 117 may be hosted in a single data center or distributed among a set of data centers. The logical grouping 117 logically contains a database or a set of set databases (e.g., CMDB, relational, graph) storing a set of records (e.g., each may have a set of fields). The database or the set of databases is operative via the set of physical machines 113, as shown in FIGS. 1A-1D, where the automation server program may orchestrate tasks, node programs may be where agent programs run, agent programs may execute tasks on behalf of the controller using executor programs, and executor programs determine the concurrency of task execution on a respective node, and then feed such data into the database or the set of databases, as disclosed herein. In turn, the database or the set of databases may function as a data feed to the data store 110 from which the application 107, as disclosed herein. For example, such feeding of data into the database or the set of database may be due to the database or the set of database being programmed to create, read, write, modify, delete, update, sort, or perform other operations with the set of records, as disclosed herein. The database or the set of databases may be hosted on a database server or a set of database servers, each of which is dedicated to providing database services. For example, the database or the set of databases may be a back-end database application operated via a DBMS or a set of DBMSs, each hosted by the database server or the set of database servers, which receives requests from various components shown in FIGS. 1A-1D, searches for requested data, and passing results back to various components requesting such data.

FIG. 2 shows a flowchart of an embodiment of an algorithm for using an automation server in the network topology of FIGS. 1A-1D according to this disclosure. FIG.

3 shows a pair of screenshots 300A and 300B of an embodiment of a user interface used in the algorithm of FIG. 2 according to this disclosure. In particular, an algorithm 200 enables a creation of a job to automatically trigger a test case based on a set of end user parameter inputs and report results on production system stability. To do so, the algorithm 200 includes a set of blocks 202-220 which are performed via the network topology of FIGS. 1A-1D, as described above. To perform the algorithm 200, the user terminal 101 hosts the browser and the logical grouping 105 contains the first server 106, the second server 111, the third server 112, and the set of node programs running on the set of physical machines 113. The first server 106 hosts the application program 107, the second server 111 hosts the database, and the third server 112 hosts the automation server program hosting a pipeline of scripts. As shown in FIGS. 1A-1D, the set of node programs running on the set of physical machines 113 excludes the user terminal 101, the first server 106, the second server 111, and the third server 112. The set of node programs hosts the set of agents, where the set of agents is controlled by the application program 107. The user terminal 101 is external to the logical grouping 105 and the application program 107 is programmed to perform or enable the set of blocks 202-220 to be performed.

In block 202, the application program 107 receives a request (e.g., a message, an instruction) placed by the user from the browser of the user terminal 101 (e.g., a viewport), presents a hyperlink (e.g., a Uniform Resource Locator) to the browser responsive to the request, and presents a user interface to the browser responsive to the hyperlink being activated by the user from the browser, which is technically advantageous for non-technical personnel due to widespread knowledge of browser usage and for technical personnel due to lack of dedicated application programs to maintain. For example, the request and the hyperlink may be provided via a web portal enabled by the server 106. The user interface may be a single screen or a set of screens that are consecutive (e.g., wizard). For example, the user interface may be a graphical user interface (GUI), a web user interface (WUI), a menu driven interface (MDI), or another suitable user interface.

Figure 3:
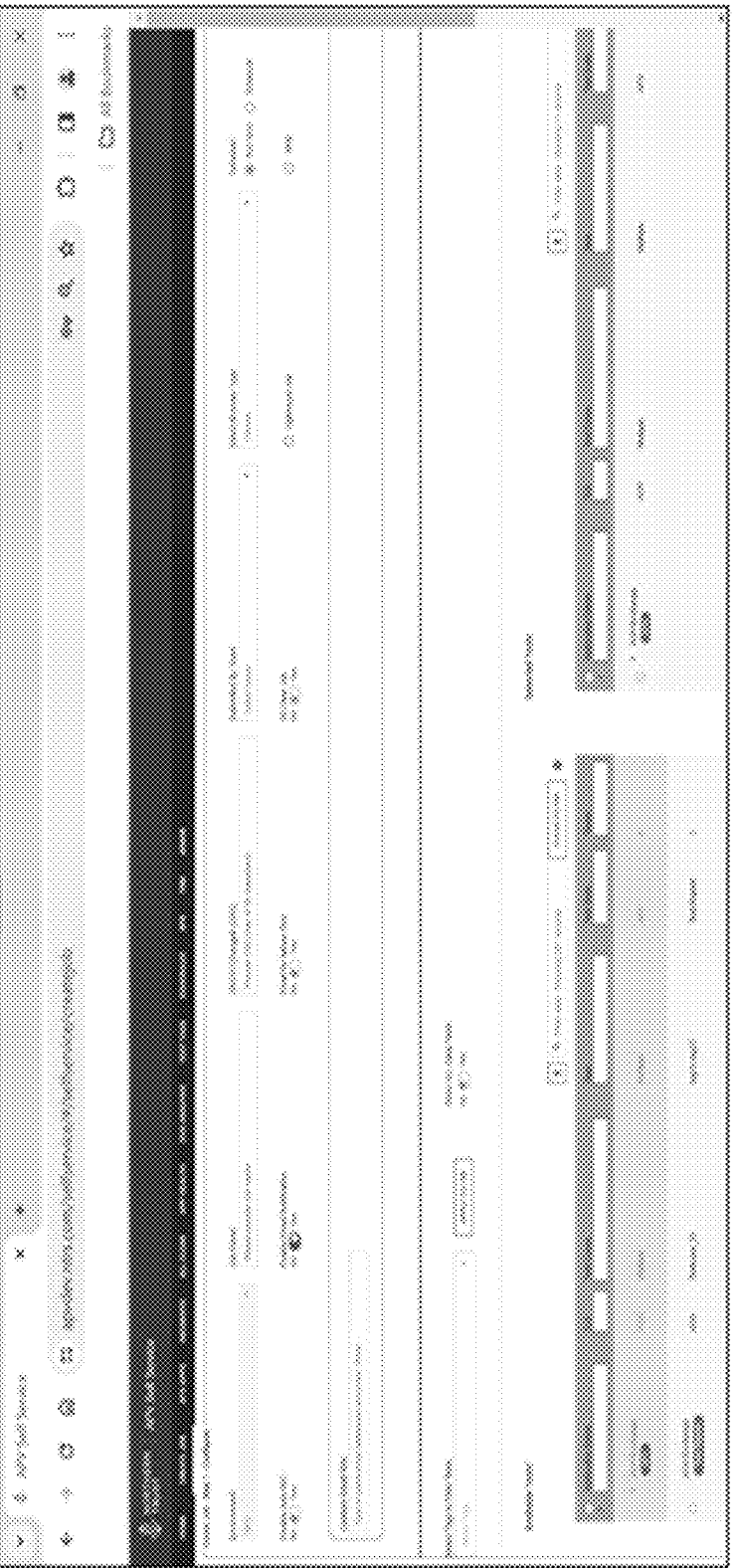
FIG. 3 shows a set of screenshots of an embodiment of a user interface used in the algorithm of FIG. 2 according to this disclosure.

In block 204, as shown in FIG. 3A, the user interface is programmed to enable the user to input a set of parameters (e.g., alphanumeric or Boolean strings) for a test case job to run on-demand (e.g., now) or according to a schedule (e.g., hourly, daily, weekly, weekly custom, or monthly), such that the application program 107 receives the set of parameters, which may be via the web portal enabled by the server 106. The set of parameters includes a set of logical dependencies (e.g., software requirements, availability of test harness) for a set of execution configurations (e.g., test ids, duration of test, recurrence pattern, frequency of recurrence) of a computing infrastructure (e.g., a production environment) external to the logical grouping 105. For example, the computing infrastructure may include at least one of the logical grouping 114, the logical grouping 115, the logical grouping 116, or the logical grouping 117. Note that a test case job may be a job (e.g., a unit of work or execution containing of tasks or steps that perform specific functions) programmed to perform a set of actions performed on at least one of the logical grouping 114, the logical grouping 115, the logical grouping 116, or the logical grouping 117 to assess if the logical grouping meets hardware/software requirements and functions correctly, which is useful in software testing to ensure an optimal quality and reliability of software being developed. For example, the test case job may review hardware/software specifications/settings, execute test plans and test cases, identify defects, document findings, manage test execution to ensure adherence to a preset test plan, design test case scenarios, conduct thorough testing, and prepare detailed reports on what was tested. FIG. 3B shows an existence of an entry with the set of parameters.

In block 206, the application program 107 submits the set of parameters to the database (e.g., relational) hosted on the server 111 for storage, according to its schema, responsive to receiving the set of parameters. For example, the application program 107 may form a copy of the set of parameters and instruct the DBMS on the server 111 to write the copy of the set of parameters into a set of fields of a record of the database, where the database (e.g., relational) is hosted on the server 111, according to its schema, whether the record is a new record or a preexisting record. The application program 107 may form the copy of the set of parameters and then format the copy of the set of parameters for compliance with the DBMS on the server 111, where the DBMS ensures schema compliance. The set of parameters may be provided in a JSON or XML format before the set of results are submitted to the database for storage where the database (e.g., relational) is hosted on the server 111.

In block 208, the application program 107 scans the database (e.g., relational) hosted on the second server 111 (via the DBMS on the server 111) continuously to determine (e.g., by matching in value) whether the set of parameters should be retrieved from the database according to the schedule, where the database (e.g., relational) is hosted on the server 111. The continuous scan occurs on a set of records including a set of fields. As such, the continuous scan may be field-by-field, record-by-record, for every occurrence or recurrence of a discrete measurement of time (e.g., second or seconds, minute or minutes, hour or hours, day or days, week or weeks, month or months, quarter or quarters) during a time period (e.g., second or seconds, minute or minutes, hour or hours, day or days, week or weeks, month or months, quarter or quarters). For example, for an instance of such scanning, there may be a start time, start date, end time, end date, duration, recurrence pattern, frequency of recurrence, and end of recurrence, whether by date, after a set of occurrences, or no end date.

In block 210, the application program 107 determines (e.g., start time, end time, scheduler name) whether the set of parameters should be retrieved (via the DBMS on the server 111) from the database according to the schedule, where the database (e.g., relational) is hosted on the server 111, i.e., the date and time has arrived to retrieve the set of parameters. If yes, then block 212 is performed. If no, then block 208 is performed.

In block 212, based on the application program 107 determining (e.g., application names, automation server pipeline path, test cases, unique run id) that the set of parameters should be retrieved from the database according to the schedule, where the database (e.g., relational) is hosted on the server 111, i.e., the date and time has arrived to retrieve the set of parameters, the application program 107 retrieves (via the DBMS on the server 111) the set of parameters from the database according to the schedule and forms a copy of the set of parameters therefrom, where the database (e.g., relational) is hosted on the server 111.

In block 214, the application program 107 submits the copy of the set of parameters to the automation server program running on the server 112, such that (1) the automation server program activates the pipeline of scripts based on the copy of the set of parameters, (2) the pipeline of scripts activates the set of agents, and (3) the set of agents executes a set of test cases on the set of nodes. The third server 112 hosts the automation server program hosting the pipeline of scripts. The set of node programs hosts the set of agents, where the set of agents is controlled by the application program 107, and the set of node programs runs on the set of physical machines 113 (e.g., on top of respective OSs). The set of test cases is sourced from the pipeline of scripts, where the set of test cases includes the test case job itself or copies thereof formed before block 214 is performed or at runtime when block 214 is performed. The copy of the set of parameters may be submitted to the automation server program in parallel (e.g., expedite processing) or in series (e.g., to manage bandwidth). The automation server program may activate the pipeline of scripts based on the copy of the set of parameters in parallel (e.g., to expedite processing) or in series (e.g., to manage bandwidth). The pipeline of scripts and the copy of the set of parameters may have a many-to-many correspondence with each other. The pipeline of scripts may activate the set of agents in parallel (e.g., to expedite processing) or in series (e.g., to manage bandwidth). The pipeline of scripts and the copy of the set of parameters may have a many-to-many correspondence with each other. The set of agents may execute the set of test cases on the set of nodes in parallel (e.g., to expedite processing) or in series (e.g., to manage bandwidth). The set of agents and the set of test cases may have a many-to-many correspondence with each other.

In block 216, the application program 107 receives a set of results for the test cases from the set of agents, which occurs through the set of node programs running on the set of physical machines 113, i.e., the set of results is sent by the set of physical machines 113. The set of results can be a single data file (e.g., a spreadsheet file, a flat file) or a set of data file (e.g., spreadsheet files, flat files), which may follow a preset naming convention. The set of results includes alphanumeric data and may include imagery (e.g., graphics). The set of results details how the set of test cases was executed on at least one of the logical grouping 114, the logical grouping 115, the logical grouping 116, or the logical grouping 117. The set of results may be a set of stability results for a production environment external to the computing terminal 101 and the logical grouping 105. The production environment may include at least one of the logical grouping 114, the logical grouping 115, the logical grouping 116, or the logical grouping 117.

In block 218, the application program 107 submits the set of results to the database for storage, according to its schema, where the database (e.g., relational) is hosted on the server 111, such that the set of results are associated (e.g., related by a primary key) with the set of parameters in the database (e.g., relational) is hosted on the server 111, responsive to receiving the set of results from the set of agents. The set of results can be stored in a single record in the database (e.g., relational) is hosted on the server 111 together with the set of parameters, from block 206, or the set of results can be stored in one record in the database (e.g., relational) is hosted on the server 111 and the set of parameters can be stored in another record in the database (e.g., relational) is hosted on the server 111, where the these two records are related to each other (e.g., via a primary key). For example, the application program 107 may form a copy of the set of results and instruct the DBMS on the server 111 to write the copy of the set of results into a set of fields of a record of the database, according to its schema, where the database (e.g., relational) is hosted on the server 111, whether the record is a new record or a preexisting record. The application program 107 may form the copy of the set of results and then format the copy of the set of results for compliance with the DBMS on the server 111, where the DBMS ensures schema compliance. The set of results for the test cases is provided in a JSON or XML format before the set of results is submitted to the database for storage, where the database (e.g., relational) is hosted on the server 111.

In block 220, the application program 107 takes an action based on the set of results being associated with the set of parameters in the database, where the database (e.g., relational) is hosted on the server 111, where the action is with respect to a production environment external to the logical grouping 105 and the computing terminal 101. The production environment may include at least one of the logical grouping 114, the logical grouping 115, the logical grouping 116, or the logical grouping 117. The action may include to read stop, pause, start, or modify the production environment, whether on a hardware or software level. The action may include determining whether the set of results satisfy a threshold (e.g., a performance threshold for hardware/software) for the set of parameters (or copy thereof) and presenting (i) a first content (e.g., alphanumerics, imagery) on the browser of the user terminal 101 based on the set of results satisfying the threshold for the set of parameters (or copy thereof), where the first content indicates so, or (ii) a second content (e.g., alphanumerics, imagery) on the browser of the user terminal 101 based on the set of results not satisfying the threshold for the set of parameters (or copy thereof), where the second content indicates so. The action may include at least one of enabling the user to navigate the browser of the user terminal 101 to (a) view the schedule submitted by the user (or copy thereof) or (b) view the set of results (or copy thereof) retrieved from the database based on the set of parameters, where the database (e.g., relational) is hosted on the server 111. The set of parameters may include a job identifier and a run identifier associated with the job identifier, which may be related to the test case job.

Note that based on the application program 107 determining (e.g., start time, end time, scheduler name) that the set of parameters should not be retrieved from the database according to the schedule, the application program 107 continues to scan the database continuously to determine whether the set of parameters should be retrieved from the database according to the schedule, as per blocks 208-210.

Resultantly, there is a system that comprises a terminal with an OS and a browser application, along with a logical grouping containing three servers and a set of nodes. The first server hosts an application program, the second server hosts a database, and the third server hosts an automation server program with a pipeline of scripts. The set of nodes, which excludes the terminal and the three servers, has its own set of OSs and agents controlled by the application server program. The application program is designed to receive user requests from the browser application and present a hyperlink (e.g., a Uniform Resource Locator) in response. When the user activates this hyperlink, a user interface is presented, allowing the input of parameters for a test case job that can run on-demand or according to a schedule. The instructional content and parameters are then submitted to the database for storage. The application program continuously scans the database to determine if the instructional content and parameters should be retrieved according to the schedule. If retrieval is determined, then the program retrieves the content and parameters and submits them to the automation server program. This activates the pipeline of scripts, which in turn activates the set of agents to execute test cases on the set of nodes. The schedule for retrieval can be set to various intervals: hourly (at specified intervals, e.g., every 4 hours), daily (at a particular time e.g., at 10 am ET), weekly (on a specific day and time e.g., every Thursday at 2 pm PT), weekly custom (on selected days and times), or monthly (on a particular day and time each month e.g., every first Monday in February at 5 pm CT). After the test cases are executed, the application program receives the results from the agents, submits them to the database for storage, associating them with the instructional content and parameters. Based on these results, a computing action is taken. If the instructional content and parameters are not to be retrieved according to the schedule, then the application program continues to scan the database to determine if retrieval should occur at a later time. This system allows for automated, scheduled testing based on user-defined parameters, with results stored and associated with the original instructions, enabling efficient and customizable production system stability testing.

Therefore, the algorithm 200 solves the technical problems pertaining to the automation and orchestration of test case execution within a distributed computing infrastructure exemplified by FIGS. 1A-1D. Traditional methods of running test cases often involve manual intervention, which can be time-consuming, prone to errors, and inefficient, especially when dealing with complex dependencies and schedules. Additionally, ensuring that test cases are executed consistently and results are accurately recorded and acted upon in a timely manner presents significant challenges. These inefficiencies can lead to delays in the development and deployment cycles, impacting the overall productivity and reliability of software systems. The algorithm 200 addresses these issues by implementing a comprehensive automation framework that integrates various servers and nodes to streamline the execution of test cases. As exemplified by FIGS. 1A-1D, the system comprises a computing terminal hosting the browser, through which users can interact with the application hosted on the first server. This application allows users to input parameters for test case jobs, which are then stored in the database hosted on the second server. The automation server on the third server continuously scans the database to retrieve and execute these test-case jobs according to specified schedules. The automation server activates the pipeline of scripts that control agents distributed across the set of nodes, ensuring that test cases are executed as per the defined parameters. Results from these test cases are then stored back in the database and associated with the corresponding parameters, allowing for subsequent actions to be taken in a production environment. This automated, scheduled, and parameter-driven approach significantly reduces manual effort, minimizes errors, and enhances the efficiency and reliability of test case execution in distributed computing environments.

Figure 4:
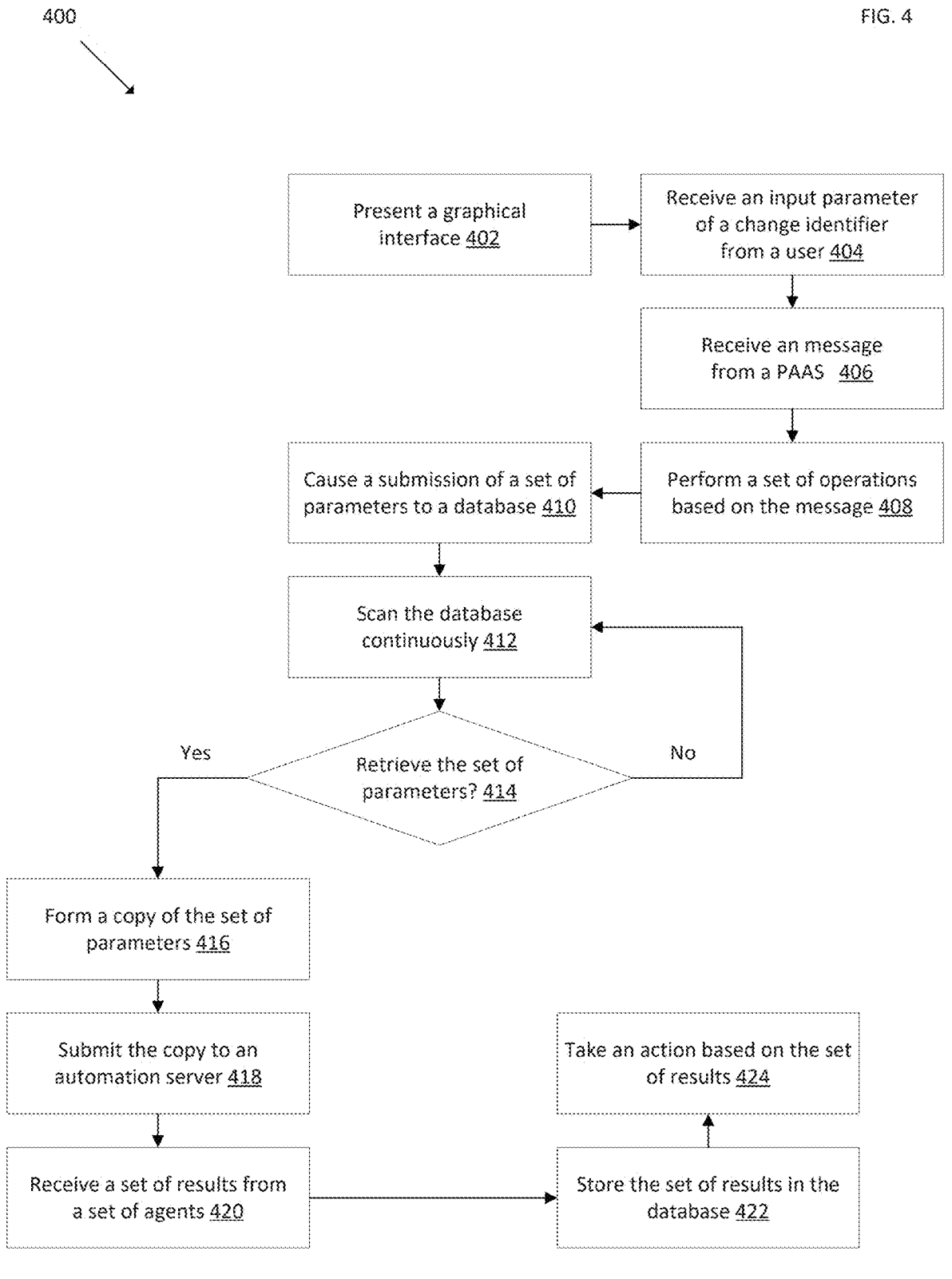
FIG. 4 shows a flowchart of an embodiment of an algorithm for using an automation server and a platform-as-a-service hosted on a configuration management database in the network topology of FIGS. 1A-1D according to this disclosure.
Figure 5:
FIG. 5 shows a set of screenshots of an embodiment of a user interface used in the algorithm of FIG. 3 according to this disclosure.

FIG. 4 shows a flowchart of an embodiment of an algorithm for using an automation server and a platform-as-a-service hosted on a configuration management database in the network topology of FIGS. 1A-1D according to this disclosure. FIG. 5 shows a set of screenshots 500A and 500B of an embodiment of a user interface used in the algorithm of FIG. 3 according to this disclosure. In particular, an algorithm 300 enables an automated change intelligence and smart testing for applications. To do so, the algorithm 300 includes a set of blocks 402-424 which are performed via the network topology of FIGS. 1A-1D, as described above, employing a screen 500A and a screen 500B, each sourced from FIG. 5.

To perform the algorithm 300, the user terminal 101 hosts the browser and the logical grouping 105 contains the first server 106, the second server 111, the third server 112, and the set of node programs running on the set of physical machines 113. The first server 106 hosts the application program 107, the second server 111 hosts the database, and the third server 112 hosts the automation server program hosting a pipeline of scripts. As shown in FIGS. 1A-1D, the set of node programs running on the set of physical machines 113 excludes the user terminal 101, the first server 106, the second server 111, and the third server 112. The set of node programs hosts the set of agents, where the set of agents is controlled by the application program 107. The user terminal 101 is external to the logical grouping 105 and the application program 107 is programmed to perform or enable the set of blocks 402-424 to be performed. Note that the algorithm 300 may be performed before, during, or after the algorithm 200 has been, is being, or will be performed. Likewise, the algorithm 300 may be integrated with the algorithm 200 or vice versa to collectively form a single algorithm. Further, note that all relevant content presented on the user interface of the user terminal 101 in context of the algorithm 300 may be presented on a single screen or distributed a set of screens that are consecutive, either of which may include the screen 500A or the screen 500B.

In block 402, the application program 107 receives a request (e.g., a message, an instruction) placed by the user from the browser of the user terminal 101 (e.g., a viewport), presents a hyperlink (e.g., a Uniform Resource Locator) to the browser responsive to the request, and presents a user interface to the browser responsive to the hyperlink being activated by the user from the browser, which is technically advantageous for non-technical personnel due to widespread knowledge of browser usage and for technical personnel due to lack of dedicated application programs to maintain. For example, the request and the hyperlink may be provided via a web portal enabled by the server 106. The user interface may be a single screen or a set of screens that are consecutive (e.g., a software wizard). For example, the user interface may be a graphical user interface (GUI), a web user interface (WUI), a menu driven interface (MDI), or another suitable user interface.

In block 404, the application program 107 presents the user interface to receive an input parameter (e.g., an alphanumeric or Boolean string) of a change identifier (e.g., a change record number from a Service Now service) from the user identifying (e.g., by selecting, activating or opening a document (e.g., a text file, a word processor file) with details of a change) a change (e.g., a network switch upgrade, a Windows Patch installation across multiple servers) to a computing infrastructure (e.g., a production environment) external to the logical grouping 105, where the computing infrastructure contains a set of application programs (e.g., a microservice performs a search on a database server, a Java service processing message) having a set of application names (e.g., SharePoint, Confluence, GIT). For example, the computing infrastructure may include at least one of the logical grouping 114, the logical grouping 115, the logical grouping 116, or the logical grouping 117. For example, the application program 107 may receive the input parameter of the change identifier from the user via the web portal enabled by the server 106. For example, the input parameter may be a binary value or an alphanumeric string. For example, the change identifier stored in the database (e.g., relational) hosted on the server 111 may be a copy of the change identifier copied from the CMDB. For example, the change to the computing infrastructure external to the logical grouping 105 may be a configuration change for the computing infrastructure or a parameter change for the computing infrastructure.

In block 406, the application program 107 receives a message (e.g., impacted application identifiers (record) in JSON format) from the cloud 102 (e.g., a cloud computing instance operating as a PAAS hosted on a CMDB) for the logical grouping 105, where the cloud 102 is external to the user terminal 101 and the logical grouping 105. The message a contains a set of change details (e.g., change description, a risk identifier or level of risk, meta data of change record in JSON format) related to the change identifier sourced from the cloud 102 (e.g., the CMDB) based on the input parameter. The message a contains a set of impacted application details (e.g., names or identifiers such as SharePoint, Confluence, GIT) related to the change identifier sourced from the cloud 102 (e.g., the CMDB) based on the input parameter. The set of change details contains a change description (e.g., a network switch upgrade, a Windows Patch installation across multiple servers), a change start date, a change start time, a change end date, and a change end time. The set of impacted application details contains a set of identifiers (e.g., a set of alphanumeric strings) of the set of application programs impacted based on the change identifier (e.g., alphanumerics) and the set of application names. The set of change details is related (e.g., by a primary key) to the set of impacted application details (e.g., within the CMDB). For example, some content referenced in the block 406 is depicted in the screen 500A or the screen 500B.

In block 408, the application program 107 performs a set of operations based on the message (e.g., responsive to receipt of the message). In particular, the set of operations includes (a) querying the database (e.g., relational) hosted on the second server 111 for the set of application names based on the message (e.g., responsive to the message), (b) receiving a copy of the set of application names from the database (e.g., relational) hosted on the second server 111 responsive to such querying, (c) determining (e.g., application names from CMDB) whether the copy of the set of application names corresponds (e.g., matches in value) to the set of application names for the set of applications present in the computing infrastructure (e.g., at least one of the logical grouping 114, the logical grouping 115, the logical grouping 116, or the logical grouping 117), (d) presenting the set of names (or copies thereof) for the set of applications on the user interface based on the copy of the set of application names being determined to correspond (e.g., by matching in value) to the set of application names for the set of applications present in the computing infrastructure (e.g., at least one of the logical grouping 114, the logical grouping 115, the logical grouping 116, or the logical grouping 117), (e) querying the database (e.g., relational) hosted on the second server 111 for the change identifier, (f) receiving a copy of the change identifier from the database (e.g., relational) hosted on the second server 111, (g) attempting to validate (e.g., change identifier, job id combination) a schedule for a job (e.g., a preexisting job) based on the copy of the change identifier against the copy of the set of application name (e.g., by matching in value), and (h) fetching the schedule from the database (e.g., relational) hosted on the second server 111 based on the schedule being validated. For example, the schedule may include the change description, the change start date, the change start time, the change end date, or the change end time, as referenced above. For example, some content referenced in the block 406 is depicted in the screen 500A or the screen 500B.

In block 410, the application program 107 causes a submission of a set of parameters into the database (e.g., relational) hosted on the second server 111. This causation may include the application program 107 presenting the user interface on the browser of the user terminal 101 (e.g., a viewport) to the user to create and then submit a new job (e.g., not a preexisting job) to run on-demand or as per the schedule in the computing infrastructure (e.g., at least one of the logical grouping 114, the logical grouping 115, the logical grouping 116, or the logical grouping 117) based on the schedule not being validated. As such, the application program 107 submits the set of parameters containing the copy of the change identifier into the database (e.g., relational) hosted on the second server 111 to create and then submit the new job without the user having to manually submit the set of parameters into the user interface (e.g., by clicking a virtual button). For example, the schedule may include the change description, the change start date, the change start time, the change end date, or the change end time.

In block 412, the application program 107 scans (via the DBMS on the server 111) the database (e.g., relational) hosted on the second server 111, where such scanning is continuous to determine (e.g., by matching in value) whether the set of parameters should be retrieved from the database (e.g., relational) hosted on the second server 111 according to the schedule. The continuous scan occurs on a set of records including a set of fields. As such, the continuous scan may be field-by-field, record-by-record, for every occurrence or recurrence of a discrete measurement of time (e.g., second or seconds, minute or minutes, hour or hours, day or days, week or weeks, month or months, quarter or quarters) during a time period (e.g., second or seconds, minute or minutes, hour or hours, day or days, week or weeks, month or months, quarter or quarters). For example, for an instance of such scanning, there may be a start time, start date, end time, end date, duration, recurrence pattern, frequency of recurrence, and end of recurrence, whether by date, after a set of occurrences, or no end date.

In block 414, the application program 107 the application program 107 determines (e.g., application names, automation server pipeline path, test cases, unique run id) whether the set of parameters should be retrieved (via the DBMS on the server 111) from the database according to the schedule, where the database (e.g., relational) is hosted on the second server 111, i.e., the date and time has arrived to retrieve the set of parameters. If yes, then block 416 is performed. If no, then block 412 is performed.

In block 416, based on the application program 107 determining (e.g., application names, automation server pipeline path, test cases, unique run id) that the set of parameters should be retrieved from the database according to the schedule, where the database (e.g., relational) is hosted on the second server 111, i.e., the date and time has arrived to retrieve the set of parameters, the application program 107 retrieves (via the DBMS on the server 111) the set of parameters from the database according to the schedule and forms a copy of the set of parameters therefrom, where the database (e.g., relational) is hosted on the second server 111.

In block 418, the application program 107 submits the copy of the set of parameters to the automation server program running on the server 112, such that (1) the automation server program activates the pipeline of scripts based on the copy of the set of parameters, (2) the pipeline of scripts activates the set of agents, and (3) the set of agents executes a set of test cases on the set of nodes. The third server 112 hosts the automation server program hosting the pipeline of scripts. The set of node programs hosts the set of agents, where the set of agents is controlled by the application program 107, and the set of node programs runs on the set of physical machines 113 (e.g., on top of respective OSs). The set of test cases is sourced from the pipeline of scripts, where the set of test cases includes the test case job itself or copies thereof formed before block 418 is performed or at runtime when block 418 is performed. The copy of the set of parameters may be submitted to the automation server program in parallel (e.g., expedite processing) or in series (e.g., to manage bandwidth). The automation server program may activate the pipeline of scripts based on the copy of the set of parameters in parallel (e.g., to expedite processing) or in series (e.g., to manage bandwidth). The pipeline of scripts and the copy of the set of parameters may have a many-to-many correspondence with each other. The pipeline of scripts may activate the set of agents in parallel (e.g., to expedite processing) or in series (e.g., to manage bandwidth). The pipeline of scripts and the copy of the set of parameters may have a many-to-many correspondence with each other. The set of agents may execute the set of test cases on the set of nodes in parallel (e.g., to expedite processing) or in series (e.g., to manage bandwidth). The set of agents and the set of test cases may have a many-to-many correspondence with each other.

In block 420, the application program 107 receives a set of results for the test cases from the set of agents, which occurs through the set of node programs running on the set of physical machines 113, i.e., the set of results is sent by the set of physical machines 113. The set of results can be a single data file (e.g., a spreadsheet file, a flat file) or a set of data file (e.g., spreadsheet files, flat files), which may follow a preset naming convention. The set of results includes alphanumeric data and may include imagery (e.g., graphics). The set of results details how the set of test cases was executed on at least one of the logical grouping 114, the logical grouping 115, the logical grouping 116, or the logical grouping 117. The set of results may be a set of stability results for a production environment external to the computing terminal 101 and the logical grouping 105. The production environment may include at least one of the logical grouping 114, the logical grouping 115, the logical grouping 116, or the logical grouping 117.

In block 422, the application program 107 submits the set of results to the database (e.g., relational) hosted on the second server 111 for storage, according to its schema, such that the set of results are associated (e.g., related by a primary key) with the set of parameters in the database (e.g., relational) hosted on the second server 111, responsive to receiving the set of results from the set of agents. The set of results can be stored in a single record in the database (e.g., relational) hosted on the second server 111 together with the set of parameters, from block 416, or the set of results can be stored in one record in the database (e.g., relational) hosted on the second server 111 and the set of parameters can be stored in another record in the database (e.g., relational) hosted on the second server 111, where the these two records are related to each other (e.g., via a primary key). For example, the application program 107 may form a copy of the set of results and instruct the DBMS on the server 111 to write the copy of the set of results into a set of fields of a record of the database (e.g., relational) hosted on the second server 111, according to its schema, whether the record is a new record or a preexisting record. The application program 107 may form the copy of the set of results and then format the copy of the set of results for compliance with the DBMS on the server 111, where the DBMS ensures schema compliance. The set of results for the test cases is provided in a JSON or XML format before the set of results is submitted to the database (e.g., relational) hosted on the second server 111 for storage. The set of parameters (or copy thereof) may be provided in a JSON format or an XML format before the set of results are submitted to the database (e.g., relational) hosted on the server 111 for storage.

In block 424, the application program 107 takes an action based on the set of results being associated with the set of parameters in the database (e.g., relational) hosted on the second server 111, where the action is with respect to a production environment external to the logical grouping 105 and the computing terminal 101. The production environment may include at least one of the logical grouping 114, the logical grouping 115, the logical grouping 116, or the logical grouping 117. The action may include to read stop, pause, start, or modify the production environment, whether on a hardware or software level. The action may include determining whether the set of results satisfy a threshold (e.g., a performance threshold for hardware/software) for the set of parameters (or copy thereof) and presenting (i) a first content (e.g., alphanumerics, imagery) on the browser of the user terminal 101 based on the set of results satisfying the threshold for the set of parameters (or copy thereof), where the first content indicates so, or (ii) a second content (e.g., alphanumerics, imagery) on the browser of the user terminal 101 based on the set of results not satisfying the threshold for the set of parameters (or copy thereof), where the second content indicates so. The action may include at least one of enabling the user to navigate the browser of the user terminal 101 to (a) view the schedule submitted by the user (or copy thereof) or (b) view the set of results (or copy thereof) retrieved from the database based on the set of parameters, where the database (e.g., relational) is hosted on the second server 111. The set of parameters may include a job identifier and a run identifier associated with the job identifier, which may be related to the test case job.

Note that based on the application program 107 determining (e.g., start time, end time, scheduler name) that the set of parameters should not be retrieved from the database according to the schedule, where the database (e.g., relational) is hosted on the second server 111, the application program 107 continues to scan the database continuously to determine whether the set of parameters should be retrieved from the database according to the schedule, where the database (e.g., relational) is hosted on the server 111, as per blocks 412-414.

Resultantly, there is a system for automated change intelligence and smart testing for applications comprises a terminal with an OS and a browser application, along with a logical grouping containing three servers and a set of nodes. The first server hosts an application program, the second server hosts a database, and the third server hosts an automation server program with a pipeline of scripts. The set of nodes, which excludes the terminal and the three servers, has its own set of OSs and agents controlled by the application server program. The browser application takes an input parameter of an exact system change, which may be a ServiceNow record (e.g., CHGXXXXX—Patching Windows Server) from the end user and makes a REST API call to a ServiceNow system architecture in the cloud to retrieve a system change details from a ServiceNow database. The application program receives the response from ServiceNow cloud, which includes system change details (such as description, dates, coordinator, configuration item, assignment group, and risk level) and impacted application details (identifiers and associated data). The application program then queries the database to distinguish common applications available for certification and those not available in the database. The application program validates if an existing schedule is available for the same change number. If a schedule exists, then the application program fetches and presents the associated details on the user interface. If not, then the application program enables the user to submit a new job to run on demand or as per schedule. The application program presents a user interface displaying the retrieved system change details and impacted applications with their categorization. The application program enables the user to trigger a test case job for applications present in the network topology of FIGS. 1A-1D, either on-demand or according to a schedule, via instructional content. The application program submits the instructional content and parameters to the database for storage. Based on the schedule, the application program retrieves this information and submits this information to the automation server program. This event activates the pipeline of scripts and agents, executing test cases on the set of nodes. The application program receives test results from the agents, submits them to the database for storage, and takes computing action based on the results. Users can navigate through the browser application to view submitted schedules and access test results via hyperlinks (e.g., Uniform Resource Locators), which retrieve and display the results on the user interface for analysis. This system streamlines the process of managing system changes, identifying impacted applications, and executing automated tests, providing a comprehensive solution for change intelligence and smart testing in complex IT environments.

Therefore, the algorithm 400 solves the technical problems pertaining to the complex and error-prone process of managing and executing changes within a distributed computing infrastructure exemplified in FIGS. 1A-1D. This process often involves coordinating multiple servers, databases, and nodes, while ensuring that any changes made do not disrupt ongoing operations or cause system failures. Traditionally, managing these changes requires significant manual intervention, which can lead to human errors, delays, and inconsistencies in the execution of updates or maintenance tasks. Additionally, the need to track the impact of changes across various applications and infrastructure components adds another layer of complexity, making it difficult to ensure that all relevant dependencies and potential issues are adequately addressed. The algorithm 400 solves these technical problems by providing an integrated system that automates the process of managing and executing changes across a distributed computing environment exemplified by FIGS. 1A-1D. The system leverages the logical grouping of servers and nodes, where each server has a specific role, such as hosting applications, the relational database, and the automation server. The automation server, in particular, plays a crucial role by hosting the pipeline of scripts that can be triggered based on predefined schedules or on-demand requests. The system receives change requests through the user interface on the computing terminal, validates these requests against the relational database, and coordinates the execution of test cases via agents on the nodes. By automating the validation, scheduling, and execution of changes, the system minimizes the risk of human error, ensures consistency, and provides real-time tracking and reporting of the impact of changes, thereby enhancing the reliability and efficiency of managing the computing infrastructure.

Figure 6:
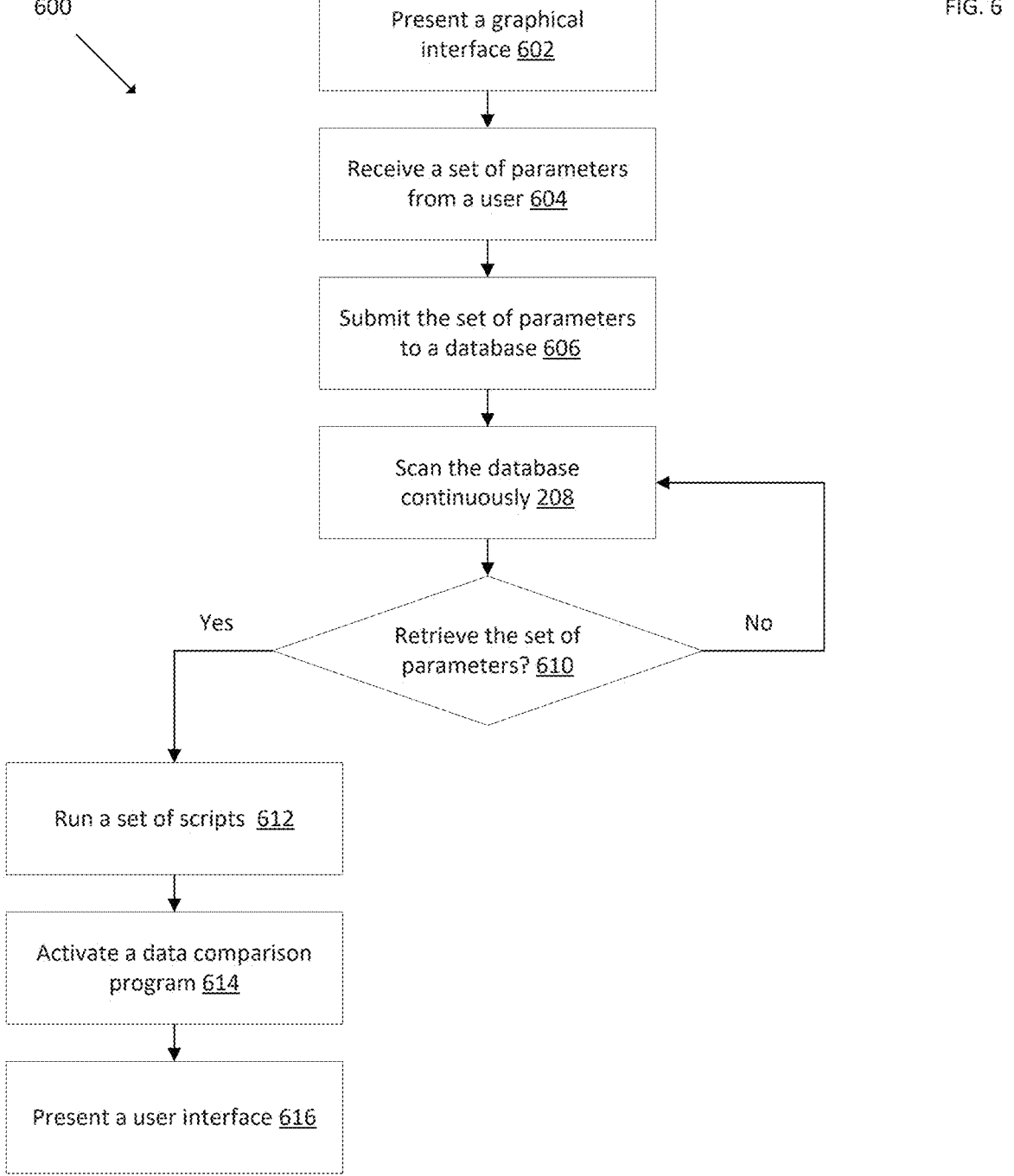
FIG. 6 shows a flowchart of an embodiment of an algorithm for using an automation server to enable a data comparison program to be activated in the network topology of FIGS. 1A-1D according to this disclosure.
Figure 7:
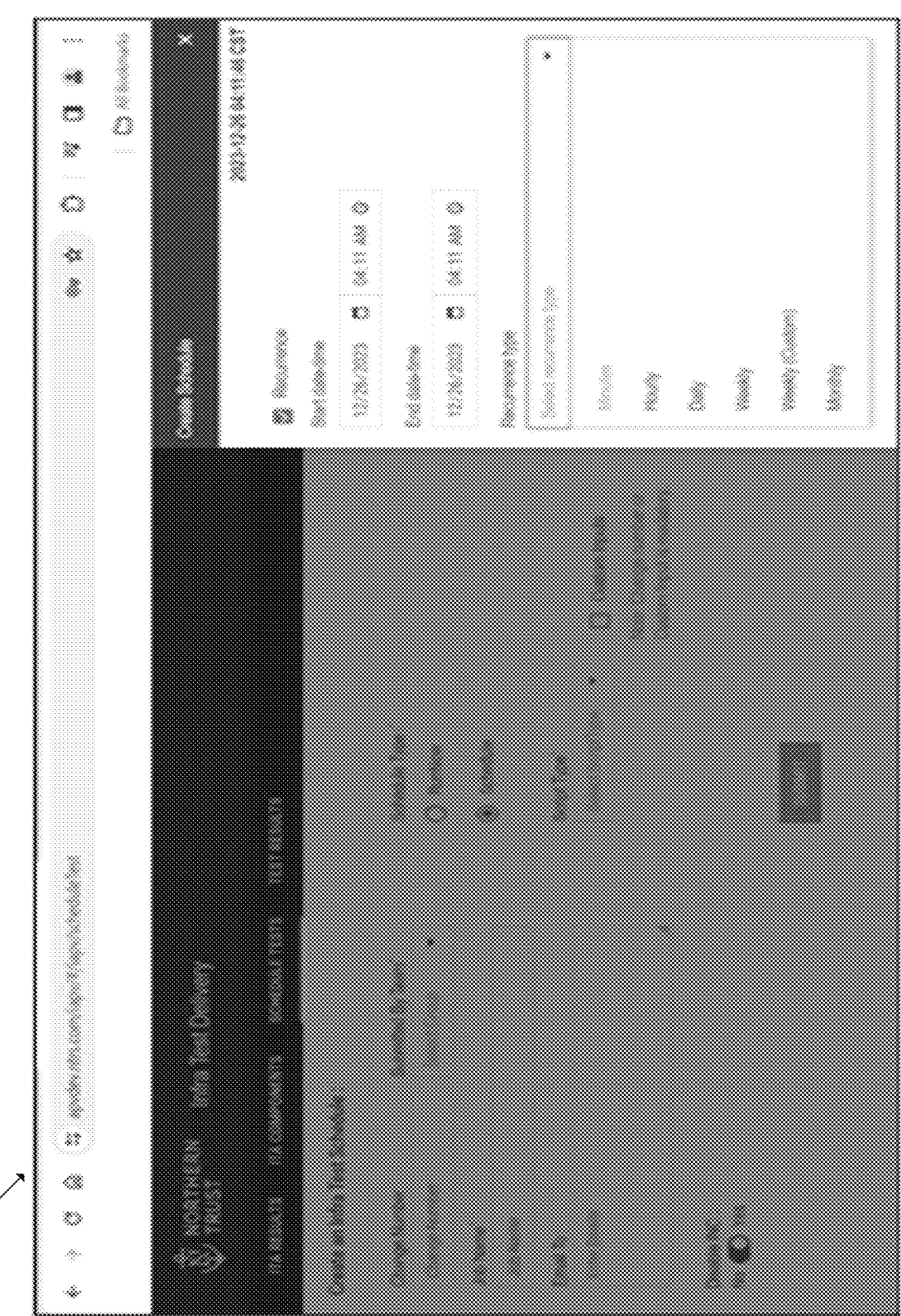
FIGS. 7-9 show a set of screenshots of an embodiment of a user interface used in the algorithm of FIG. 6 according to this disclosure.
Figure 8:
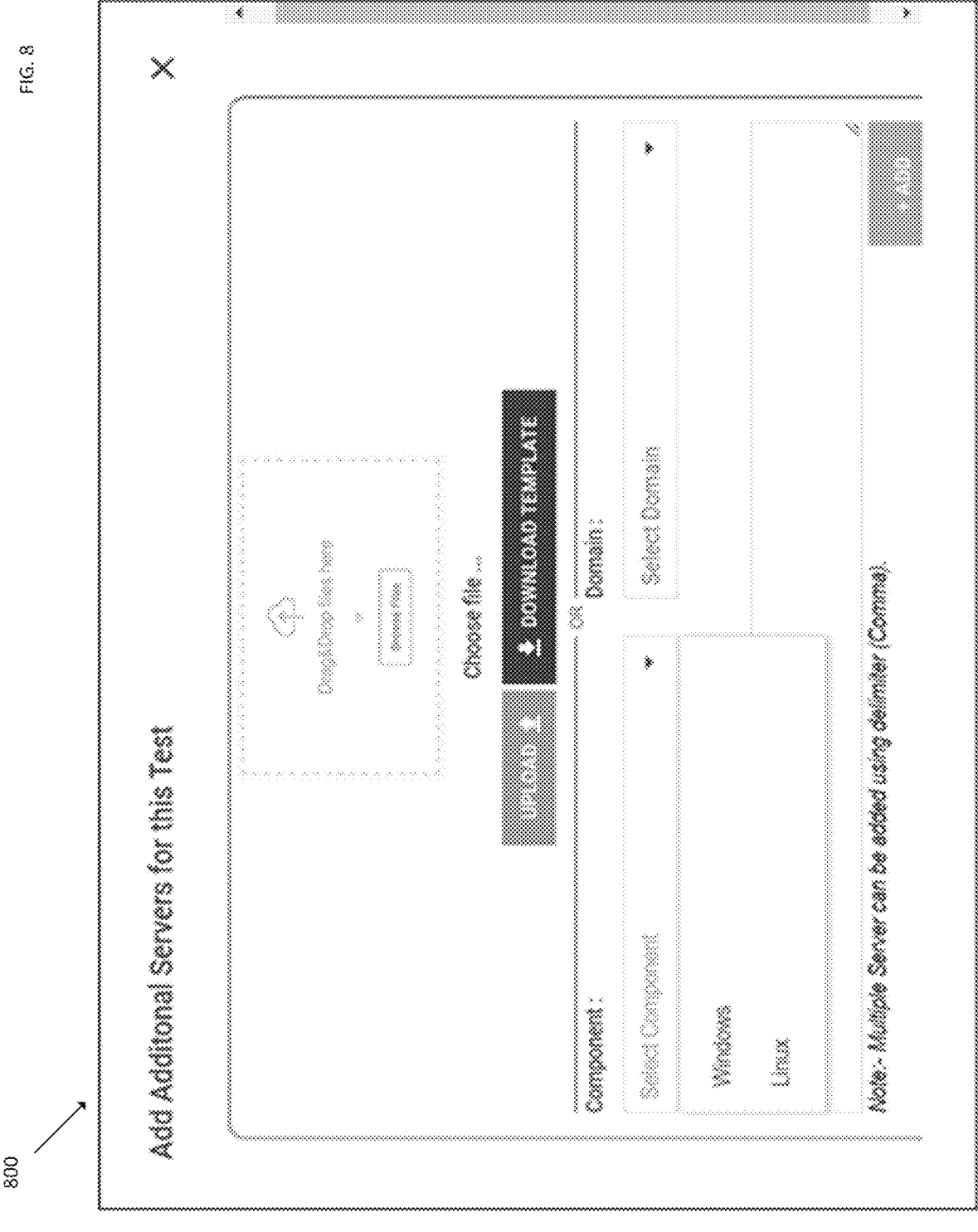
Figure 9:
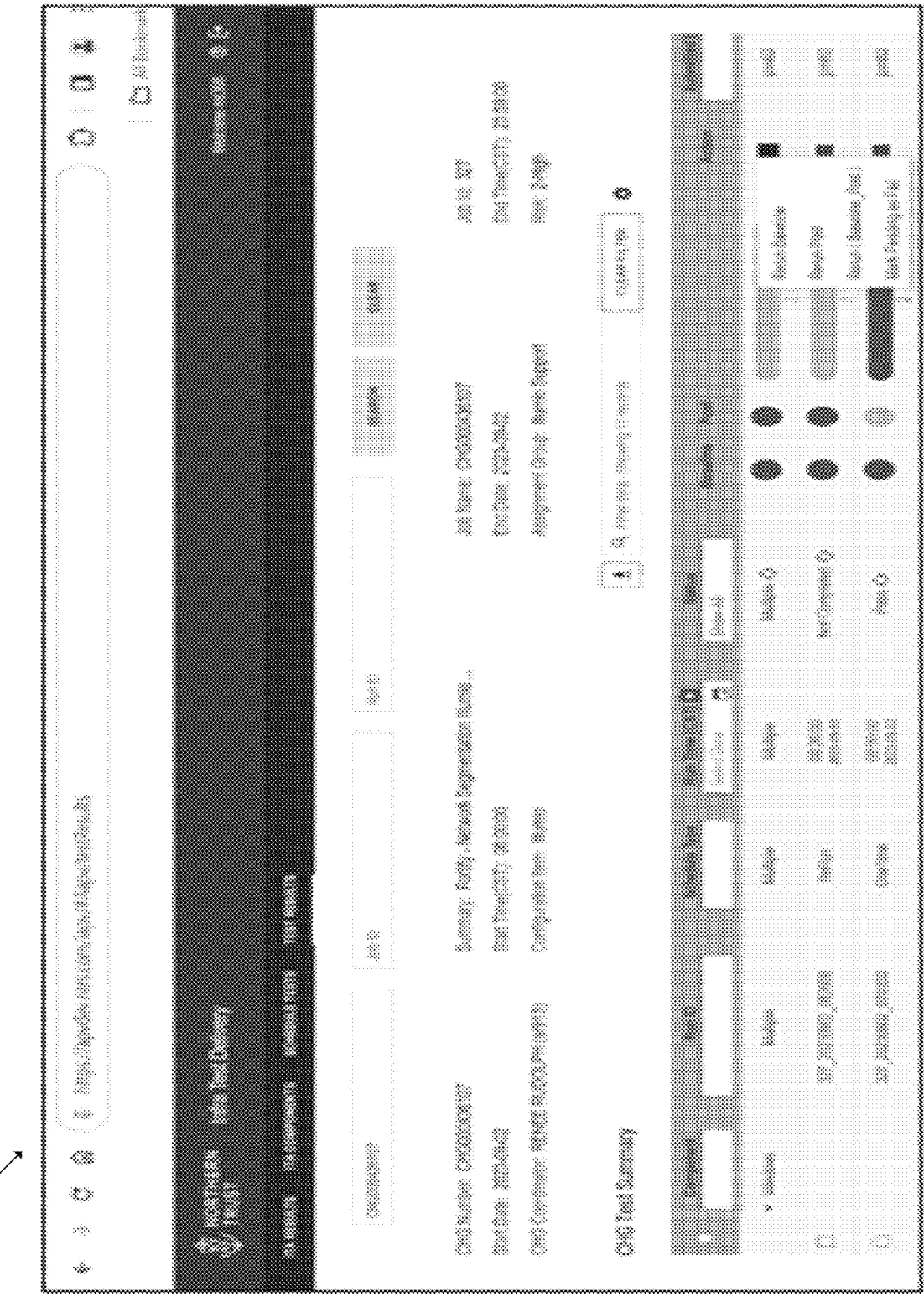

FIG. 6 shows a flowchart of an embodiment of an algorithm for using an automation server to enable a data comparison program to be activated in the network topology of FIGS. 1A-1D according to this disclosure. FIGS. 7-9 show a set of screenshots 700, 800, and 900 of an embodiment of a user interface used in the algorithm of FIG. 6 according to this disclosure. In particular, an algorithm 600 enables an automated change intelligence and smart testing for a computing infrastructure (e.g., a computing environment, a testing environment, a production environment). To do so, the algorithm 600 includes a set of blocks 602-616 which are performed via the network topology of FIGS. 1A-1D, as described above. To perform the algorithm 600, the user terminal 101 hosts the browser and the logical grouping 105 contains the first server 106 and the second server 111. The first server 106 hosts the application program 107 and the second server 111 hosts the database. As shown in FIGS. 1A-1D, the user terminal 101 is external to the logical grouping 105 and the application program 107 is programmed to perform or enable the set of blocks 602-616 to be performed.

In block 602, the application program 107 receives a request (e.g., a message, an instruction) placed by the user from the browser of the user terminal 101 (e.g., a viewport), presents a hyperlink (e.g., a Uniform Resource Locator) to the browser responsive to the request, and presents a user interface to the browser responsive to the hyperlink being activated by the user from the browser, which is technically advantageous for non-technical personnel due to widespread knowledge of browser usage and for technical personnel due to lack of dedicated application programs to maintain. For example, the request and the hyperlink may be provided via a web portal enabled by the server 106. The user interface may be a single screen or a set of screens that are consecutive (e.g., a software wizard). For example, the user interface may be a GUI, a WUI, an MDI, or another suitable user interface.

In block 604, as shown in FIGS. 7-9, the user interface is programmed to enable the user to input a set of parameters (e.g., alphanumeric or Boolean strings). The set of parameters includes (a) an identifier (e.g., a name) for a change (e.g., a software change, a software update, a setting change, a registry change, a parameter change) in a computing environment (e.g., a testing environment, a production environment) external to the logical grouping 105, (b) a set of identifiers (e.g., a set of names) for a set of hardware components (e.g., servers, switches, routers, printers) related to or involved with the change (e.g., on which the change occurs or impacted by the change), (c) a schedule name, and (d) a script type, as further disclosed below, such that a test job is capable of being created to run in the computing environment on-demand (e.g., activated from the viewport of the browser of the user terminal 101) or based on a schedule. The computing environment can be the logical grouping 105 or computing environments shown in FIGS. 1B-1D.

The job may be an automated testing script or program that is designed to test at least some functionality and behavior of a software application or system, as shown in FIGS. 1A-1D. Some purposes of the test job may include an automated testing, a regression testing, a test coverage, or a continuous integration and delivery. The automated testing may allow for automation of test cases and test scenarios, reducing at least some needs for manual testing efforts, which may enable simulation of user interactions, input data, or verify expected outputs or behaviors of software under test. The regression testing may allow the job repeatedly, enabling efficient regression testing to ensure that existing features continue to work correctly after code changes or updates. The test coverage may include automating test cases to enable the test job help to achieve broader test coverage, testing various scenarios and edge cases that may be difficult or time-consuming to test manually. The continuous integration and delivery may include the test job being integrated into continuous integration and delivery pipelines, allowing for automated testing to be performed as part of the software development lifecycle. The test job can be written in various programming languages (e.g., Java, Python) or may utilize testing frameworks (e.g., JUnit, Selenium, Pytest). The test job may interact with software under test through APIs, simulating user interactions or directly invoking specific functions or modules. For example, the test job is a job (e.g., a unit of work or execution containing of tasks or steps that perform specific functions) programmed to perform a set of actions performed on at least one of the logical grouping 114, the logical grouping 115, the logical grouping 116, or the logical grouping 117 to assess if the logical grouping meets hardware/software requirements and functions correctly, which is useful in software testing to ensure an optimal quality and reliability of software being developed. For example, the test job may review hardware/software specifications/settings, execute test plans and test cases, identify defects, document findings, manage test execution to ensure adherence to a preset test plan, design test case scenarios, conduct thorough testing, and prepare detailed reports on what was tested. Note that the test job is valuable for automating testing efforts and may be used in conjunction with other testing techniques, such as manual testing and exploratory testing, to ensure comprehensive testing coverage and to identify issues that may be difficult to automate. The schedule is hourly, daily, weekly, weekly custom, or monthly.

The script type is a baseline only, a baseline and a post, or a post only. The script type of the baseline only is programmed to run (or is) an automation script in the computing environment before the change starts and no data comparison program is triggered in the computing environment. The script type of the baseline and the post is programmed to run (or is) an automation script in the computing environment before the change starts and enables the user to trigger the automation script in the computing environment once the change is implemented in the computing environment and a data comparison program is triggered to run in the computing environment. The data comparison program may run on the application 109 (e.g., a data parser application) deployed on an application server. The data comparison program compares data by value or format and outputs a difference of value or format when identified. The script type of the post only is programmed to run (or is) the automation script after the change is implemented and the data comparison program is triggered to run in the computing environment.

In block 606, the application program 107 submits the set of parameters to the database (e.g., relational) hosted on the server 111 for storage, according to its schema, responsive to receiving the set of parameters. For example, the application program 107 may form a copy of the set of parameters and instruct the DBMS on the server 111 to write the copy of the set of parameters into a set of fields of a record of the database, where the database (e.g., relational) is hosted on the server 111, according to its schema, whether the record is a new record or a preexisting record. The application program 107 may form the copy of the set of parameters and then format the copy of the set of parameters for compliance with the DBMS on the server 111, where the DBMS ensures schema compliance. The set of parameters may be provided in a JSON or XML format before the set of results are submitted to the database for storage where the database (e.g., relational) is hosted on the server 111.

In block 608, the application program 107 scans the database (e.g., relational), which is hosted on the second server 111 (via the DBMS on the server 111), continuously to determine (e.g., by matching in value) whether the set of parameters should be retrieved from the database according to the schedule, where the database (e.g., relational) is hosted on the server 111. The continuous scan occurs on a set of records including a set of fields. As such, the continuous scan may be field-by-field, record-by-record, for every occurrence or recurrence of a discrete measurement of time (e.g., second or seconds, minute or minutes, hour or hours, day or days, week or weeks, month or months, quarter or quarters) during a time period (e.g., second or seconds, minute or minutes, hour or hours, day or days, week or weeks, month or months, quarter or quarters). For example, for an instance of such scanning, there may be a start time, start date, end time, end date, duration, recurrence pattern, frequency of recurrence, and end of recurrence, whether by date, after a set of occurrences, or no end date.

In block 610, the application program 107 determines (e.g., start time, end time, scheduler name) whether the set of parameters should be retrieved (via the DBMS on the server 111) from the database according to the schedule, where the database (e.g., relational) is hosted on the server 111, i.e., the date and time has arrived to retrieve the set of parameters. If yes, then block 612 is performed. If no, then block 608 is performed.

In block 612, based on the application program 107 determining that the set of parameters (e.g., application names, automation server pipeline path, test cases, unique run id) and the identifier for the change should be retrieved from the database according to the schedule, where the database (e.g., relational) is hosted on the server 111, i.e., the date and time has arrived to retrieve the set of parameters, the application program 107 performs various steps.

One of such steps is that the application program 107 receives a copy (formed via the DBMS on the server 111) of the set of parameters and a copy (formed via the DBMS on the server 111) of a set of identifiers (e.g., names) of a set of impacted (e.g. slowing down, inoperative, operative but wrong results) hardware components (e.g., servers, switches, routers, printers) of the computing environment from the browser based on the browser (a) making (e.g., sending, submitting, invoking) a call (e.g., a message) containing the identifier for the change to a PAAS hosted on a CMDB for the logical grouping 105, (b) receiving the set of identifiers for the set of impacted hardware components from the PAAS, (c) forming (e.g., locally) the copy of the set of parameters and the copy of the set of identifiers of the set of impacted hardware components, and (d) sending the copy of the set of parameters and the copy of the set of identifiers of the impacted hardware components to the application program 107. As shown in FIG. 1A, the PAAS and the CMDB are external to the user terminal 101 and the logical grouping 105. The set of hardware components contains the set of impacted hardware components.

One of such steps is that the application program 107 causes an automation server program running on the server 112, as shown in FIG. 1A, to run a set of scripts based on the copy of the set of parameters such that the automation server program generates an identifier (e.g., a name) for the set of scripts and sends a copy of the identifier for the set of scripts to the application program 107. The automation server may run the set of scripts based on the copy of the set of parameters in parallel or in series. As explained above, the server 112 is a physical or virtual server hosting an OS and an application program running thereon, which is enabled to perform various algorithms disclosed herein using various components shown in FIGS. 1A-1D. For example, the server may be an application server enabling server-side application code and facilitating interaction between end-user clients and server-side application logic, which may enable dynamic content generation and supporting business logic to provide specialized functionality offered by a business or service, as disclosed herein. The server may handle tasks like clustering, fail-over, load balancing, and feature various communication protocols beyond HTTP to interact with clients and other software components, as disclosed herein. For example, the OS may include a Windows OS, a MacOS, an iOS, a Linux OS, or another suitable OS. Likewise, the application program may be an automation server program used for building, testing, and deploying software. The automation server program can function as a simple CI server or be expanded into a continuous delivery hub for projects, with a web interface for easy setup and configuration. The automation server program is programmed to run scripts for various purposes, such as automation, job configuration, and build and deployment automation. For example, if the automation server program is a Jenkins server program, as shown in FIGS. 1A-1D, then Groovy scripts can be used to define and execute custom scripts using Groovy programming language. These scripts can configure jobs programmatically, automate build and deployment processes, and extend functionality by interacting with plugins. For example, if the automation server program is a Jenkins server program, as shown in FIG. 1A, then Groovy scripts offer flexibility, control, and the ability to streamline CI workflows by tailoring Jenkins server program to specific needs, such as for pipeline automation, defining complex workflows, setting build parameters, and integrating with external tools or programming interfaces. The automation server program may have a controller program operating as a main node, to administer various agent programs, schedules jobs on agent programs, and monitors their work. Further, the automation server program may communicate with node programs running on physical machines or virtual machines, where build agent programs run. The node programs may be monitored by the automation server program for various parameters like disk space, response time, or other suitable parameters. The node programs may be built-in nodes within the controller program or agent programs connected to the controller program. Also, there may be agent programs that manage task execution on behalf of the controller program using executor programs. The agent programs may be client processes (e.g., Java) that connect to the controller program and can run on different OSs. The agent programs can be launched in physical machines, virtual machines, Kubernetes clusters, or with Docker images. The executor programs may be slots for task execution within a respective agent program. The number of executor programs determines how many concurrent tasks can run, affecting the number of concurrent pipeline stages that can execute simultaneously. As such, the automation server program may orchestrate tasks, node programs may be where agent programs run, agent programs may execute tasks on behalf of the controller using executor programs, and executor programs determine the concurrency of task execution on a respective node. As shown in FIGS. 1A-1D, the set of physical machines 113 is a set of physical servers operated by the user through the user profile (e.g., an administrator user profile, a technician user profile, a business user profile). Each physical server of the set of physical servers may host an OS and an application program running on the OS. For example, the OS may include a Windows OS, a MacOS, an iOS, a Linux OS, or another suitable OS. Likewise, the application program may be a node program in which an agent program is running to perform a task based on an executor program.

One of such steps is that the application program 107 stores (via the DBMS on the server 111) the copy of the identifier for the set of scripts in the database hosted on the server 111.

One of such steps is that the application program 107 queries (via the DBMS on the server 111) the database for the script type after the script type has already been stored in the database hosted on the server 111.

One of such steps is that the application program 107 receives (via the DBMS on the server 111) the script type (or copy thereof) from the database hosted on the server 111.

In block 614, the application program 107 activates (e.g., initiates, opens, starts) the data comparison program based on (a) the script type being the baseline and the post or (b) the post only such that the data comparison program (c) compares a set of data for the baseline type against a set of data for the post type, or vice versa, and (d) updates (e.g., in real-time) a set of statuses (e.g., pass/fail, active/inactive, ready/not ready) for the copy of the set of identifiers of the set of impacted hardware components indicating whether the set of impacted hardware components passed or failed based on the set of data for the post relative to the set of data for the baseline, or vice versa. The data comparison program runs on the application 109 (e.g., a data parser application) and compares a set of parameter values (e.g., a service state, an amount of disk space available or used up, a list of names of mounted hard drives) to each other or to a set of local or remote predetermined values in value to determine the post parameter values that are expected to change or remain same relative to baseline values. The data comparison program may compare the set of data for the baseline against the set of data for the post or vice versa for matching in value. The data comparison program may compare the set of data for the baseline against the set of data for the post or vice versa for matching in format. The data comparison program may compare the set of data for the baseline against the set of data for the post or vice versa for matching in value and format.

The application program 107 stores (via the DBMS on the server 111) a copy of the set of data for the baseline (e.g., a service state, an amount of disk space available or used up, a number or names of open or closed ports), a copy of the set of data for the post (e.g., a service state, an amount of disk space available or used up, a number or names of open or closed ports), and a copy of the set of statuses (e.g., pass, fail, info) in the database hosted on the server 111.

The application program 107 retrieves (via the DBMS on the server 111) the copy of the set of data for the baseline, the copy of the set of data for the post, and the copy of the set of statuses from the database hosted on the server 111.

In block 616, the application program 107 presents or updates the user interface shown in the viewport on the browser such that the user interface displays, which may be simultaneously, serially, or visually distinctly, which may be responsive to the hyperlink being activated by the user from the browser, the copy of the identifier for the change, the copy of the set of identifiers for the set of hardware components, the schedule name, the script type, and the copy of the set of data for the baseline, the copy of the set of data for the post, and the copy of the set of statuses. For example, the user interface may simultaneously display the copy of the identifier for the change, the copy of the set of identifiers for the set of hardware components, the schedule name, the script type, and the copy of the set of data for the baseline, the copy of the set of data for the post, and the copy of the set of statuses. The user interface may be programmed to enable the user to input (e.g., a physical keyboard, a virtual keyboard, a cursor device, a microphone) at the browser a new set of instructions (e.g., via a user input element, a virtual button, a virtual checkbox) to repeat the test job on the set of hardware components in entirety or a subset thereof based on the script type mapped to the test job along with the copy of the set of parameters based on the copy of the set of data for the baseline, the copy of the set of data for the post, and the copy of the set of statuses. The application may be programmed to repeat the test job on the set of hardware components in entirety. The application may be programmed to repeat the test job on a subset of the set of hardware components. Note that based on determining that the copy of the set of parameters and the copy of the identifier for the change should not be retrieved from the database according to the schedule: the application program 107 continues to scan the database continuously to determine whether the copy of the set of parameters should be retrieved from the database according to the schedule, as explained above in context of block 610.

Resultantly, there is a system comprising a terminal with an OS and a browser application running on the OS, along with a logical grouping containing a first server, a second server, and a set of nodes. The first server hosts multiple application programs, while the second server hosts a database. The set of nodes, which excludes the terminal, the first server, and the second server, has a set of OSs and an Infra component specific script (set of commands). The terminal remains external to the logical grouping. The application program is designed to perform several functions. The application program receives a request placed by the user from the browser application and presents a hyperlink (e.g., a Uniform Resource Locator) to the browser application in response. The application program then presents a user interface enabling the user to enter a system change number (e.g., CHGXXXX—Server Patching) or input a list of servers (Windows or Linux-physical or virtual machines). The application program allows the user to input a set of parameters to create a job that can run on demand or based on a schedule. The schedule options include hourly (in intervals of specified number of hours, like every 4 hours), daily (at a particular time of the day), weekly (on a particular day and time in a week), weekly custom (on selective number of days and a particular time), and monthly (on a particular day and time each month). The set of parameters includes the system change number, servers list, schedule name, and script type. The script type can be baseline only (running automation scripts before the change starts with no data comparison), baseline and post (running automation scripts before and after the change, triggering data comparison), or post only (running automation scripts after the change, triggering data comparison using the last executed automation results as the baseline). The application program submits the set of parameters to the database for storage and continuously scans the database to retrieve the parameters according to the schedule. Based on the retrieved parameters and the system change number, the browser application makes a call to ServiceNow cloud with the change number and retrieves the Impacted applications. The application program then submits the set of parameters and content to activate the ansible pipeline, which runs the automation script and activates the set of nodes to execute the test scripts. The application program receives the set of results from the executed test scripts and submits them to the database for storage, associating them with the set parameters (runid). A data comparison program is activated to compare the test results based on the selected script type. The program compares baseline and post-change data, validates the compared output against configuration files, and assigns failed outputs to respective teams for action. The application program presents a user interface displaying System change details and test results based on the input parameters. The interface shows affected servers and their status (Pass, Fail, Not Completed) and allows users to view overall and detailed test results. Users can also input additional instructions for reruns based on the script type mapped to the test job. Throughout this process, the application program continues to scan the database to determine whether the instructional content and set of parameters should be retrieved according to the schedule.

Therefore, the algorithm 600 solves the technical problems of the complexity and inefficiencies associated with managing and executing automated test jobs in a computing environment exemplified in FIGS. 1A-1D, particularly when changes are introduced. Traditional methods often lack the ability to seamlessly integrate various components, such as user interfaces, databases, and automation servers, resulting in increased manual intervention, potential errors, and delays. Additionally, there is a need for a streamlined process to schedule, run, and compare results of automation scripts before and after changes are implemented, ensuring that the impact on hardware components is accurately assessed and reported. The algorithm 600 solves these technical problems by providing a comprehensive system that integrates the computing terminal, the logical grouping of servers, and the automation server, such as the Jenkins server, exemplified in FIGS. 1A-1D. The system allows a user to place a request through the browser, receive and activate the hyperlink to input necessary parameters, and schedule test jobs. The application within the first server interacts with the database in the second server to store and retrieve parameters, identifiers, and test results. By continuously scanning the database and utilizing the PAAS hosted on the CMDB, the system ensures that test jobs are executed according to the defined schedule. The automation server runs the scripts, generates identifiers, and triggers data comparison programs as needed. The results, including statuses indicating pass or fail, are stored and presented to the user through the updated interface, enabling further actions or repetitions of test jobs. This integrated approach minimizes manual effort, reduces errors, and enhances the efficiency and accuracy of managing automated test jobs in dynamic computing environments.

Figure 11:
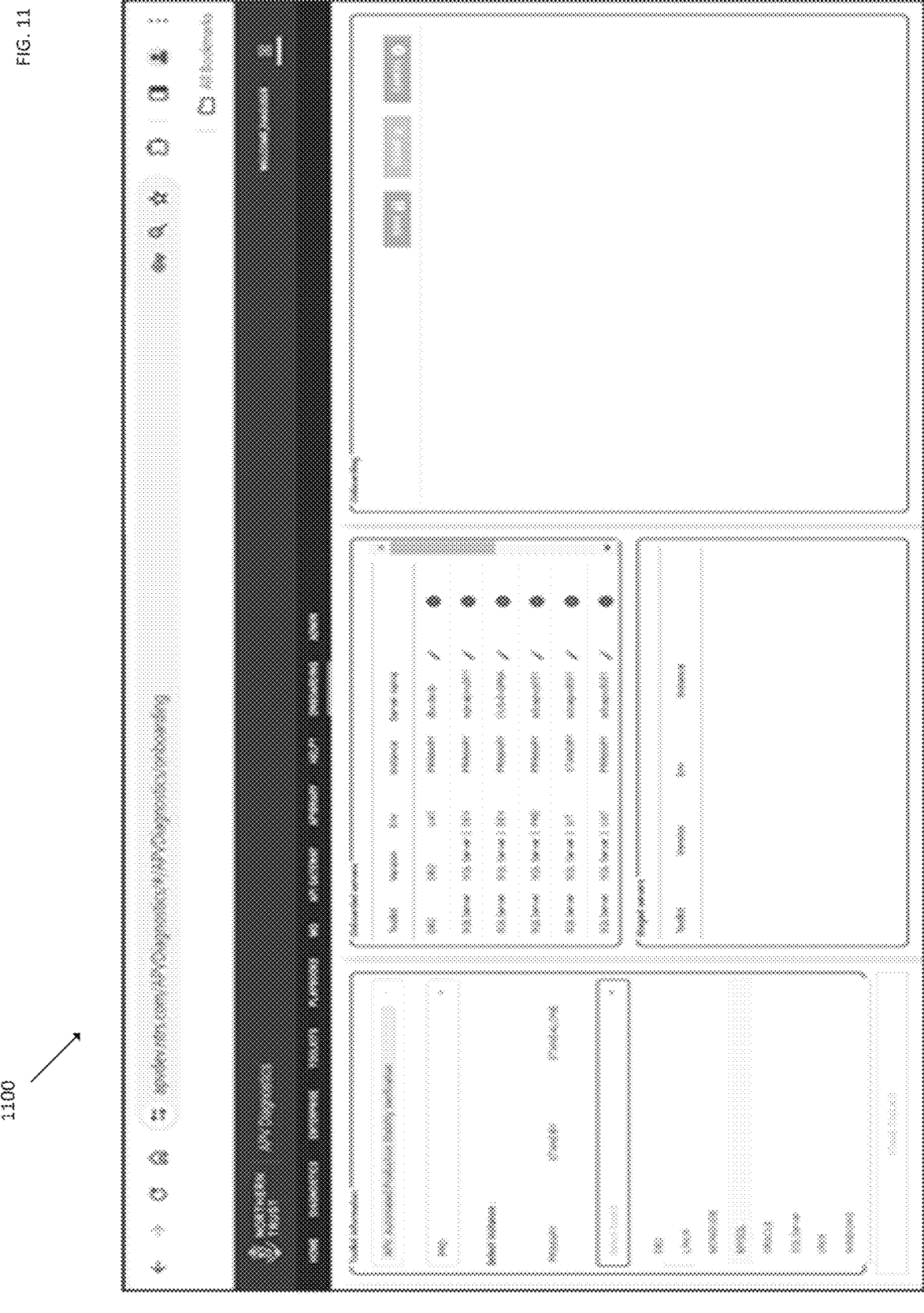
FIGS. 11-12 show a set of screenshots of an embodiment of a user interface used in the algorithms of FIG. 10 according to this disclosure.
Figure 12:
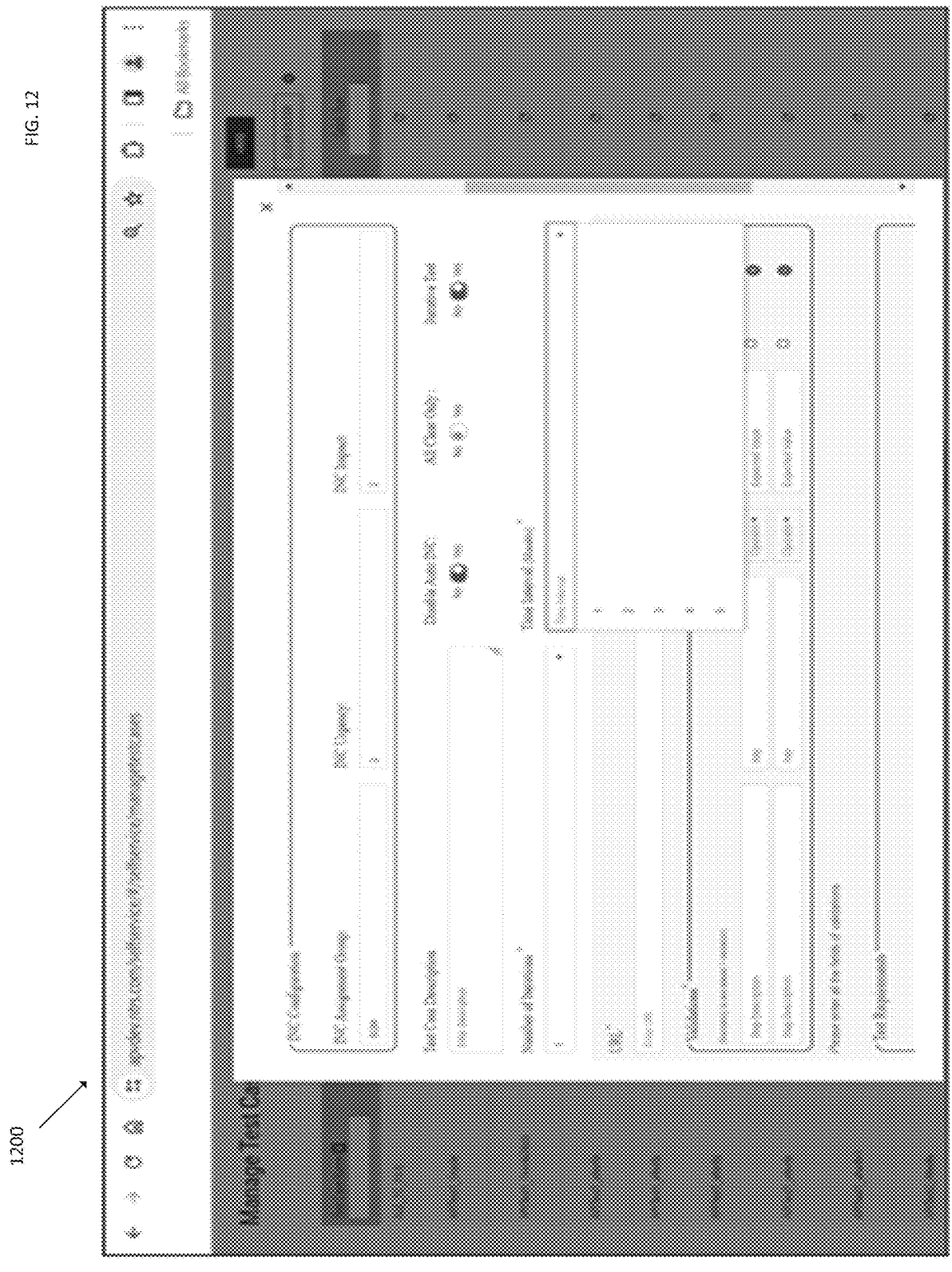

FIG. 10 shows a flowchart of an embodiment of an algorithm for presenting a user interface based on a set of onboarding steps in the network topology of FIGS. 1A-1D according to this disclosure. FIGS. 11-12 show a set of screenshots 1100 and 1200 of an embodiment of a user interface used in the algorithms of FIG. 10 according to this disclosure. In particular, an algorithm 1000 enables a no code API test onboarding for a computing infrastructure (e.g., a computing environment, a testing environment, a production environment). To do so, the algorithm 1000 includes a set of blocks 902-908 which are performed via the network topology of FIGS. 1A-1D, as described above. To perform the algorithm 1000, the user terminal 101 hosts the browser and the logical grouping 105 contains the first server 106 and the second server 111. The first server 106 hosts the application program 107 and an API. For example, the API may be a Representational State Transfer (REST) API (e.g., to allow compartmentalized, independent and interoperable, and stateless use of standardized HTTP methods to transfer data in formats like JSON), a Simple Object Access Protocol (SOAP) API (e.g., to allow stateful, standardized, language and platform independent usage of built-in security features, error handling, and retry logic) a GraphQL API (e.g., to avoid over/under-fetching issues), a Remote Procedure Call (RPC) API (e.g., to execute remote procedures or functions), or a Webhook API (e.g., to send real-time data to other applications when certain events occur). The second server 111 hosts the database. As shown in FIGS. 1A-1D, the user terminal 101 is external to the logical grouping 105 and the application program 107 is programmed to perform or enable the set of blocks 902-908 to be performed.

In block 902, the application program 107 performs, whether serially or in parallel, a set of preparatory steps for a test testing a component (e.g., hardware, software) of the logical grouping 105. The set of preparatory steps includes (i) receiving a first request placed by a user from the browser running on the user terminal 101, (ii) presenting a hyperlink (e.g., a Uniform Resource Locator) in the browser (e.g., a viewport) running on the user terminal 101 responsive to the request, (iii) presenting a first user interface (e.g., a single screen or a prompt or a plurality of screens or prompts) to the browser running on the user terminal 101 responsive to the hyperlink being activated (e.g., clicked) by the user from the browser running on the user terminal 101 such that the first user interface is presented on the browser running on the user terminal 101 and programmed to enable the user to input a first set of parameters (e.g., by a set of user input elements like checkbox, dropdown menus, textboxes) on the user terminal 101, and (iv) submitting (e.g., by pressing a virtual button presented on the first user interface) the first set of parameters to the database (e.g., relational) hosted on the second server 111 for storage of the first set of parameters on the database (e.g., relational) hosted on the second server 111, where this submission may occur via the DBMS on the server 111 as instructed by the user of the browser running on the user terminal 101. The first set of parameters includes (i) an identifier (e.g., a name) of a type of a hardware component (e.g., a server unit, a networking unit, a switch, a router, a printing unit) and (ii) a script (e.g., a source code of a script like a JavaScript or a Python script or a data file storing a script) for the hardware component (e.g., executable on the hardware component). The script is programmed to run (e.g., execute) on the hardware component, generate an output (e.g., a SQL query output, a flat file, a JSON file, an XML file) on the hardware component by running thereon, and send the output to the API such that the database (e.g., relational) hosted on the second server 111 generates (e.g., automatically) an identifier (e.g., a key, a primary key) for the script and stores the first set of parameters related to the identifier for the script. The first user interface may be a single screen (or a prompt) or a set of screens (or prompts) that are consecutive.

In block 904, the application program 107 performs, whether serially or in parallel, a set of onboarding steps for the test, after the block 902 is performed. The set of onboarding steps includes (i) receiving a second request placed by the user from the browser (e.g., activating a hyperlink (e.g., a Uniform Resource Locator), pressing a virtual button) running on the user terminal 101, (ii) presenting a second user interface (e.g., a single screen or a prompt or a plurality of screens or prompts) to the browser running on the user terminal 101 responsive to the second request, where the second user interface is programmed to enable the user to input a second set of parameters (e.g., by a set of user input elements like checkbox, dropdown menus, textboxes) on the user terminal 101 to configure the test (e.g., amend the first set of parameters), and (iii) submitting (e.g., by pressing a virtual button presented on the first user interface) the second set of parameters to the database (e.g., relational) hosted on the second server 111 for storage of the second set of parameters on the database (e.g., relational) hosted on the second server 111, where this submission may occur via the DBMS on the server 111 as instructed by the user of the browser running on the user terminal 101, and the storage of the second set of parameters on the database (e.g., relational) hosted on the second server 111 is related (e.g., by a key, a primary key) to the identifier for the script, as referenced in the block 902. The second request can be placed from the first user interface or another user interface. The second user interface may be a single screen (or a prompt) or a set of screens (or prompts) that are consecutive. The first user interface and the second user interface may be one user interface. The second set of parameters includes (i) a uniform resource locator (URL) with a unique reference identifier (e.g., a name, a tokenized URL) for the API, (ii) a set of validation criteria (e.g., regular and conditional expressions) for the test, (iii) a binary indicator (e.g., yes or no, true or false, 1 or 0) for an iterative repetition (e.g., at least once) of the test on failure of the test until the test succeeds or a threshold of repetitions has been reached, and (iv) a set of repetition criteria (e.g., number times and interval between repetition) for the iterative repetition based on the binary indicator indicating the iterative repetition, (v) a copy of the identifier for the script retrieved (via the DBMS on the server 111) from the database (e.g., relational) hosted on the second server 111, and (vi) an identifier (e.g., a name) of the hardware component.

In block 906, the application program 107 receives a request from the browser running on the user terminal 101, where the third request is placed by the user from the browser (e.g., activate a hyperlink (e.g., a Uniform Resource Locator), press a virtual button). The third request is placed after the first request and the second request.

In block 908, the application program 107 presents a third user interface to the browser running on the user terminal 101 responsive to the third request. The third user interface may be a single screen (or a prompt) or a set of screens (or prompts) that are consecutive. The first user interface and the third user interface may be one interface. The second user interface and the third user interface may be one interface. The first user interface, the second user interface, and the third user interface may be one interface.

The third user interface presents a user input element (e.g., a virtual checkbox, a virtual button, a virtual dropdown menu, a virtual textbox) associated with a copy of the unique reference identifier (e.g., a virtual label) on the browser (e.g., a viewport) running on the user terminal 101. The third user interface is programmed to activate (e.g., start or initiate or request start or initiation) the test through the API via the URL being activated when presented in the third user interface on the browser (e.g., a viewport) running on the user terminal. The test is activated through the API via the URL being activated responsive to the user input element being activated by the user such that a copy of the set of validation criteria obtained from the database (e.g., relational), as hosted on the second server 111, by the API is evaluated against the output (or vice versa) by the API. This evaluation occurs based on the API (i) using the copy of the identifier for the script to fetch a copy of the script from the database (e.g., relational) hosted on the second server 111, (ii) connecting with the hardware component (e.g., start a secure or unsecure communication session), (iii) causing the copy of the script to run on the hardware component to generate the output for the copy of the identifier of the hardware component, (iv) receiving the output from the hardware component, (v) generating a result for the output (e.g., a structured file, a delimited file, a JSON file, an XML file), (vi) submitting the result (or copy thereof) for storage in the database (e.g., relational) hosted on the second server 111, (vii) validating (e.g., by regular and conditional expressions) the result against a copy of the set repetition criteria retrieved from the database (e.g., relational) hosted on the second server 111 via the DBMS hosted on the server 111, (viii) causing the third user interface to present a copy of the result based on (a) the copy of the set of repetition criteria not being validated against the result and (b) the test passing, (ix) repeat the test based on (a) the binary indicator for the iterative repetition of the test being true, (b) the copy of the set of repetition criteria not being validated against the result and (c) the test failing.

Resultantly, there is a system to enable a no-code API test onboarding feature, where the system comprises a terminal having an OS and a browser application running on the OS. The system also includes a logical grouping containing a first server and a second server, where the first server hosts an application program and a set of python services, and the second server hosts a database. The terminal remains external to the logical grouping. The application program is programmed to perform several onboarding preparatory steps. These steps include receiving a request placed by a user from the browser application and presenting a hyperlink (e.g., a Uniform Resource Locator) to the browser application in response to the request. The application program then presents a user interface where the user can input a set of parameters to configure a new test in the browser application. This set of parameters includes a Script Technology Identifier selected by the end user, which can be Windows, Linux, Database (DB2, SQL Server, Oracle), or other enterprise tools like Dynatrace (covering physical or virtual machines, applications, and services such as SOAP and REST). The parameters also include a set of commands, SQL queries, or service details. The application program submits this set of parameters to the database for storage and future execution reference, creating a unique reference ID associated with the set of parameters. For onboarding an API test, the user operates the browser to configure a new test and input a second set of parameters. This second set includes an endpoint URL with the unique reference ID, criteria to validate (where expected data is validated against the actual result, with a status of Pass/Fail), and iterative test settings (enabling iteration/retry of the test on failure as per user input, specifying the number of times from 1 to 5 and the time interval between 2 iterations from 1 to 5 minutes although these counts are examples). The application program submits the second set of parameters to the database for storage, creating a new test case reference in the database. The user can then create a job configured to run immediately or on a schedule with the newly created test cases. Based on the instructional content and the set of parameters being determined to be retrieved from the database according to the schedule or on demand, the application program retrieves the test cases and the second set of parameters from the database. The application program then triggers python services with the second set of parameters as input. The python services retrieve the first set of parameters from the database based on the unique ID reference and perform computing and a set of actions based on the input received. The python service endpoint (https://apvdev.xxx-.com/apv_python_service/get_data) is activated, and the input parameters are retrieved from the endpoint (URL and query parameters). For example, in context of an Automated Production stability Verification (APV), which is a technology that validates infrastructure and application components are productionally stable for systems usage by business, there may be python services that query a database (e.g., an APV database) based on the unique reference ID and connect with the script technology based on the first set of parameters (Windows, Linux, Database, or Service). The script body, SQL query, or service details configured are then executed. After execution, the python services send the response back to the application program. Finally, the application program receives the test results and saves them in the database for future reference and analysis.

Therefore, the algorithm 1000 solves the technical problems of associated with efficiently managing and executing hardware component tests. One significant issue is the complexity and time consumption involved in manually configuring and running tests on hardware components, which often requires substantial technical expertise and manual intervention. The algorithm 1000 solves these technical problems by providing a structured and automated approach to test preparation, onboarding, and execution through a series of user interfaces accessible via the browser. The first server, hosting the application and API, facilitates communication between the user and the hardware components, while the second server, hosting the database, ensures that all relevant parameters, scripts, and results are systematically stored and retrieved. This setup minimizes human error and streamlines the process of configuring and executing tests. Additionally, the algorithm 1000 addresses the problem of ensuring test accuracy and reliability. By allowing users to input specific validation criteria and enabling iterative repetition of tests upon failure, the system ensures that hardware components are thoroughly tested and validated against predefined standards. The use of unique identifiers for scripts and hardware components, along with the storage of these identifiers and related parameters in a database, ensures traceability and consistency across multiple test runs. The API's role in fetching scripts, connecting with hardware components, and validating outputs against stored criteria further enhances the reliability and repeatability of tests. This comprehensive approach not only reduces the complexity of hardware testing, but also significantly improves the accuracy and efficiency of the testing process.

FIG. 13 shows a flowchart of an embodiment of an algorithm for updating an identifier for a test cycle according to this disclosure. In particular, an algorithm 1300 enables a test management module (TMM) (e.g., a software module) that allows for a one stop shop end-to-end test management by automatic creation of test cycles in the PAAS hosted on the CMDB, which is exemplified as a Service Now Cloud service hosting a database (e.g., a relational database, a graph database, NoSQL database, a MySQL database), via the TMM for a data or configuration change by triggering a test suite in and retrieving automated test results back to the TMM to give complete quality test execution matrix for both manual and automated test assets. To do so, the algorithm 1300 includes a set of blocks 1302-1306 which are performed via the network topology of FIGS. 1A-1D, as described above. To perform the algorithm 1300, the user terminal 101 hosts the browser and the logical grouping 105 contains the first server 106, the second server 111, and the third server 112. The first server 106 hosts the application program 107, where the application hosts a function, a first application programming interface (API), and a second API.

For example, the first API or the second API may be a Representational State Transfer (REST) API (e.g., to allow compartmentalized, independent and interoperable, and stateless use of standardized HTTP methods to transfer data in formats like JSON), a Simple Object Access Protocol (SOAP) API (e.g., to allow stateful, standardized, language and platform independent usage of built-in security features, error handling, and retry logic) a GraphQL API (e.g., to avoid over/under-fetching issues), a Remote Procedure Call (RPC) API (e.g., to execute remote procedures or functions), or a Webhook API (e.g., to send real-time data to other applications when certain events occur). The second server 111 hosts the database (e.g., relational). The third server 122 hosts the automation server, where the automation server hosts the pipeline of scripts. As shown in FIGS. 1A-1D, the user terminal 101 is external to the logical grouping 105 and the PAAS and the CMDB are external to the user terminal 101 and the logical grouping 105. The PAAS hosts a logic (e.g., an application program, a function, a software module, a software engine) programmed to perform or enable the set of blocks 1302-1306 to be performed.

In block 1302, the logic submits a call to the first API. The call includes a set of parameters. The set of parameters includes an identifier of a type of a test to be executed by the function, an identifier of an application hosted by the PAAS, and an identifier of a record of a change in a computing environment external to the logical grouping, the computing terminal, the PAAS, and the CMDB. The function (i) queries the relational database via the first API to retrieve a set of identifiers of a set test names based on the identifier of the type of the test to be executed by the application and the identifier of the application hosted by the PAAS, (ii) creates a record for a test job in the relational database via the first API such that the record stores an identifier for the test job, the set of identifiers of the set test names based on the identifier of the type of the test to be executed by the application, the identifier of the application hosted by the PAAS, and the identifier of the record of the change in the computing environment, and (iii) sends a copy of the identifier for the test job via the first API to the logic. The test job is programmed to activate the pipeline of scripts for execution on the automation server when the test job is run. The pipeline of scripts may be executed in parallel or in series. The set of parameters may be provided in a JSON format or an XML format.

In block 1304, the logic stores the copy of the identifier for the test job in the PAAS.

In block 1306, the logic continuously polls the relational database via the second API to determine a current status of the test job by the logic based on the copy of the identifier for the test job. The current status is pass or fail. When the current status is a pass, the logic updates an identifier for a test cycle from a non-completed indicator to a completed indicator. The logic hosts the identifier for the test cycle. When the current status is a fail, the logic updates the identifier from the test cycle from the non-completed indicator to a failure indicator and creates a new record in the PAAS. The new record contains a set of technical details specific to the test job. The set of technical details indicates why the current status is the fail. The first API or the second API may be a REST API, a SOAP API, a GraphQL API, an RPC API, or a Webhook API.

For example, the algorithm 1300 may enable a sophisticated integration of multiple servers and a computing terminal, designed to streamline and automate the testing process of applications hosted on the PAAS. As exemplified by FIG. 1, the system architecture includes the computing terminal that hosts the browser, allowing users to interact with the system. This terminal is external to the logical grouping of three servers, each serving a specific purpose. The first server hosts the application with a function, the first API, and the second API. The second server hosts the relational database (although another database format is possible), while the third server hosts the automation server, such as a Jenkins server, which manages the pipeline of scripts. The PAAS and the CMDB are also part of the system but are external to both the computing terminal and the logical grouping of servers.

The application on the first server is central to the system's operation. It hosts a function that interacts with the relational database and the automation server. The first API is used to query the relational database to retrieve a set of test names based on specific identifiers, such as the type of test to be executed and the application hosted by the PAAS. This ensures that the system can dynamically select the appropriate tests based on the current needs. The second API is used for continuous polling of the relational database to determine the current status of the test job.

The automation server, like the Jenkins server, hosts the pipeline of scripts that are activated when the test job is run. This server is crucial for executing the automated tests and ensuring that they are carried out efficiently and accurately. The pipeline of scripts allows for a high degree of automation, reducing the need for manual intervention and minimizing the risk of human error. This automation is a significant technical advantage, as it streamlines the testing process and ensures consistent and reliable results.

The PAAS hosted on the CMDB plays a vital role in managing the logic of the system. This logic is responsible for submitting calls to the first API, which includes a set of parameters such as the identifier of the type of test to be executed, the identifier of the application hosted by the PAAS, and the identifier of a record of a change in a computing environment. This call triggers the function on the first server to query the relational database and create a record for the test job. The record stores various identifiers, ensuring that all relevant information is captured and can be referenced later.

One of the unique technical advantages of this system is its ability to continuously poll the relational database via the second API to determine the current status of the test job. This continuous monitoring ensures that the system can promptly update the status of the test job, whether it passes or fails. If the current status is a pass, then the system updates the identifier for the test cycle from a non-completed indicator to a completed indicator. If the current status is a fail, then the system updates the identifier from the test cycle from a non-completed indicator to a failure indicator and creates a new record in the PAAS with specific technical details about why the test job failed.

This detailed tracking and reporting of test job statuses provide valuable insights into the testing process and help identify any issues that need to be addressed. By storing a copy of the identifier for the test job in the PAAS, the system ensures that all relevant information is easily accessible and can be used for future reference or analysis. This level of detail and transparency is a significant technical advantage, as it allows for better decision-making and more effective troubleshooting.

The system's integration of multiple servers and a computing terminal, along with the automation server and PAAS, creates a robust and efficient testing environment. This integration ensures that all relevant components work together seamlessly, providing a comprehensive solution for managing and executing automated tests. The use of APIs to facilitate communication between the different components further enhances the system's efficiency and reliability.

The logical grouping of the first, second, and third servers ensures that each component can focus on its specific tasks without interference. The first server's application and APIs manage the interaction with the relational database and the automation server, while the second server's relational database stores and retrieves the necessary data. The third server's automation server executes the test scripts, ensuring that the tests are carried out accurately and efficiently.

The system's ability to handle multiple test jobs simultaneously is another significant technical advantage. By leveraging the automation server's pipeline of scripts, the system can execute multiple tests in parallel, reducing the overall time required for testing. This parallel execution is particularly beneficial in large-scale environments where numerous tests need to be conducted regularly.

The PAAS and CMDB's external positioning to the logical grouping and computing terminal ensures that the system can scale effectively. This scalability is crucial for accommodating growing testing needs and ensuring that the system can handle increased workloads without compromising performance. The PAAS's logic for submitting calls to the first API and managing the test job statuses ensures that the system remains responsive and efficient, even as the scale of testing increases.

The system's design also ensures that it can adapt to changes in the computing environment. By including an identifier of a record of a change in the computing environment in the call to the first API, the system can account for any modifications that may impact the testing process. This adaptability is a significant technical advantage, as it ensures that the system remains accurate and relevant, even as the environment evolves.

The detailed tracking of test job statuses and the creation of new records with specific technical details in the PAAS provide a comprehensive audit trail. This audit trail is invaluable for identifying patterns, understanding the root causes of failures, and making informed decisions about future testing and development efforts. The system's ability to provide this level of detail and transparency is a significant technical advantage, as it enhances the overall quality and reliability of the testing process.

The system's use of a relational database ensures that all relevant data is organized and easily accessible. This organization is crucial for efficient querying and retrieval of information, which is essential for the system's operation. The relational database's ability to store and manage large volumes of data ensures that the system can handle extensive testing requirements without performance degradation.

The automation server's pipeline of scripts is a key component of the system, providing a high degree of automation and reducing the need for manual intervention. This automation not only streamlines the testing process but also ensures that tests are executed consistently and accurately. The use of an automation server like Jenkins, which is well-known for its reliability and flexibility, further enhances the system's technical advantages.

The system's continuous polling of the relational database via the second API ensures that the current status of the test job is always up to date. This real-time monitoring is crucial for promptly identifying and addressing any issues that may arise during the testing process. The ability to update the test cycle's status based on the current status of the test job ensures that the system remains accurate and reliable.

The creation of new records in the PAAS with specific technical details about failed test jobs provides valuable insights into the reasons for failures. This information is crucial for troubleshooting and resolving issues, ensuring that the system can continuously improve and maintain high-quality testing standards. The detailed technical information provided in these records helps developers understand the root causes of failures and take appropriate corrective actions.

The system's architecture, with its logical grouping of servers and external components, ensures that all relevant parts work together seamlessly to provide a comprehensive testing solution. This integration of multiple components, each with its specific role, ensures that the system is efficient, reliable, and scalable. The use of APIs for communication between components further enhances the system's efficiency and reliability.

The system's ability to handle complex testing requirements and adapt to changes in the computing environment ensures that it remains relevant and effective in a dynamic and evolving landscape. This adaptability is a significant technical advantage, as it ensures that the system can continue to provide accurate and reliable testing results, even as the environment changes. As such, the system offers a robust, efficient, and scalable solution for managing and executing automated tests. Its integration of multiple servers, a computing terminal, and external components like the PAAS and CMDB ensures that all relevant parts work together seamlessly to provide a comprehensive testing environment.

The system's use of APIs for communication, continuous polling of the relational database, and detailed tracking of test job statuses provides significant technical advantages, ensuring that the testing process is streamlined, accurate, and reliable. The automation server's pipeline of scripts and the PAAS's logic for managing test jobs further enhance the system's efficiency and effectiveness, making it a valuable tool for any organization looking to improve its testing processes.

Figure 15:
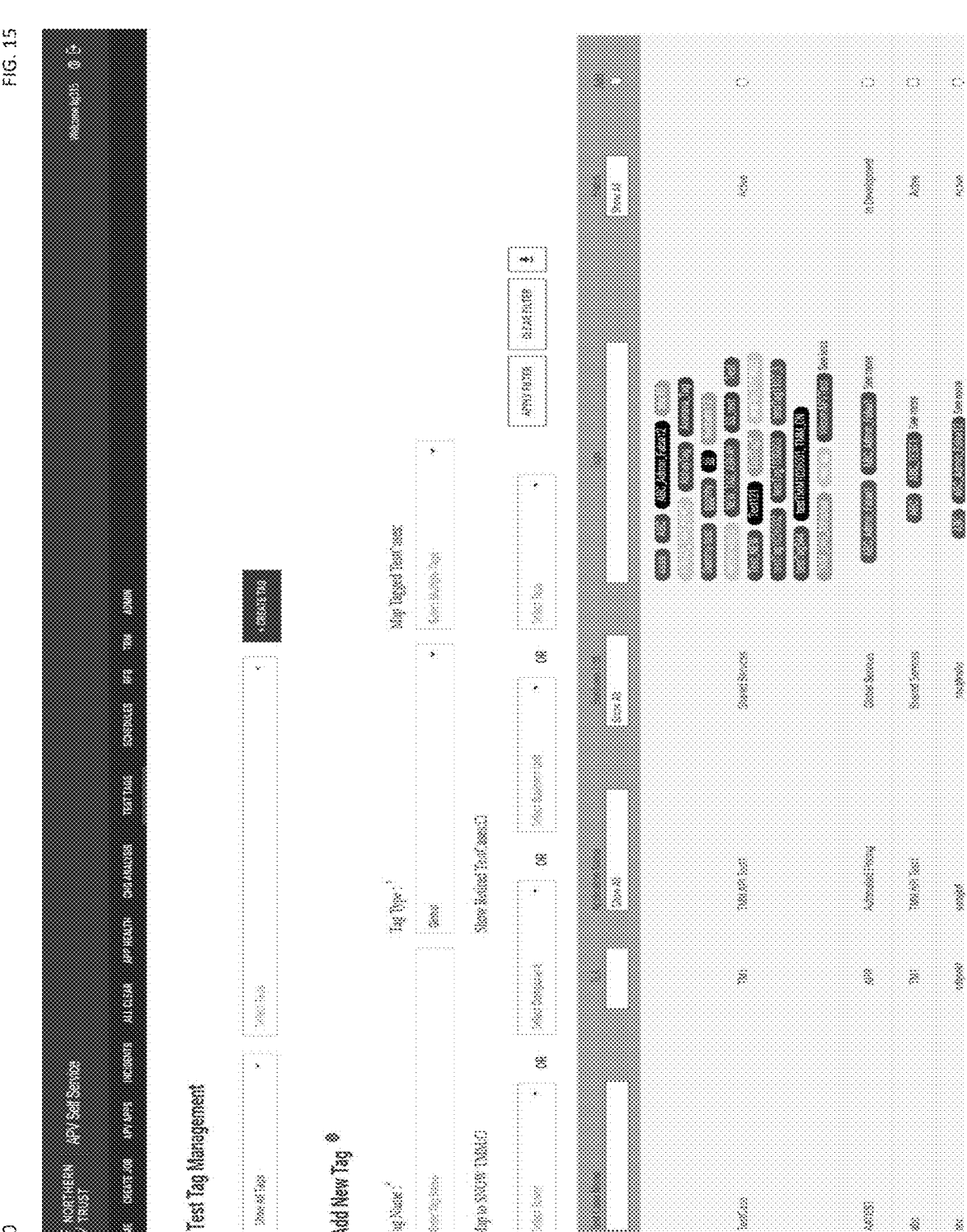
FIGS. 15-17 show a set of screenshots of an embodiment of a user interface used in the algorithm of FIG. 14 according to this disclosure.
Figure 16:
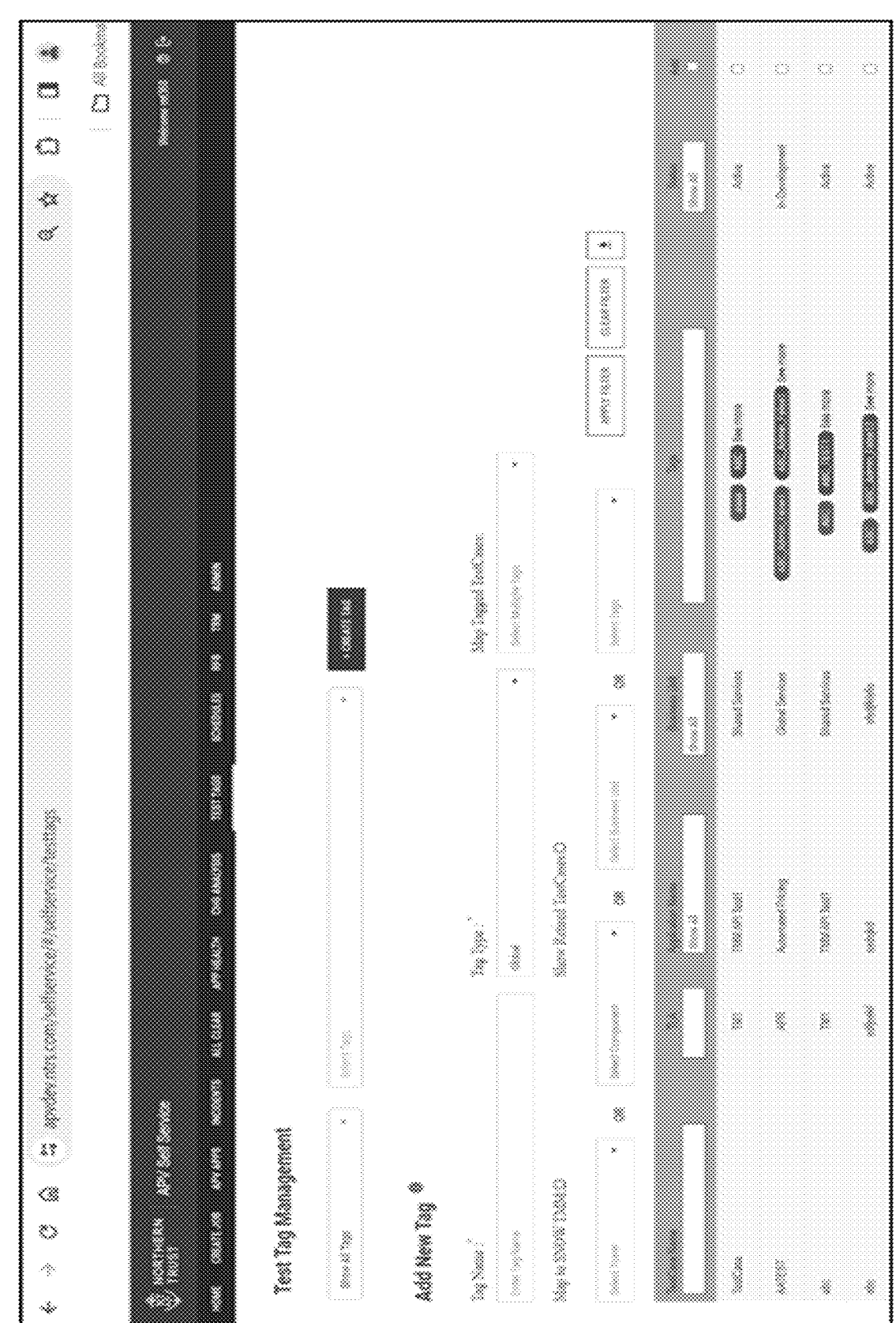
Figure 17:
Figure 18:
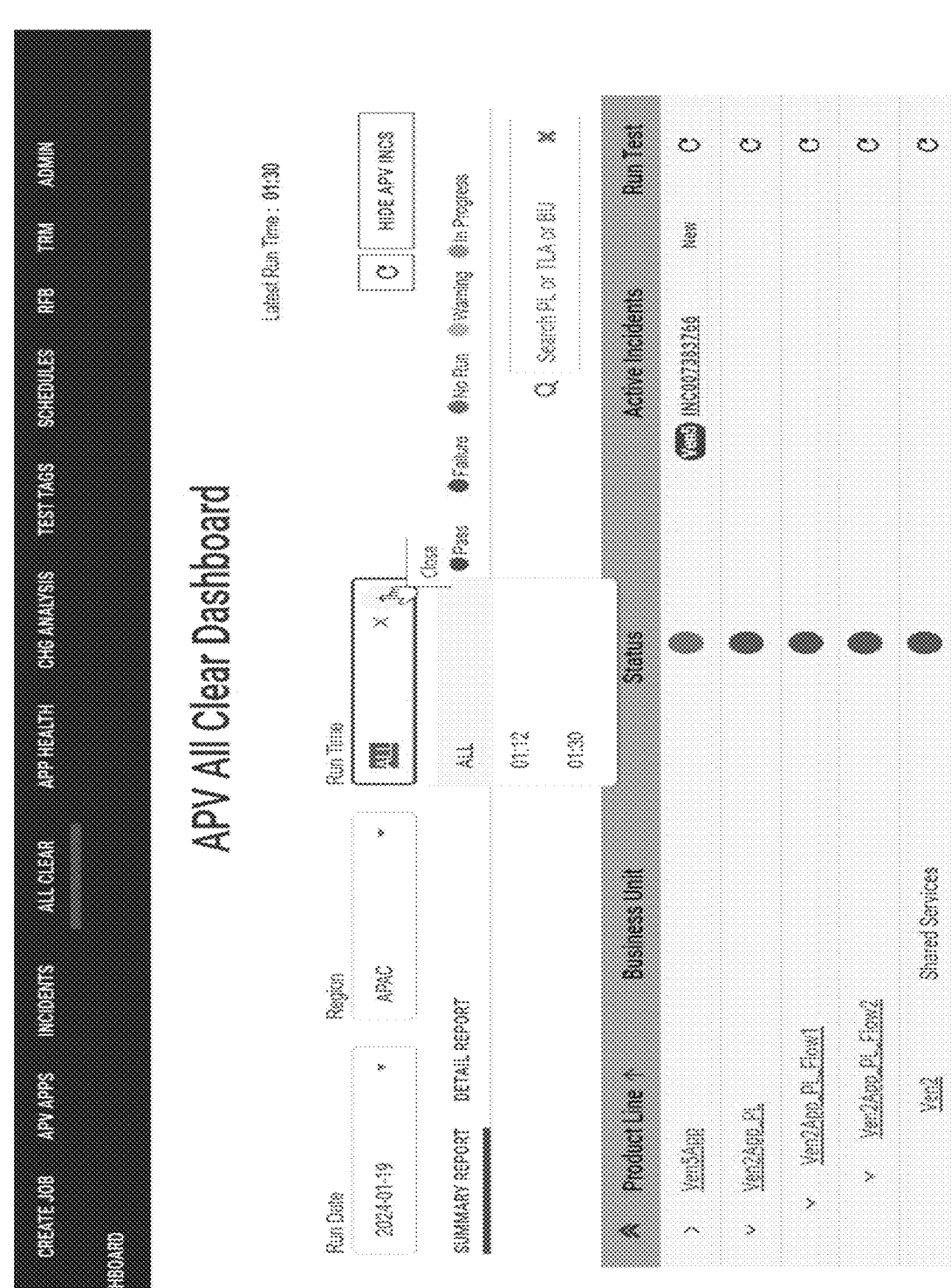
Figure 19:
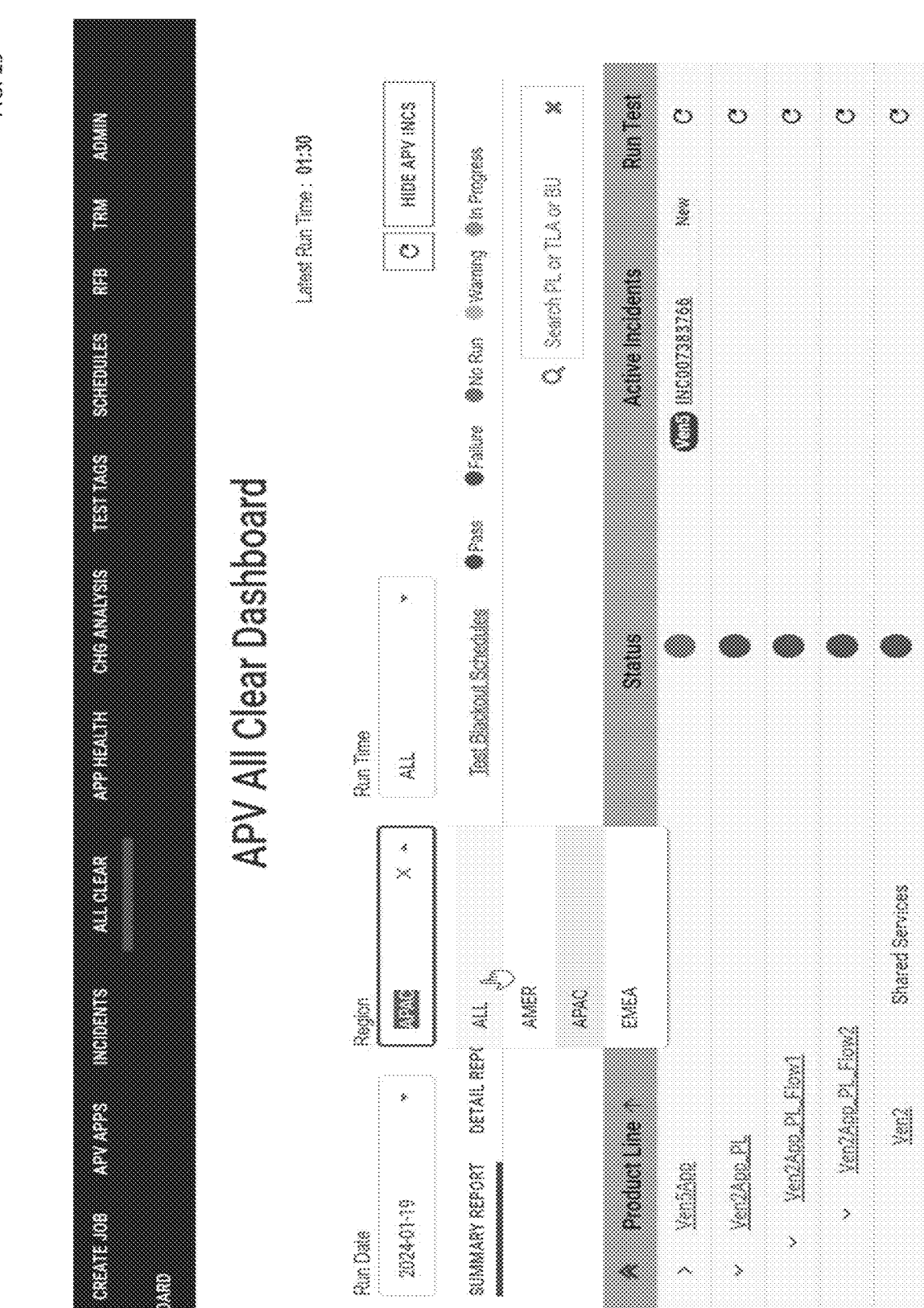
Figure 20:
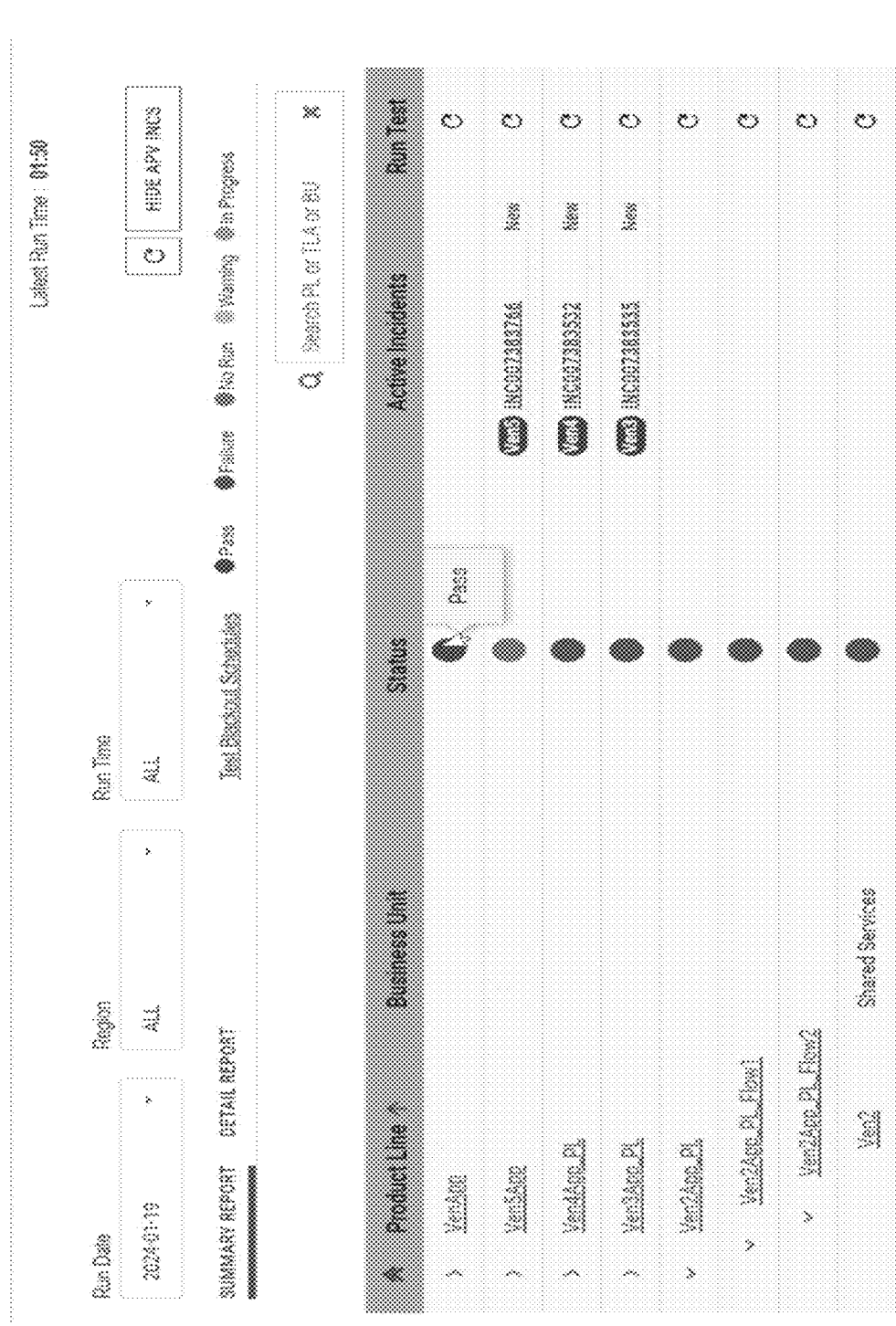
Figure 21:
Figure 22:
Figure 23:
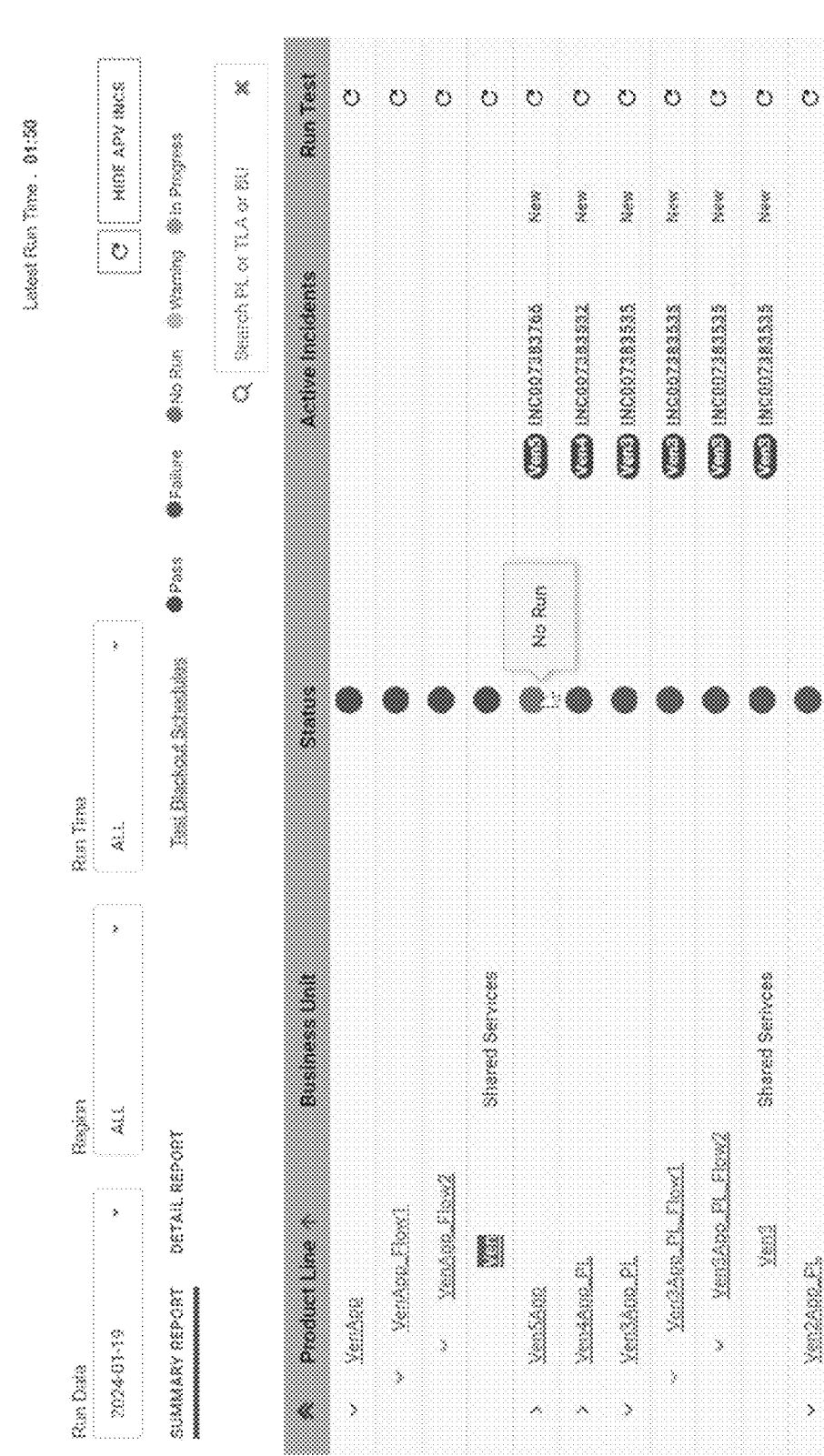
Figure 24:
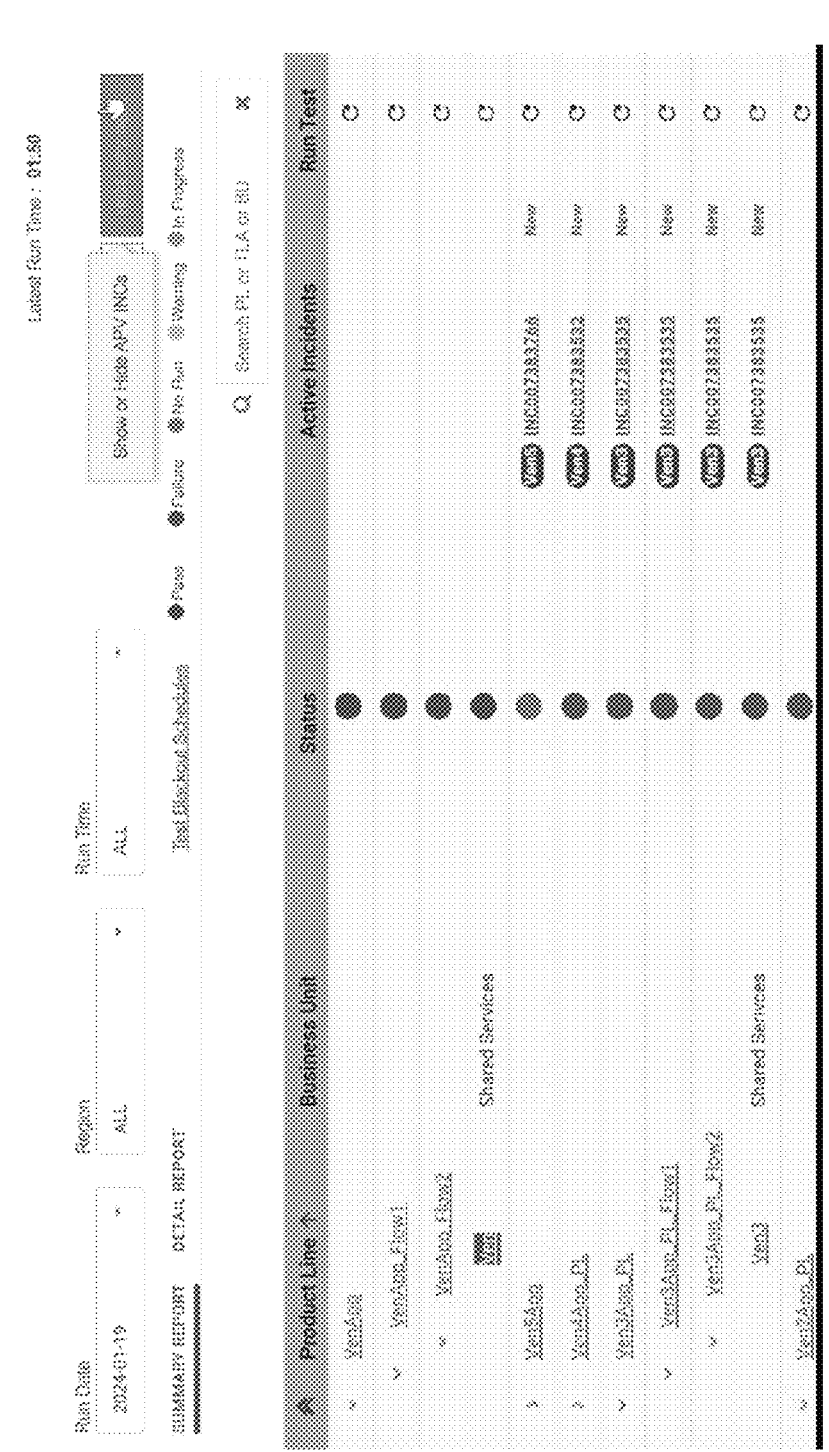
Figure 26:
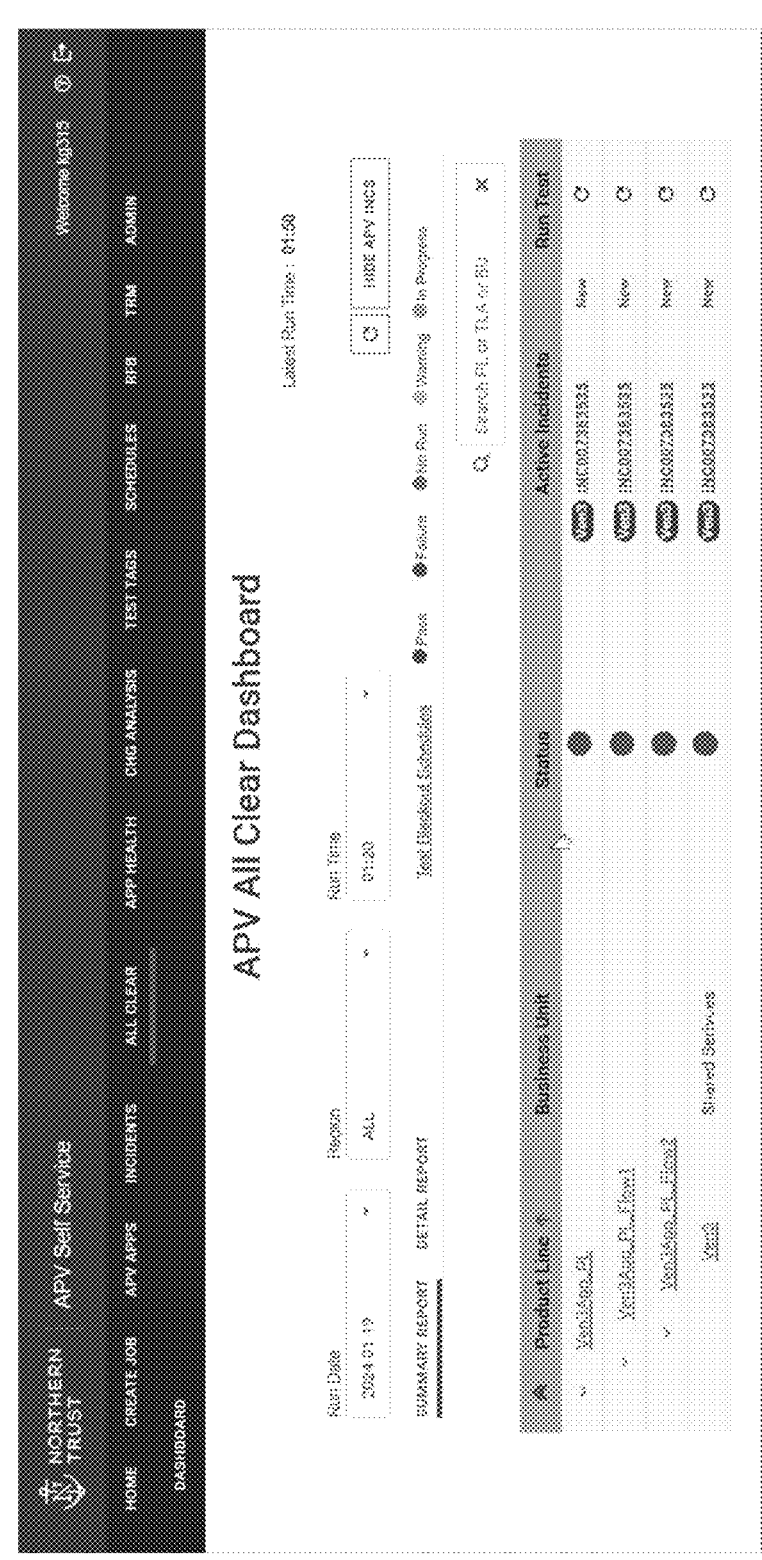
Figure 27:
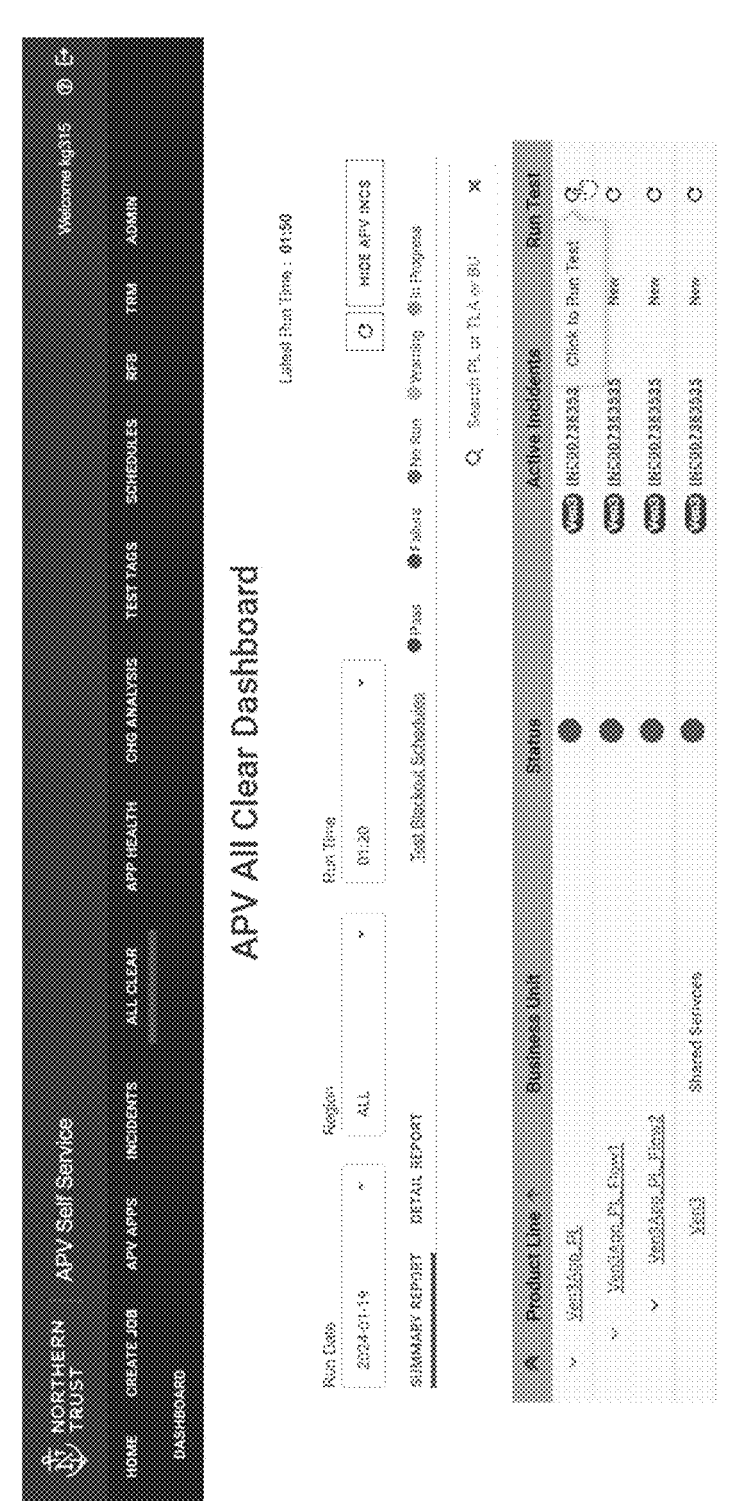
Figure 28:
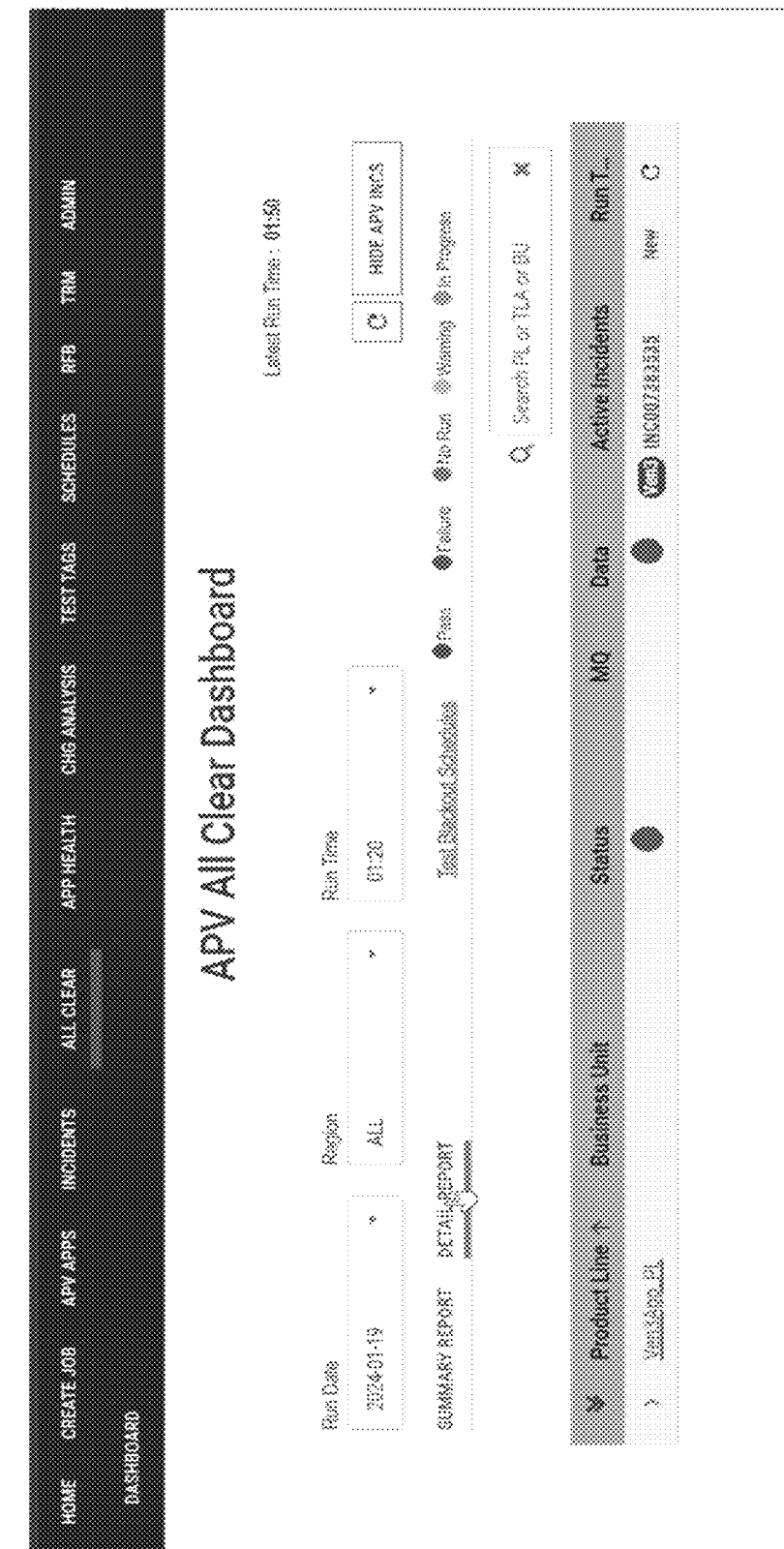
Figure 29:
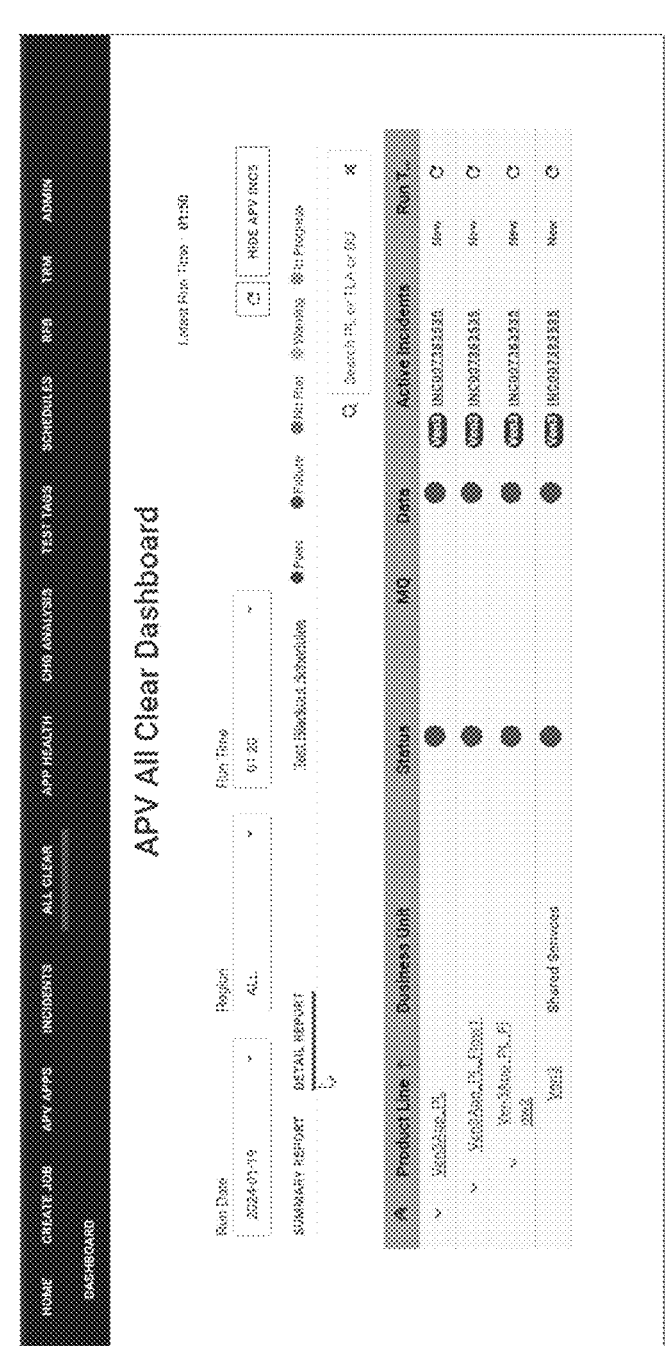
Figure 30:
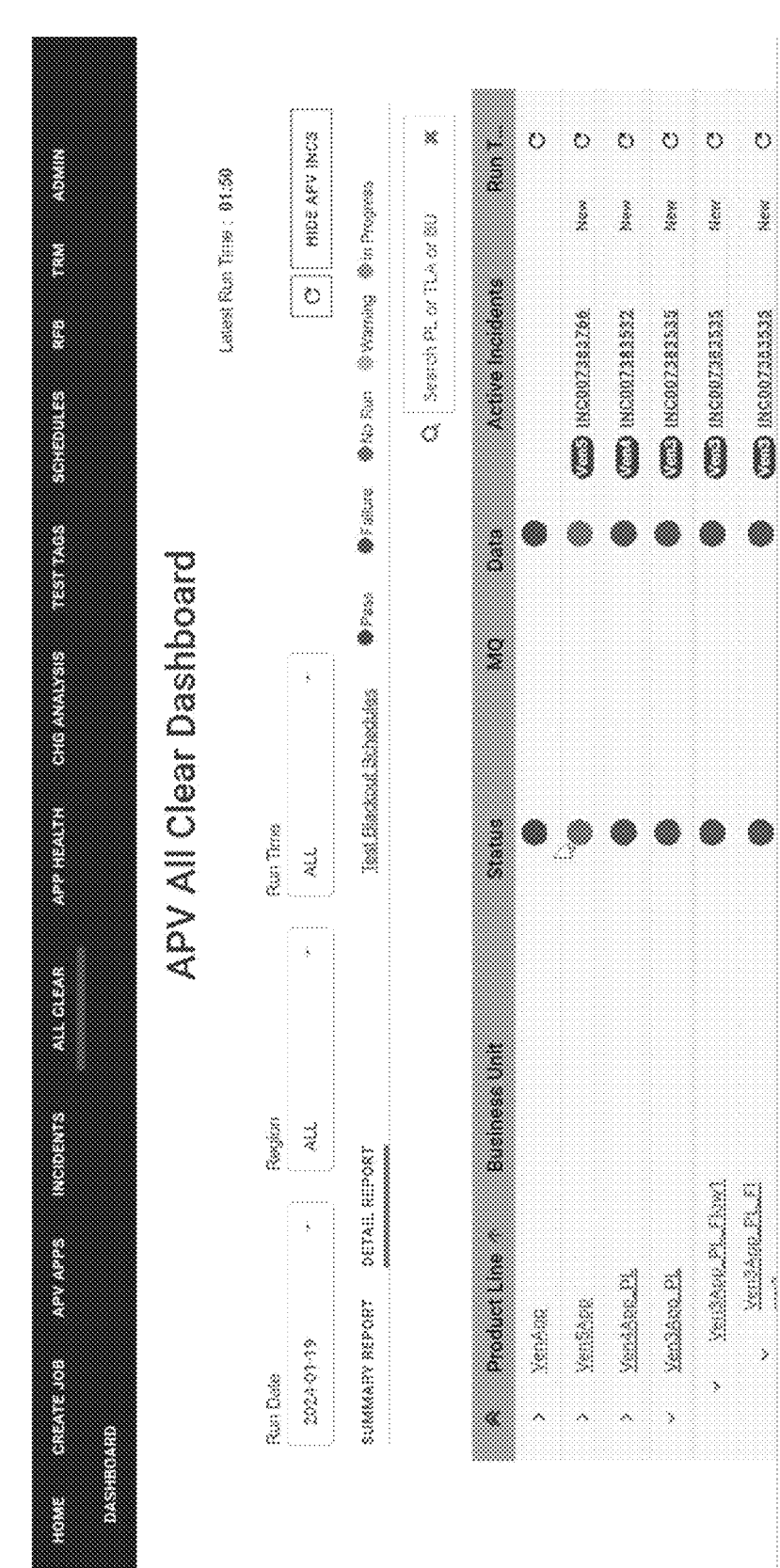

FIG. 14 shows a flowchart of an embodiment of an algorithm for storing a difference between two lists of identifiers the network topology of FIGS. 1A-1D according to this disclosure. FIGS. 15-17 show a set of screenshots 1500, 1600, and 1700 of an embodiment of a user interface used in the algorithm of FIG. 14 according to this disclosure. In particular there is an algorithm 1400 for test identifier management. The algorithm 1400 has a set of blocks 1402-1412, which are performed via the network topology of FIGS. 1A-1D, as described above. To perform the algorithm 1400, the user terminal 101 hosts the browser and the logical grouping 105 contains the first server 106 and the second server 111. The first server 106 hosts the application program 107 and the second server 111 hosts the database. As shown in FIGS. 1A-1D, the user terminal 101 is external to the logical grouping 105 and the application program 107 is programmed to perform or enable the set of blocks 1402-1412 to be performed, as exemplified in FIGS. 15-17. There is a computing environment external to the logical grouping 105, where the computing environment hosts a set of applications.

In block 1402, the application program 107 receives a request placed by a user from the browser, presents a hyperlink (e.g., a Uniform Resource Locator) to the browser responsive to the request, and presents a user interface to the browser responsive to the hyperlink being activated by the user from the browser. The user interface may be a single screen or a set of screens that are consecutive. The user interface is programmed to enable the user to select (i) a first parent group identifier (e.g., an alphanumeric string) or a second parent group identifier (e.g., an alphanumeric string) and (ii) a child identifier (e.g., an alphanumeric string) from a first set of child identifiers (e.g., a set of alphanumeric strings) mapped (e.g., many-to-one correspondence) onto the first parent group identifier when (at that time or before) the first parent group identifier is selected (e.g., via a graphical user input element, a dropdown menu, a dial, a radio button) or a second set of child identifiers (e.g., a set of alphanumeric strings) mapped (e.g., many-to-one correspondence) onto the second parent group identifier when (at that time or before) the second parent group identifier is selected (e.g., via a graphical user input element, a dropdown menu, a dial, a radio button). The first parent group identifier avoids overlap in content with the second parent group identifier. Each of the first parent group identifier and the second parent group identifier identifies a genus (e.g., a category) of test cases. Each of child identifier in the first set of child identifiers and the second set of child identifiers identifies a respective specific test case, as disclosed herein.

In block 1404, in response to the user selecting (i) the first parent group identifier or the second group identifier and (ii) the child identifier, the application program 107 updates the user interface (e.g., a screen or moves onto a new screen) to present (i) a list of identifiers (e.g., a set of alphanumeric strings) for a set of test cases (e.g., a set of executable logic such as scripts) to be executed on the set of applications and (ii) a list of tag type identifiers (e.g., a set of alphanumeric strings). The list of tag type identifiers includes an admin type identifier, a global type identifier, or a user type identifier. The global test identifier allows contribution across enterprise teams to create target test suites, the admin test identifier enables standard enterprise test suites managed by application admins only, and the user test identifier are enabled for use on-demand, one-time usage to create draft suites managed and used by the owner only. The set of test cases includes a set of testing configuration parameters for the set of applications (e.g., one group of testing parameters for one application). The list of identifiers corresponding to the set of test cases is presented (e.g., displayed) based on the child identifier that corresponds thereto.

In block 1406, after the user interface is updated, the application program 107 is enabled to let the user select (e.g., by a cursor control device, a mouse device, a trackpad device, a touchpad device, a stylus device) (i) one identifier from the list of identifiers for the set of test cases and (ii) the tag type identifier from the list of tag type identifiers such that the tag type identifier selected controls whether the user is able to edit or map an additional test case to the child identifier based on the tag type identifier. The user may be enabled to select (i) one identifier from the list of identifiers for the set of test cases and (ii) the tag type identifier from the list of tag type identifiers on a single screen of the user interface. This event enables the admin type identifier to cause the application program 107 to (1) enable the user to edit or map the additional test case on the user interface (same screen or different screen) if the user has administrative computing privileges with respect to the logical grouping and (2) not allow any other user not having the administrative computing privileges from editing or mapping the additional test case. Likewise, this event enables the global type identifier to cause the application program 107 to enable the user to collaboratively edit or collaboratively map the additional test case to the child identifier with any other user of the logical grouping if the user has global computing privileges with respect to the logical grouping. Similarly, this event enables the user type identifier to cause the application program 107 to (1) enable the user to edit or map the additional test case to the child identifier if the user has user computing privileges with respect to the logical grouping and (2) not present the additional test case to any other user of the logical grouping. Note that the administrative computing privileges are logically higher or logically more numerous than the user computing privileges.

In block 1408, in response to the after the application program 107 receives the one identifier and the tag type identifier, the application program 107 updates the user interface to present the list of identifiers for the set of test cases that have not yet been mapped to the child identifier such that the user can select (similar to above) at least one identifier from the list of identifiers for the set of test cases that have not yet been mapped to the child identifier and cause the at least one identifier to be mapped to the child identifier. Likewise, the application program 107 updates the user interface to present the list of identifiers for the set of test cases that have been mapped to the child identifier including the at least one identifier.

In block 1410, in response to the application program 107 updating the user interface, the application program 107 queries the database (e.g., relational) hosted on the second server 111 (via the DBMS on the server 111) to retrieve the list of identifiers for the set of test cases that have been mapped to the child identifier excluding the at least one identifier.

In block 1412, in response to the application program 107 retrieving the list of identifiers for the set of test cases that have been mapped to the child identifier excluding the at least one identifier, the application program 107 identifies a difference in value, which may or may not include a difference in format, between (a) a copy of the list of identifiers for the set of test cases that have been mapped to the child identifier excluding the at least one identifier and (b) the list of identifiers for the set of test cases that have been mapped to the child identifier including the at least one identifier. The difference may be stored in the database for consumption (e.g., subsequent retrieval) by other users from other application programs based on the tag type identifier such that set of test cases can be planned (e.g., scheduled, edited) to be executed on the set of applications. For example, the difference may correspond to a presence of mapping of the at least one identifier. For example, the difference may correspond to an absence of mapping of the at least one identifier, where updating the user interface to present the list of identifiers for the set of test cases may include the list of identifiers for the test cases that are being unmapped from the child identifier.

For example, the algorithm 1400 enables a system for managing test identifiers within an automated production environment. As explained above, this system includes a computing terminal that hosts a browser, which serves as the user interface for interacting with the system. The system contains a logical grouping comprising a first server and a second server. The first server hosts a specialized application responsible for various tasks, while the second server manages a database that stores related data. The computing terminal is external to this logical grouping, ensuring separation between the user's device and the main system infrastructure. The system is technologically advantageous due to its capability to integrate with a larger computing environment external to the logical grouping. This external computing environment hosts a set of applications that are subject to testing and verification. The application on the first server is programmed to handle user requests initiated from the browser.

Upon receiving a user request from the browser, the application responds by presenting a hyperlink to the browser. The user can activate this hyperlink to access a user interface designed for selecting group and child identifiers necessary for managing test cases. The user interface allows users to select between a first parent group identifier and a second parent group identifier. Additionally, users can choose a child identifier from sets of child identifiers mapped to the selected parent group identifier. The system ensures that the first and second parent group identifiers do not overlap, preventing any potential conflicts in identifier management. This structure provides a clear and organized hierarchy for managing test cases and their associated identifiers.

Once the user selects a parent group and child identifier, the user interface updates to present a list of identifiers for test cases that need to be executed on the external set of applications. The interface also shows a list of tag type identifiers, such as admin type, global type, and user type identifiers. Each test case includes specific testing configuration parameters for the applications. The list of identifiers for the test cases is presented based on the selected child identifier, ensuring relevant test cases are shown to the user. The system enables users to choose one identifier from the test case list and a tag type identifier from the tag list. The selected tag type identifier determines the user's ability to edit or map additional test cases to the child identifier. For example, an admin type identifier grants users with administrative privileges the ability to make edits or mappings, while restricting other users without such privileges. The global type identifier allows users with global privileges to collaborate on editing or mapping test cases with other users in the logical grouping. The user type identifier permits users with basic privileges to edit or map test cases but prevents visibility to others without similar privileges. Administrative computing privileges are structured to be logically superior or more comprehensive than user computing privileges, providing a clear hierarchy of control. The user interface dynamically updates to display test cases that are not yet mapped to the selected child identifier. This feature ensures users can easily identify and map new test cases as needed. The interface also shows test cases that have already been mapped, facilitating ongoing management and review.

The system queries the database to retrieve and compare lists of mapped test cases. Then, the system identifies differences between current mappings and previous states, storing these differences in the database for future reference. This functionality allows users to track changes in test case management over time. The differences may indicate the presence or absence of mappings, providing insights into the progress and planning of test case executions.

Updating the user interface to present the lists of test cases, whether newly mapped or unmapped, ensures users have comprehensive visibility into the testing process. The user interface can be designed as a single screen or a set of consecutive screens, depending on the complexity and specific requirements of the testing environment. This flexibility in design caters to various user preferences and operational needs. Users can make selections from the test case and tag type lists within a single screen, streamlining their interaction with the system. This design choice enhances user efficiency and reduces the cognitive load associated with navigating through multiple screens. The ability to manage test identifiers effectively addresses the technical problem of organizing and executing test cases in a complex, automated production environment. Therefore, the system manages test identifiers by leveraging a user-friendly interface, comprehensive database interactions, and a clear hierarchy of user privileges. This solution ensures efficient test case management, ultimately improving the reliability and quality of the production environment. The flexible and detailed design of the system makes the system applicable across various industries that rely on automated testing and verification processes.

For another example, the system addresses the technical problem of efficiently managing and mapping test identifiers within a complex production environment that involves multiple applications and user roles. Conventional systems often suffer from inefficiencies in managing test cases, particularly when handling hierarchical relationships between parent and child identifiers or enforcing role-based access controls. Therefore, the system solves this technical problem by enabling dynamic test case mapping, robust role-based editing privileges, and seamless user interface updates, resulting in improved operational efficiency and reduced error rates.

The system comprises a computing terminal hosting a browser, a logical grouping of servers, and an external computing environment. The logical grouping includes a first server hosting an application and a second server hosting a database. The computing terminal operates outside the logical grouping but interfaces with it through the browser. The external computing environment hosts a set of applications that are subject to testing. This architecture ensures modularity while enabling secure interaction between components.

The application hosted on the first server is programmed to process user requests initiated from the browser. Upon receiving such a request, the application presents a hyperlink to the browser. When the hyperlink is activated by the user, the application displays a user interface on the browser. This user interface facilitates user selection of hierarchical identifiers, including parent group identifiers and child identifiers. These hierarchical identifiers are mapped to distinct sets of test cases, ensuring non-overlapping groupings for streamlined testing.

Specifically, users can select either a first parent group identifier or a second parent group identifier through the interface. Based on this selection, the interface dynamically updates to display corresponding child identifiers mapped to the selected parent group identifier. For example, if the first parent group identifier is selected, then only child identifiers associated with that group are displayed. This configuration avoids ambiguity and ensures that users interact solely with relevant data.

The user interface further presents a list of test case identifiers associated with the selected child identifier and a list of tag type identifiers. Tag type identifiers include admin type identifiers, global type identifiers, and user type identifiers. Each tag type identifier governs specific editing privileges for test cases, ensuring that access controls align with organizational policies. When users select a test case identifier and a tag type identifier, the application determines their privileges based on predefined rules. For instance, an admin type identifier allows users with administrative privileges to edit or map additional test cases exclusively. Conversely, users with global privileges can collaboratively edit or map test cases with other global users in the logical grouping.

The system enforces stricter controls for user-type privileges by restricting visibility of additional test cases to only those users who possess such privileges. This ensures that sensitive data remains accessible only to authorized personnel while maintaining operational transparency for higher privilege levels. To enhance usability, the application dynamically updates the interface to display unmapped test case identifiers for selection and mapping to child identifiers. Users can select one or more unmapped test case identifiers for mapping operations, which are then processed by querying the database hosted on the second server. After mapping operations are completed, the updated list of mapped test case identifiers is presented through the interface. Simultaneously, any differences between previously mapped and newly mapped lists are stored in the database for future reference by other users or systems within the logical grouping. This difference in mapping values may indicate either newly added mappings or removed mappings of test case identifiers relative to child identifiers. By storing these differences in an organized manner, the system facilitates audit trails and supports efficient planning for subsequent testing cycles. The system also supports scenarios where test cases need to be unmapped from child identifiers. In such cases, the interface updates to display unmapped test cases separately while retaining their historical associations within database records for traceability.

The user interface can be implemented as either a single screen or multiple consecutive screens based on design preferences or operational requirements. A single-screen implementation allows users to perform all selections on one page for simplicity, whereas multi-screen implementations may offer enhanced clarity for complex workflows.

The system is designed to be scalable and adaptable across various industries requiring automated production environment verification, such as software development, manufacturing automation, and telecommunications networks. Its modular architecture ensures compatibility with diverse computing environments while maintaining robust performance under varying workloads.

Alternative embodiments may include variations in how hierarchical relationships between parent and child identifiers are defined or displayed within the user interface. For instance, graphical representations, such as tree structures, may replace textual lists for improved visual clarity in certain applications. Additional variations may involve integrating machine learning algorithms to predict optimal mappings between test case identifiers and child identifiers based on historical data patterns stored in the database. Such predictive capabilities could further enhance operational efficiency by reducing manual input requirements during testing workflows.

Resultantly, there is a system for test identifier management, where the system comprises a terminal with an OS and a browser application running on the OS, as well as a logical grouping containing a first server hosting an application program and a second server hosting a database. The terminal remains external to the logical grouping. The application program is designed to receive requests from users through the browser application and present a hyperlink in response. When the user activates this hyperlink, the application program displays a user interface that allows navigation of the tags view and management of tags. The user interface enables the creation of new tags and updating of existing tags through user input elements and selection. Upon activation of the create tag button, the application program queries the database to load the existing list of test cases and displays the response on the user interface, showing the current active list of test cases along with associated data, such as test case name, application name, and status.

Users can input a set of parameters including the new tag name, select test cases from the displayed list to be mapped to the tag, and choose the tag type (permission/access control) from options like global, admin, and user. Global test identifiers allow contribution across enterprise teams to create target test suites, admin test identifiers enable standard enterprise test suites managed by application admins only, and user test identifiers are used for on-demand, one-time usage to create draft suites managed and used by the owner only. The application program submits these parameters to the database for storage and creates a unique test tag reference associated with the set of parameters. The updated list of tags is then retrieved and displayed on the user interface, enabling users to perform targeted testing while creating a test case job on demand or based on a schedule. For updating or modifying an existing tag, users can select any tag from the Tags view in the browser application. The application program queries the database for the selected tag using a unique reference ID and retrieves all associated test cases and application data, displaying this information on the user interface. Users can then update the existing set of parameters, including updating the tag name (if the user is an admin or owner of the tag), removing existing test cases mapped to the tag, or selecting new test cases to be linked to the existing tag. The updated set of parameters is submitted to the database for storage and future reference in the application program. This enables users to utilize these created and modified tags in various parts of the application, such as create automated job/schedule (the algorithm 200), automated change intelligence and smart testing for applications (the algorithm 400), and TMM (the algorithm 600).

FIGS. 18-30 show a set of screenshots of an embodiment of a user interface for monitoring status of logical environments and their logical components in the network topology of FIGS. 1A-1D according to this disclosure. As collectively shown in a set of screenshots 1800-3000, the user terminal 101 hosts the browser and the logical grouping 105 contains the first server 106 and the second server 111. The first server 106 hosts the application program 107 and the second server 111 hosts the database. As shown in FIGS. 1A-1D, the user terminal 101 is external to the logical grouping 105 and the application program 107 is programmed to perform or enables the user interface as depicted in the screenshots 1800-3000. This occurs when the application program 107 receives a request placed by the user from the browser (e.g., via a cursor device or a physical or virtual keyboard) and presents a hyperlink (e.g., a URL) to the browser (e.g., within a viewport) responsive to the request. Then, the browser presents the user interface to the browser responsive to the hyperlink being activated by the user from the browser.

As shown in the set of screenshots 1800-3000, the user interface presents a dashboard screen having a run date listing element (e.g., a dropdown menu, a list box, a typeahead field), a region listing element (e.g., a dropdown menu, a list box, a typeahead field), a run time listing element (e.g., a dropdown menu, a list box, a typeahead field), a summary report tab portion (e.g., a hyperlinked label), a detail report tab portion (e.g., a hyperlinked label), and a status identifier legend (e.g., what each symbol, color, shape, shading, size, background, delineation or another visual characteristics represents). The summary report tab portion and the detail report tab portion are presented below the run date listing element, the region listing element, the run time listing element and the status identifier legend, when the dashboard screen is presented upright. The summary report tab portion and the detail report tab portion are logically related to each other and are user-selectable for presentation in the browser exclusive to each other (e.g., only one can be presented at a time) such that the status identifier legend is visible regardless of the summary report tab portion or the detail report tab portion being user-selected.

The summary report tab portion presents a table defined by a set of columns and a set of rows (e.g., X by Y). The table is presented below the run date listing element, the region listing element, the run time listing element and the status identifier legend, when the dashboard screen is presented upright.

The set of columns has a product line column with a product line label, a business unit column with a business unit label, a status column with a status label, an active incident column with an active incident label, and a run test column with a run test label. Each row in the set of rows is respectively populated with a product line identifier in the product line column under the product line label, a business unit identifier in the business unit column under the business unit label, a status identifier in the status column under the status label, an active incident identifier in the active incident column under the active incident label, and a run test symbol in the run test column under the run test label. Although this order is shown, this order is not required and can vary, which may be in any permutational manner.

The product line identifier is activatable (e.g., clickable, touchable) by the user via a cursor unit (e.g., a mouse, a trackpad, a trackball, a touchpad) or a stylus (e.g., a tip or an apex of a conical or pyramidal member, an elongated member, a finger, a pen or pen-like unit, a pencil or a pencil-like unit) to initiate or signal for one row of the set of rows of the table to hierarchically expand. This hierarchical presentation occurs by collapsibly expanding each respective row of the set of rows as activated into a set of sub-rows hierarchically corresponding to a set of respective sub-component identifiers for the product line identifier where each sub-row of the set of sub-rows is respectively populatable with a respective sub-component identifier of the set of respective sub-component identifiers, the business unit identifier associated with the respective sub-component identifier in the business unit column under the business unit label, a respective sub-status identifier associated with the respective sub-component identifier, a respective sub-active incident identifier associated with the respective sub-component identifier, and a respective sub-run test symbol associated with the respective sub-component identifier. The product line identifier and the set of respective sub-component identifiers are each presented as a hyperlink. This feature enhances user interactivity and allows for efficient navigation through the hierarchical structure of the data presented in the table. By clicking on these hyperlinks, users can delve deeper into the details of each product line and its associated sub-components, facilitating a more granular analysis of the production environment's stability. The product line identifier respectively identifies the set of application programs internal or external to the logical grouping.

The sub-status identifiers in the set of sub-rows can semantically rollup to the status identifier for that respective row in the set of rows when activated by the user, as explained above. The run test symbol is activatable by the user to initiate a test internal or external to the logical grouping to enable respective sourcing of the status identifier or the sub-status identifiers. This way the status identifier or the sub-status identifiers can be updated as needed, on-demand, in real-time based on what the test indicates (e.g., full or partial pass or fail).

The set of rows is independently filterable (e.g., via a search parameter entered into a search bar) or sortable by the run date listing element, the region listing element, and the run time listing element. The status identifier legend is positioned external to the table, the run date listing element, the region listing element, or the run time listing element. The product line identifier respectively identifies a set of application programs internal or external to the logical grouping. The business unit identifier respectively identifies a group name associated with the set of application programs. The status identifier respectively identifies a status of a logic (e.g., a script) executable on the set of application programs. The active incident identifier respectively identifies an incident (e.g., failure) on the set of application programs resulting from the logic executing on the set of application programs. The active incident identifier is presented as a hyperlink. The run test symbol is respectively activatable by the user, as explained above, independent of other run test symbols presented in the run test column under the run test label to respectively activate the logic. The application respectively sources the product line identifier and the set of sub-component identifiers, the business unit identifier, the status identifier and the set of sub-status identifiers, and the active incident identifier and the set of sub-active incident identifiers based on respectively accessing the set of application programs and the logic.

For example, as described above, the test initiated by the run test symbol can be internal to the logical grouping. This configuration ensures that the tests are conducted within the secure confines of the logical grouping, thereby maintaining data integrity and security. Internal tests are particularly useful for validating the stability of applications and databases that reside within the same network infrastructure. Alternatively, the test initiated by the run test symbol can be external to the logical grouping. This embodiment allows for the verification of external dependencies and integrations, ensuring that the production environment is stable even when interacting with external systems. External tests are crucial for environments that rely on third-party services or external data sources.

Likewise, the product line identifier identifies the set of application programs internal to the logical grouping. This configuration is ideal for organizations that manage and control their production environments entirely within their own infrastructure. This configuration allows for comprehensive monitoring and testing of internally hosted applications. Conversely, the product line identifier can identify the set of application programs external to the logical grouping. This embodiment may be suitable for environments that utilize externally hosted applications, such as cloud-based services. This configuration ensures that the stability of these external applications is continuously monitored and verified.

Similarly, the logic executable on the set of application programs can be a script. Scripts are lightweight, easy to deploy, and can be tailored to perform specific verification tasks. The scripts are particularly useful for automating routine checks and validations, thereby reducing the manual effort required to maintain production environment stability.

Additionally, the active incident identifier can be presented as a hyperlink. This feature allows users to quickly access detailed information about any incidents affecting the production environment. By clicking on the hyperlink, users can view incident reports, logs, and other relevant data, enabling them to diagnose and resolve issues promptly.

For example, as described above based on the set of screenshots 1800-3000, a comprehensive test scheduling system allows users to manage automated test execution through a structured graphical user interface accessible from the user terminal 101, as described above. As such, the user may begin by inputting desired schedule parameters including a test environment identifier (selected from a dropdown menu), a business unit identifier, an application name or test tags for scope selection, specific test cases, schedule timing, and schedule-type classification.

The schedule-type classification may encompass three distinct categories: daily, all clear, and ready for work. Daily schedules execute regular test case jobs according to the selected schedule. All clear schedules are mapped to specific software product lines or applications and business flows stored in the database, with regional classifications for geographical computing regions, such as North America, Europe, or others. The all-clear configuration process allows users to establish reporting hierarchies, beginning with product lines (e.g., Cash or Trade) and extending to business flows (e.g., payment initiation or sanctions checks). Users submit these configurations to the database, receiving unique reference IDs for each record, and can link existing test cases to the established product lines and business flows. The ready for work schedules are specifically tagged in the database and execute before regional business hours begin.

Upon submission, the application program 107 stores the parameters and generates a unique schedule ID. The system continuously scans the database to determine when to retrieve and execute scheduled tests. When execution criteria are met, the application program 107 creates run-now schedules and groups similar parameters into common schedules. These parameters are then forwarded to the automation server program, which activates script pipelines, agents, and test execution on designated nodes, as explained above.

The graphical user interface provides multiple views of test schedules, organized by day, time, or test case name. The user can modify existing schedules through an edit hyperlink, which queries the database using the unique schedule ID and displays current parameters for updating. Editable elements include execution timing, test case selection, and product line or region assignments.

For all clear schedules, the application program 107 generates consolidated status reports in a hierarchical format, displaying results across regions, business units, product lines, and flows through an interactive dashboard. The dashboard integrates with ServiceNow cloud (or another suitable alternative) for automated incident reporting, distinguishing between application and script failures. When failures occur, the system automatically creates incident reports containing relevant details and receives confirmation through unique incident IDs.

The dashboard provides real-time status monitoring for active jobs and includes functionality for on-demand test reruns at any hierarchy level, with automatic status updates reflected in the interface. These capabilities ensure comprehensive test management and monitoring across the enterprise testing environment.

For example, as described above based on the set of screenshots 1800-3000, the user may begin by launching the "All Clear" screen. Upon launching, several options are displayed, including selecting the date when the execution occurred for the "All Clear" screen. Additionally, the user can filter results based on the region identifier. A region identifier represents a logical mapping between the test execution and the corresponding product line for that region. The user can also view and filter different run times. For instance, if a test was executed at two different times on a specific date, then the user can examine the status of product lines executed at a particular time, such as 1:12 a.m. By selecting different times, the user can view the status corresponding to specific execution times. Initially, the data is filtered for a specific region, such as APAC. By selecting "All," the status of all product lines executed across various regions and time frames is displayed. For example, one of the product lines, VenApp, appears green, indicating that all tests rolled up from the product line to the application flow, sub-flows, and individual applications are successful. This rolled-up status reflects all tests executed for this application. It is important to note that multiple applications may be mapped to a specific business flow. If everything appears green, then no active instances are mapped to those verifications or flows. However, if an application fails and an automated incident is created by the platform, then such failure will be linked at various levels, such as the product line flow and the application level. The user can drill down further to identify which application caused the failure. For example, in one case, Ven3 caused a failure. The platform retrieves the incident's current status (e.g., "New") from ServiceNow service (or another suitable alternative), and this status is hyperlinked for further investigation. The hyperlink directs users to ServiceNow service, such as an external system where they can view incident resolution progress. Additional options include hiding APV incidents on the user interface. For example, APV incidents typically involve script issues rather than application issues and are assigned to the APV platform team for resolution. For example, if a script did not run as expected, then an incident is created for resolution by this team associated with the script. Once resolved and retested during subsequent executions, no issues should persist as would be depicted on the user interface. Users have the option to hide these incident identifiers as these incidents may not be relevant to application teams. Alternatively, users can choose to display APV incidents if needed. Another feature allows filtering based on specific times across regions. For example, filtering for 1:20 a.m. displays the state of product lines executed at that time. In one instance, Ven3 was the only application executed at this time. If an incident remains unresolved or if users wish to rerun tests for specific applications, flows, or product lines, then the users can do so directly from the dashboard using the "Run Test" link. At the product line level, all tests mapped to that product line can be executed simultaneously, although less than all is possible as well. At the application level, only tests specific to that application will be executed. This feature simplifies test execution without requiring users to manage mappings or levels manually-they simply use "Run Test" at their desired level of granularity. Another tab on the platform called "Detailed Report" provides detailed status information about various components verified during testing (e.g., MQs and data components). For instance, if MQs are not mapped in a test scenario, then their status will not appear in this report. In cases where MQs are unmapped in a test module, their status will not be displayed because they are not applicable. However, other components like data may appear in red if issues exist. This detailed report aggregates component statuses (green or red) based on runtime selections across multiple attempts. If no tests in a software module include MQ components, their absence will be reflected accordingly. Another feature allows users to view blacked-out test schedules for informational purposes. Some tests may not run during specific times due to planned or unplanned maintenance windows or design constraints (e.g., checks only performed at start-of-day or end-of-day). By clicking on schedules in this view, users navigate to another screen displaying blacked-out schedules relevant to their selection within the APV self-service "All Clear" dashboard. If tests are attempted during blackout periods, then an exclamation mark appears next to their status field as an indicator that these tests were not executed due to blackout restrictions. Therefore, this technology enables filtering by time and region; viewing rolled-up statuses; investigating incidents via ServiceNow; managing specific incidents; executing tests at various levels; generating detailed reports; and reviewing blacked-out schedules for maintenance windows or design limitations.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

This disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a port-able compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled artisans know that various modifications, additions, substitutions and the like can be made without departing from spirit of this disclosure. As such, these are considered to be within the scope of the disclosure, as defined in the following claims.

What is claimed is:

1. A system, comprising:
a computing terminal hosting a browser; and
a logical grouping containing a first server, a second server, a third server, and a set of nodes, wherein the first server hosts an application, wherein the second server hosts a database, wherein the third server hosts an automation server, wherein the automation server hosts a pipeline of scripts, wherein the set of nodes hosts a set of agents, wherein the set of agents is controlled by the application, wherein the application is programmed to:
receive a request placed by a user from the browser;
present a user interface on the browser responsive to the request, wherein the user interface is programmed to receive an input parameter of a change identifier from the user identifying a change to a computing infrastructure containing a set of application programs having a set of application names;
receive the input parameter from the browser;
receive a message from a platform-as-a-service (PAAS) hosted on a configuration management database (CMDB) for the logical grouping, wherein the message a contains a set of change details related to the change identifier sourced from the CMDB based on the input parameter, wherein the message a contains a set of impacted application details related to the change identifier sourced from the CMDB based on the input parameter, wherein the set of change details contains a change description, a change start date, a change start time, a change end date, and a change end time, wherein the set of impacted application details contains a set of identifiers of the set of application programs impacted based on the change identifier and the set of application names, wherein the set of change details is related to the set of impacted application details;
query the database for the set of application names based on the message;
receive a copy of the set of application names;
present the set of names for the set of applications on the user interface based on the copy of the set of application names being determined to correspond to the set of application names for the set of applications present in the computing infrastructure;
query the database for the change identifier;
receive a copy of the change identifier;
attempt to validate a schedule for a job based on the copy of the change identifier against the copy of the set of application name;
fetch the schedule from the database based on the schedule being validated;
present the user interface to the user to create and then submit a new job to run on-demand or as per the schedule in the computing infrastructure based on the schedule not being validated, wherein the application submits a set of parameters containing the copy of the change identifier into the database to create and then submit the new job without the user having to submit the set of parameters into the user interface, wherein the schedule includes the change description, the change start date, the change start time, the change end date, and the change end time;
scan the database continuously to determine whether the set of parameters should be retrieved from the database according to the schedule;
based on determining that the set of parameters should be retrieved from the database according to the schedule:
retrieve the set of parameters from the database according to the schedule;
form a copy of the set of parameters;
submit the copy of the set of parameters to the automation server such that (1) the automation server activates the pipeline of scripts based on the copy, (2) the pipeline of scripts activates the set of agents, and (3) the set of agents executes a set of test cases on the set of nodes, wherein the set of test cases is sourced from the pipeline of scripts;
receive a set of results for the test cases from the set of agents;
submit the set of results to the database for storage such that the set of results are associated with the set of parameters in the database; and take an action based on the set of results being associated with the set of parameters in the database; and based on determining that the set of parameters should not be retrieved from the database according to the schedule:

continue to scan the database continuously to determine whether the set of parameters should be retrieved from the database according to the schedule.

2. The system of claim 1, wherein the set of results is a set of stability results for a production environment external to the computing terminal and the logical grouping.

3. The system of claim 1, wherein the user interface is a single screen.

4. The system of claim 1, wherein the user interface is a set of screens that are consecutive.

5. The system of claim 1, wherein the copy of the set of parameters is submitted to the automation server in parallel.

6. The system of claim 1, wherein the copy of the set of parameters is submitted to the automation server in series.

7. The system of claim 1, wherein the automation server activates the pipeline of scripts based on the copy of the set of parameters in parallel.

8. The system of claim 1, wherein the automation server activates the pipeline of scripts based on the copy of the set of parameters in series.

9. The system of claim 1, wherein the pipeline of scripts and the copy of the set of parameters have a many-to-many correspondence with each other.

10. The system of claim 1, wherein the pipeline of scripts activates the set of agents in parallel.

11. The system of claim 1, wherein the pipeline of scripts activates the set of agents in series.

12. The system of claim 1, wherein the pipeline of scripts and the copy of the set of parameters do not have a many-to-many correspondence with each other.

13. The system of claim 1, wherein the set of agents executes the set of test cases on the set of nodes in parallel.

14. The system of claim 1, wherein the set of agents executes the set of test cases on the set of nodes in series.

15. The system of claim 1, wherein the set of agents and the set of test cases have a many-to-many correspondence with each other.

16. The system of claim 1, wherein the action includes determining whether the set of results satisfy a threshold for the set of parameters and presenting (i) a first content on the browser based on the set of results satisfying the threshold for the set of parameters or (ii) a second content on the browser based on the set of results not satisfying the threshold for the set of parameters.

17. The system of claim 1, wherein the set of parameters is provided in a JSON format or an XML format before the set of results are submitted to the database for storage.

18. The system of claim 1, wherein the set of results for the test cases is provided in a JSON format or an XML format before the set of results are submitted to the database for storage.

19. The system of claim 1, wherein the action includes at least one of enabling the user to navigate the browser to (a) view the schedule submitted by the user or (b) view the set of results retrieved from the database based on the set of parameters.

20. The system of claim 19, wherein the set of parameters includes a job identifier and a run identifier associated with the job identifier.

21. The system of claim 19, wherein the action includes at least one of enabling the user to navigate the browser to (a) view the schedule submitted by the user and (b) view the set of results retrieved from the database based on the set of parameters.

22. The system of claim 1, wherein the input parameter is a binary value or an alphanumeric string.

23. The system of claim 1, wherein the change to the computing infrastructure is a configuration change or a parameter change.

24. The system of claim 1, wherein the change identifier stored in the database is a copy of the change identifier copied from the CMDB.

25. A method, comprising:

operating a system, comprising:

a computing terminal hosting a browser; and a logical grouping containing a first server, a second server, a third server, and a set of nodes, wherein the first server hosts an application, wherein the second server hosts a database, wherein the third server hosts an automation server, wherein the automation server hosts a pipeline of scripts, wherein the set of nodes hosts a set of agents, wherein the set of agents is controlled by the application, wherein the application is programmed to:

receive a request placed by a user from the browser;

present a user interface on the browser responsive to the request, wherein the user interface is programmed to receive an input parameter of a change identifier from the user identifying a change to a computing infrastructure containing a set of application programs having a set of application names;

receive the input parameter from the browser;

receive a message from a platform-as-a-service (PAAS) hosted on a configuration management database (CMDB) for the logical grouping, wherein the message a contains a set of change details related to the change identifier sourced from the CMDB based on the input parameter, wherein the message a contains a set of impacted application details related to the change identifier sourced from the CMDB based on the input parameter, wherein the set of change details contains a change description, a change start date, a change start time, a change end date, and a change end time, wherein the set of impacted application details contains a set of identifiers of the set of application programs impacted based on the change identifier and the set of application names, wherein the set of change details is related to the set of impacted application details;

query the database for the set of application names based on the message;

receive a copy of the set of application names;

present the set of names for the set of applications on the user interface based on the copy of the set of application names being determined to correspond to the set of application names for the set of applications present in the computing infrastructure;

query the database for the change identifier;

receive a copy of the change identifier;

attempt to validate a schedule for a job based on the copy of the change identifier against the copy of the set of application name;

fetch the schedule from the database based on the schedule being validated;

present the user interface to the user to create and then submit a new job to run on-demand or as per the schedule in the computing infrastructure based on the schedule not being validated, wherein the application submits a set of parameters containing the copy of the change identifier into the database to create and then submit the new job without the user having to submit the set of parameters into the user interface, wherein the schedule includes the change description, the change start date, the change start time, the change end date, and the change end time;

scan the database continuously to determine whether the set of parameters should be retrieved from the database according to the schedule;

based on determining that the set of parameters should be retrieved from the database according to the schedule:

retrieve the set of parameters from the database according to the schedule;

form a copy of the set of parameters;

submit the copy of the set of parameters to the automation server such that (1) the automation server activates the pipeline of scripts based on the copy, (2) the pipeline of scripts activates the set of agents, and (3) the set of agents executes a set of test cases on the set of nodes, wherein the set of test cases is sourced from the pipeline of scripts;

receive a set of results for the test cases from the set of agents;

submit the set of results to the database for storage such that the set of results are associated with the set of parameters in the database; and take an action based on the set of results being associated with the set of parameters in the database; and based on determining that the set of parameters should not be retrieved from the database according to the schedule:

continue to scan the database continuously to determine whether the set of parameters should be retrieved from the database according to the schedule.

*    *    *    *    *